United States Patent
Ianni et al.

(10) Patent No.: US 9,186,568 B2
(45) Date of Patent: Nov. 17, 2015

(54) BASKETBALL SHOT-TRACKING SYSTEM

(71) Applicant: ShotTracker, Inc., Mission Hills, KS (US)

(72) Inventors: Bruce C. Ianni, Mission Hills, KS (US); Davyeon D. Ross, Overland Park, KS (US); Clint A. Kahler, Overland Park, KS (US); Daniel A. Danknick, Lafayette, CO (US)

(73) Assignee: ShotTracker, Inc., Mission Hills, KS (US)

( * ) Notice: Subject to any disclaimer, the term of this patent is extended or adjusted under 35 U.S.C. 154(b) by 0 days.

(21) Appl. No.: 14/722,556

(22) Filed: May 27, 2015

(65) Prior Publication Data

US 2015/0258416 A1    Sep. 17, 2015

Related U.S. Application Data

(62) Division of application No. 14/301,288, filed on Jun. 10, 2014.

(60) Provisional application No. 61/834,018, filed on Jun. 12, 2013, provisional application No. 61/837,896, filed on Jun. 21, 2013, provisional application No. 61/926,706, filed on Jan. 13, 2014.

(51) Int. Cl.
*A63B 63/08* (2006.01)
*A63B 71/06* (2006.01)
(Continued)

(52) U.S. Cl.
CPC .......... *A63B 71/0669* (2013.01); *A63B 24/0062* (2013.01); *A63B 69/0071* (2013.01); *A63B 2208/02* (2013.01); *A63B 2220/17* (2013.01); *A63B 2220/833* (2013.01)

(58) Field of Classification Search
CPC .......... A63B 71/0669; A63B 69/0071; A63B 24/0062; A63B 2220/17; A63B 2220/883; A63B 2208/02
See application file for complete search history.

(56) References Cited

U.S. PATENT DOCUMENTS

| | | | |
|---|---|---|---|
| 6,280,352 B1 * | 8/2001 | Coffeen et al. | 473/447 |
| 6,389,368 B1 * | 5/2002 | Hampton | 702/179 |

(Continued)

FOREIGN PATENT DOCUMENTS

| | | |
|---|---|---|
| JP | 2000-061016 A | 2/2000 |
| WO | 2007-084850 A2 | 7/2007 |
| WO | 2012-121434 A1 | 9/2012 |

OTHER PUBLICATIONS http://swishmetrics.com/, Sep. 2014.

(Continued)

*Primary Examiner* — Jasson Yoo
(74) *Attorney, Agent, or Firm* — Law Offices of Grady L. White, LLC

(57) ABSTRACT

A basketball shot-tracking system comprising a wrist tracker, a net tracker, and a shot-tracking mobile application. The wrist tracker is worn on the wrist or arm of a basketball player and the net tracker is attached to the net of the basketball hoop. The wrist tracker and net tracker automatically detect shot-attempt and made-shot events, respectively, and asynchronously transmit messages to the shot-tracking mobile application reporting these events. The shot-tracking mobile application, which runs on a mobile device, such as a smart phone or tablet computer, includes program instructions that, when executed by the CPU of the wireless mobile device, causes the wireless mobile device to automatically receive and process the asynchronous event data sent by the wrist tracker and net tracker, and to automatically tabulate, store and/or display the basketball player's shooting statistics (such as total shots taken, total shots made, shooting percentage, shot locations, and the like).

3 Claims, 35 Drawing Sheets

NET PERTURBATIONS ON A SWISH SHOT

(51) Int. Cl.
A63B 69/00 (2006.01)
A63B 24/00 (2006.01)

(56) References Cited

U.S. PATENT DOCUMENTS

| | | | | |
|---|---|---|---|---|
| 6,418,179 | B1* | 7/2002 | Shieh | 377/5 |
| 6,582,329 | B1* | 6/2003 | Cabrera | 473/480 |
| 2002/0107092 | A1* | 8/2002 | Gottlieb-Myers et al. | 473/479 |
| 2003/0181268 | A1* | 9/2003 | Nelson | 473/480 |
| 2005/0223799 | A1 | 10/2005 | Murphy | |
| 2009/0191988 | A1* | 7/2009 | Klein | 473/480 |
| 2012/0322587 | A1* | 12/2012 | Duke | 473/450 |
| 2012/0323496 | A1 | 12/2012 | Burroughs et al. | |
| 2013/0172131 | A1* | 7/2013 | Bove et al. | 473/480 |

OTHER PUBLICATIONS http://www.noahbasketball.com/products, Sep. 2014.
http://shop.94fifty.com/, Sep. 2014.
http://www.wilson.com/smart/, Sep. 2014.
http://www.hooptracker.com/, Sep. 2014.
http://shootersrev.com/product/evo-one-sensorized-basketball/, Sep. 2014.
http://www.shootaway.com/, Sep. 2014.
http://www.vibradotech.com/, Sep. 2014.
Introduction about Nintendo WII Software, Nintendo Korea, Jun. 24, 2010.

\* cited by examiner

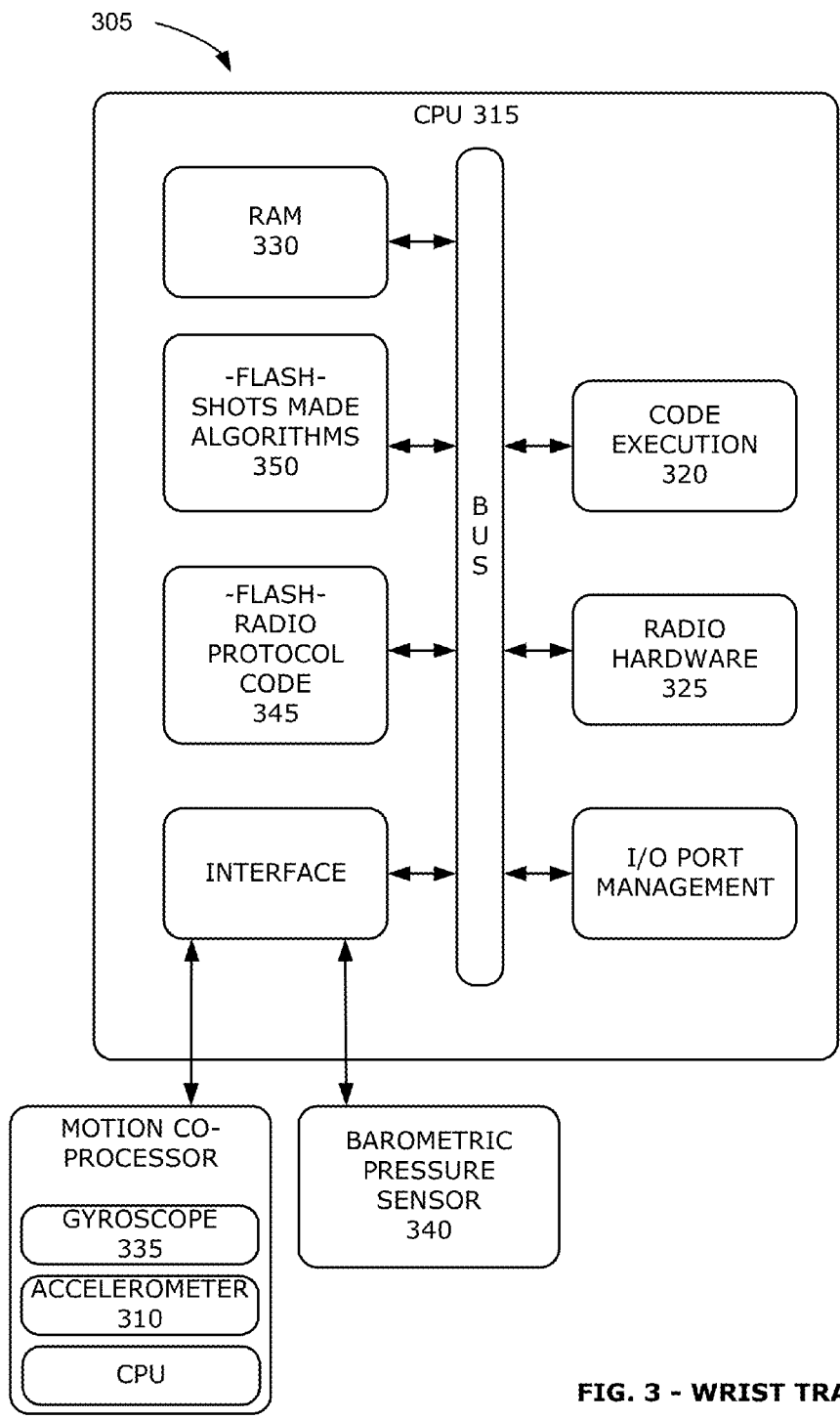
FIG. 3 - WRIST TRACKER

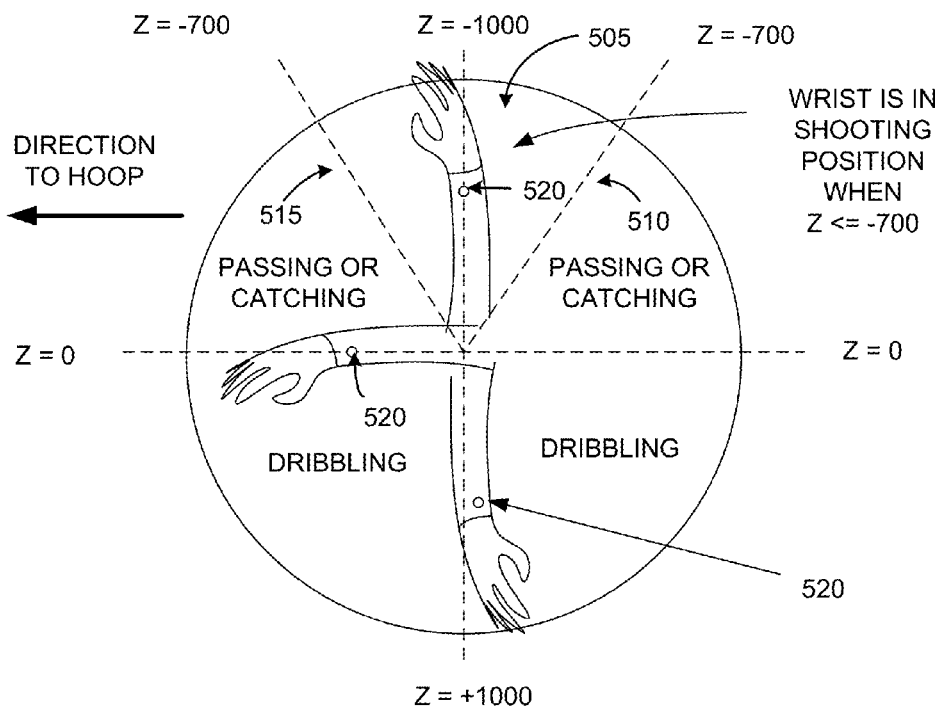
FIG. 5A – WRIST POSITION vs VERTICAL (Z) ACCELERATION VALUES
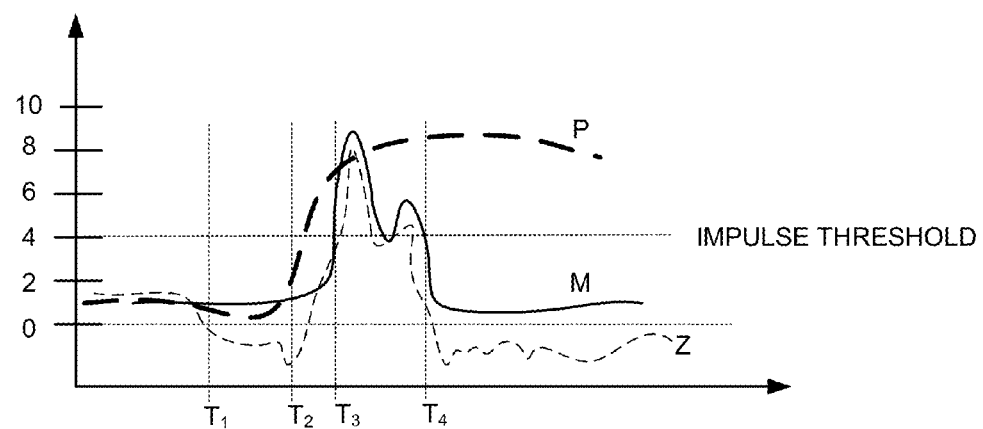
FIG. 5B – SHOT ATTEMPT PROFILE

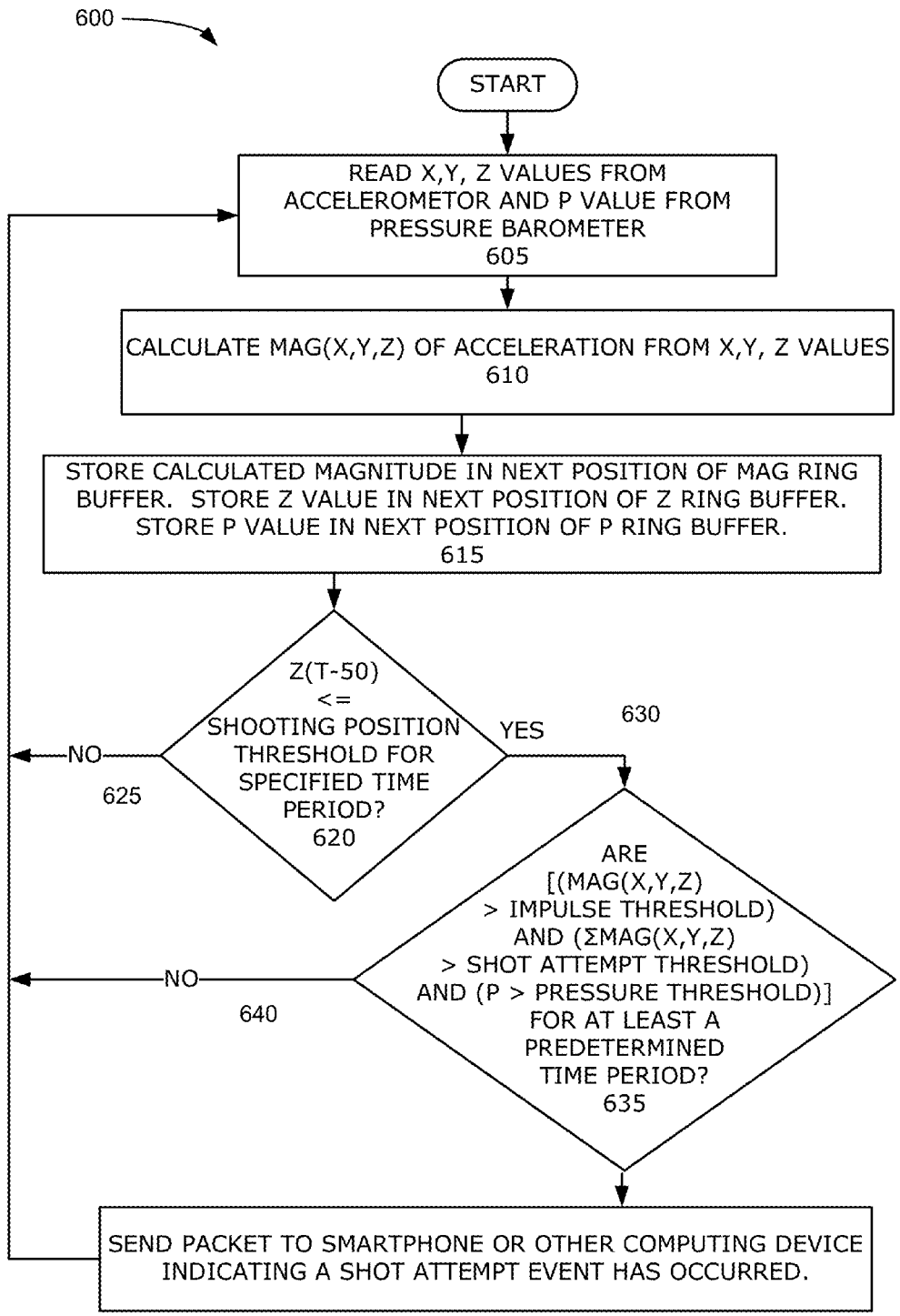
FIG. 6 - WRIST TRACKER SHOT-ATTEMPT ALGORITHM

FIG. 7A – HARD DRIBBLING ACCELERATION PROFILE
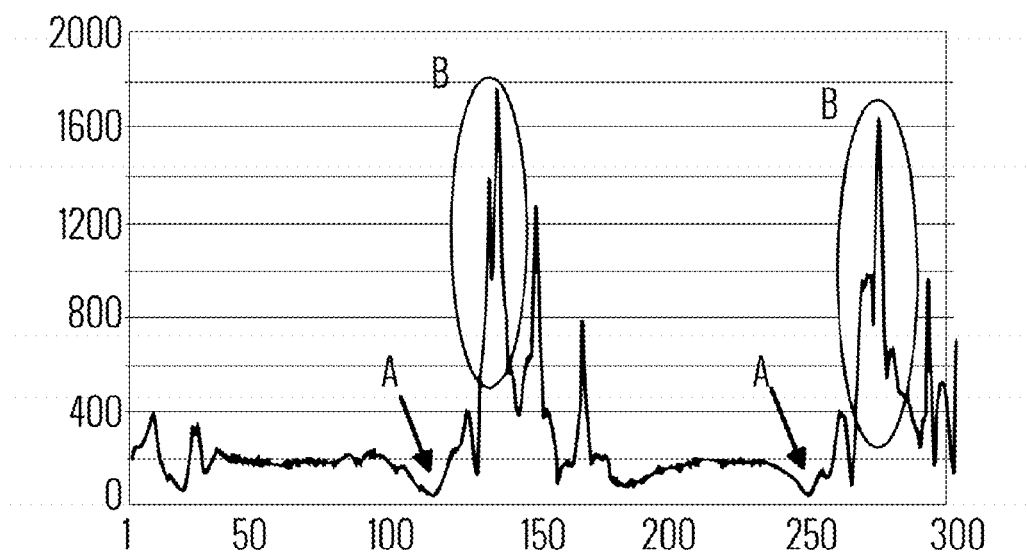
FIG. 7B – PASS CATCHING ACCELERATION PROFILE
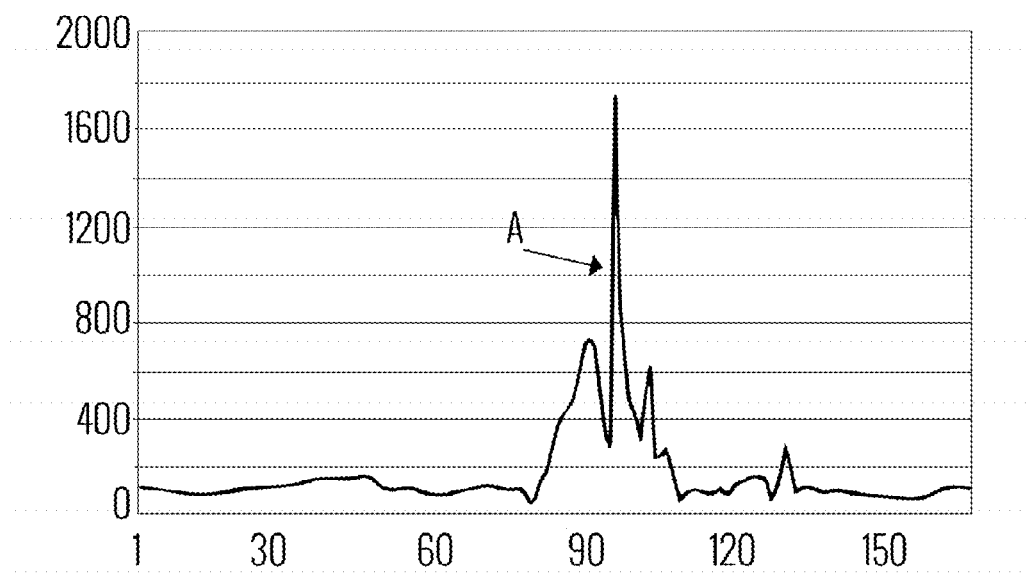

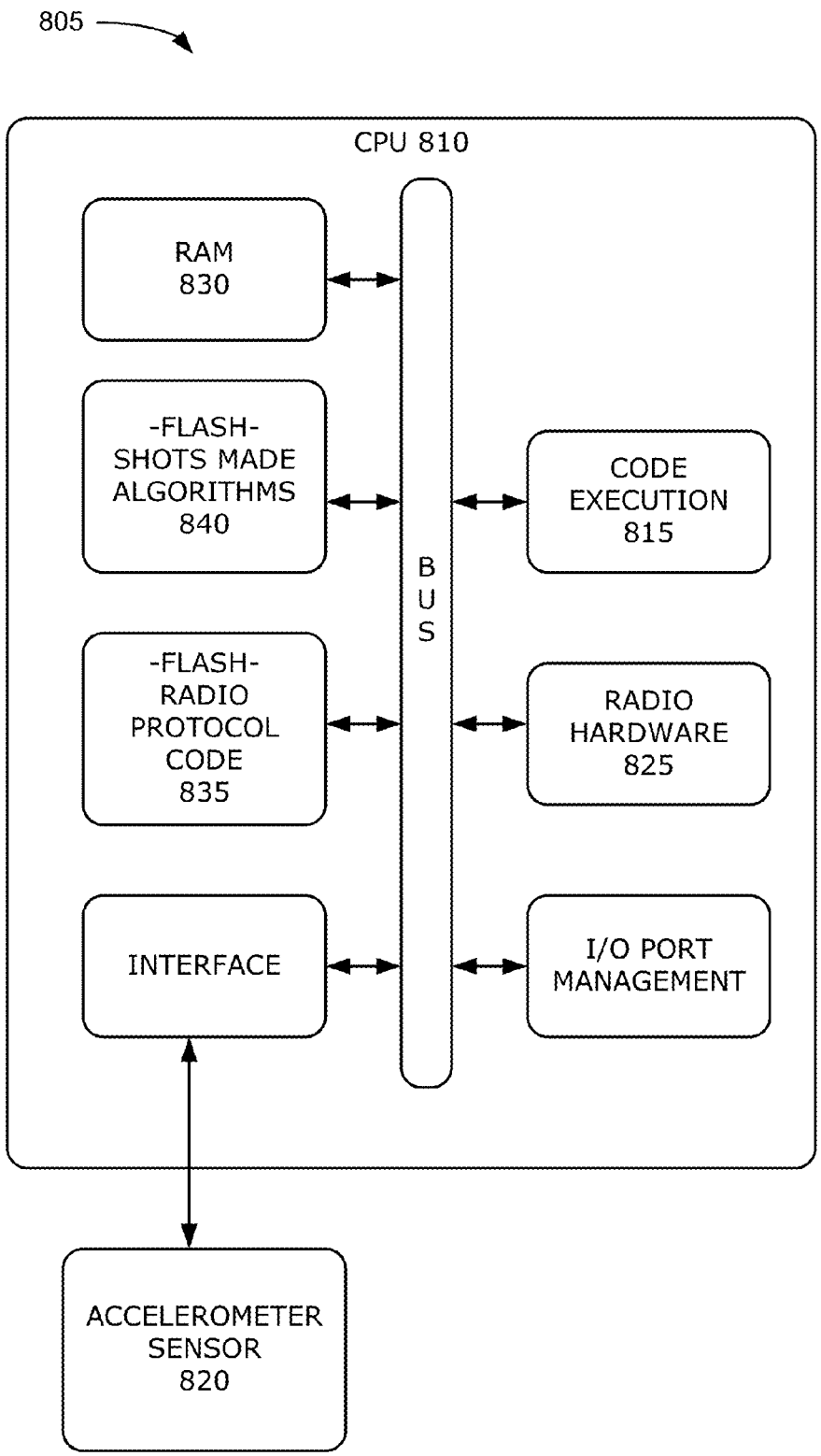
FIG. 8 - NET TRACKER

FIG. 10A – NET PERTURBATIONS ON A SWISH SHOT
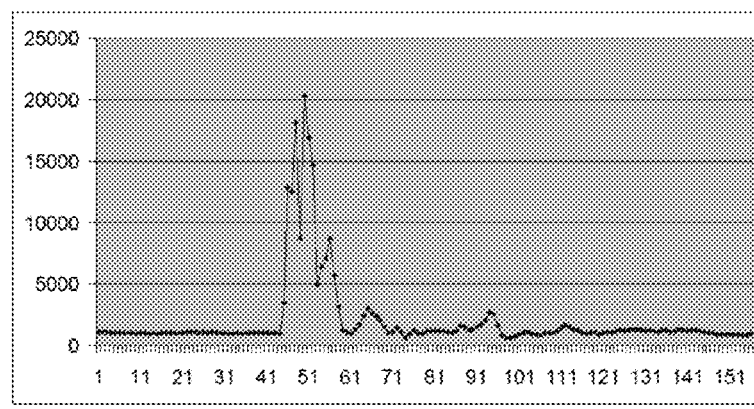
FIG. 10B – NET PERTURBATIONS WHEN BALL BOUNCES OFF RIM
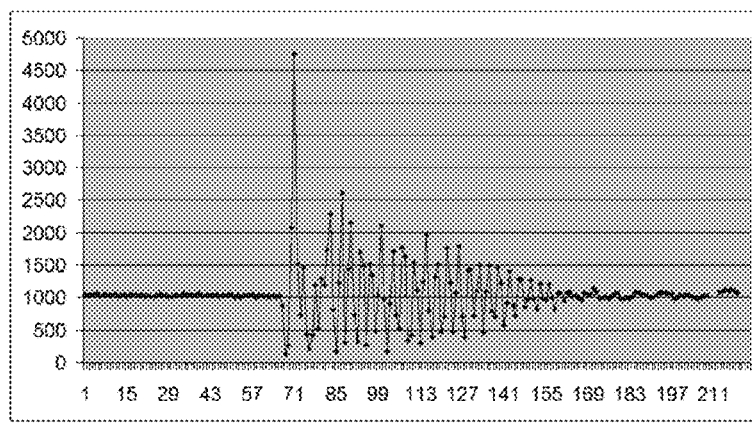

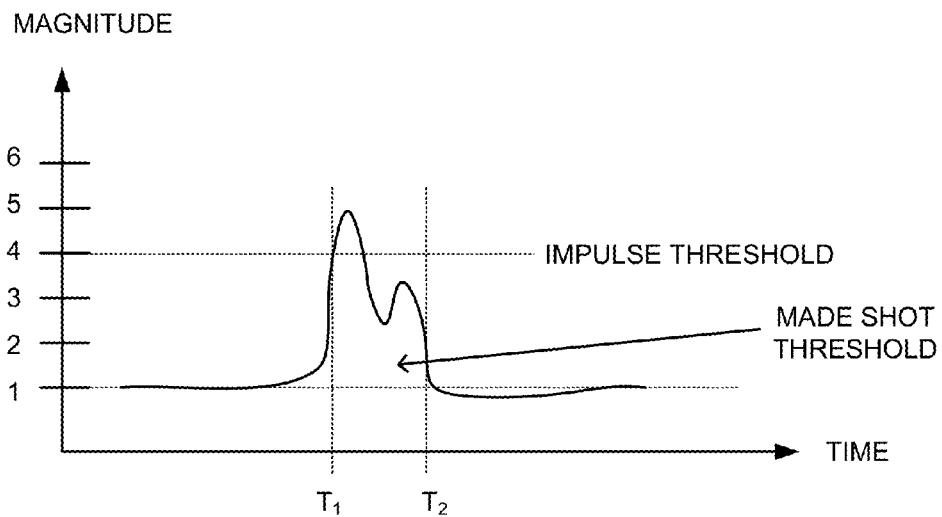
FIG. 11A    MADE SHOT ACCELERATION PROFILE
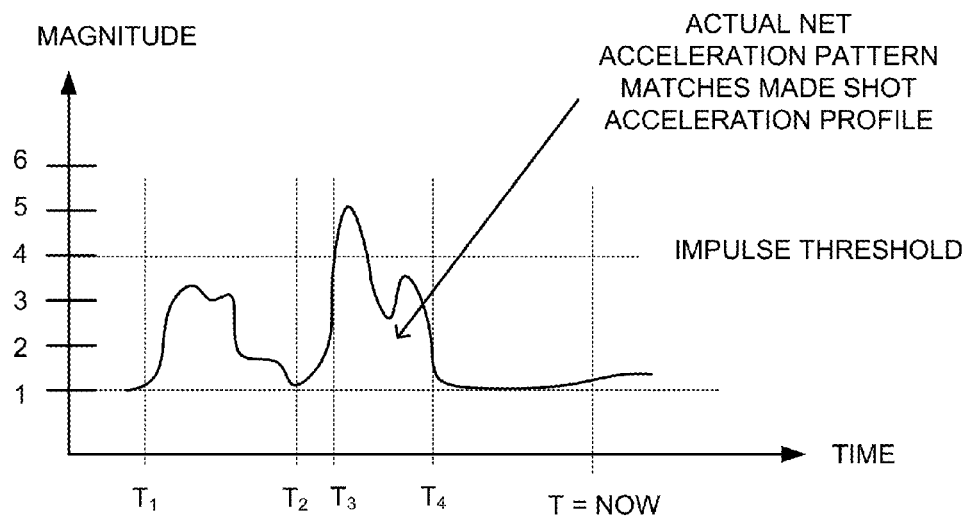
FIG. 11B    PLOT OF ACTUAL NET ACCELERATION OVER TIME

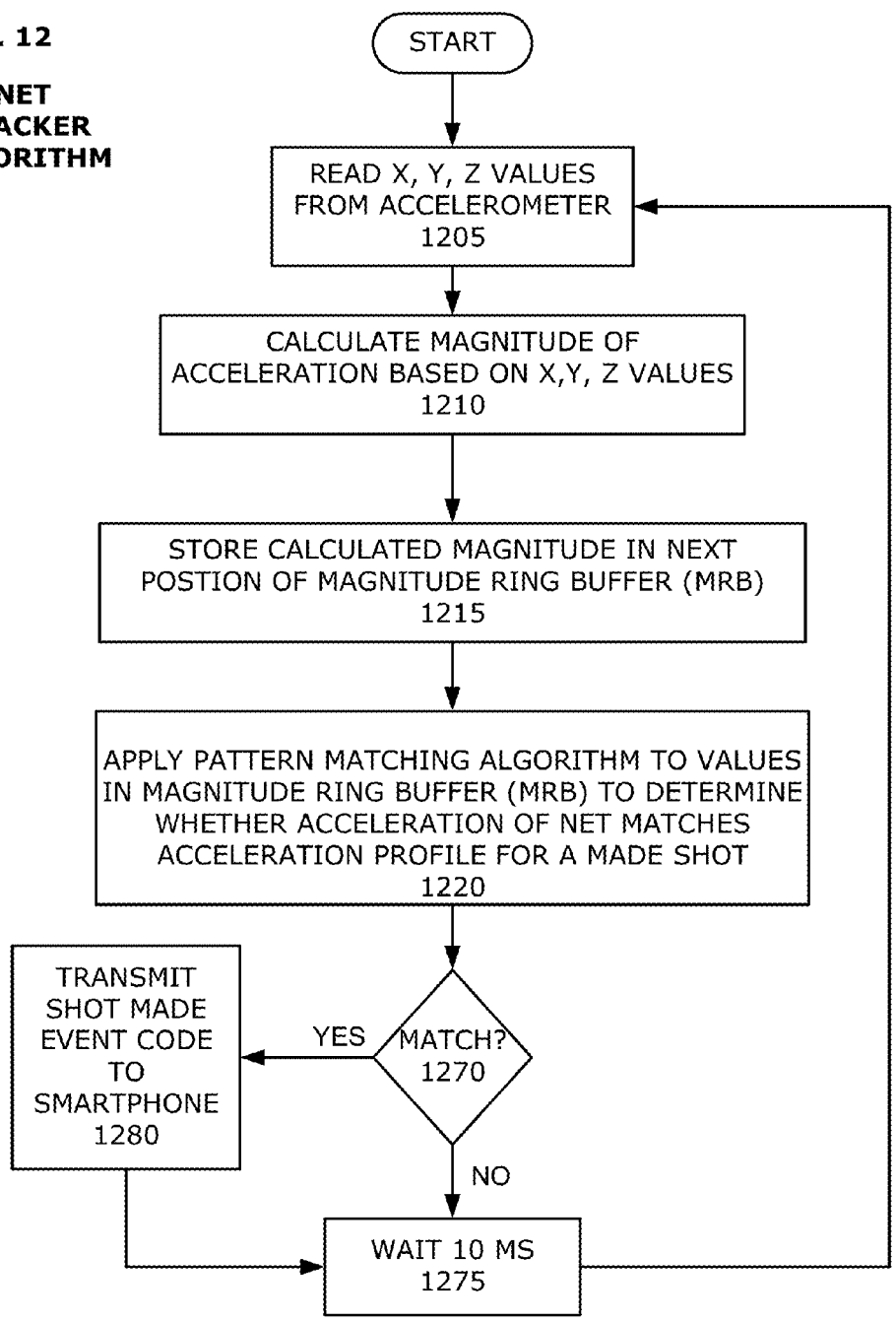

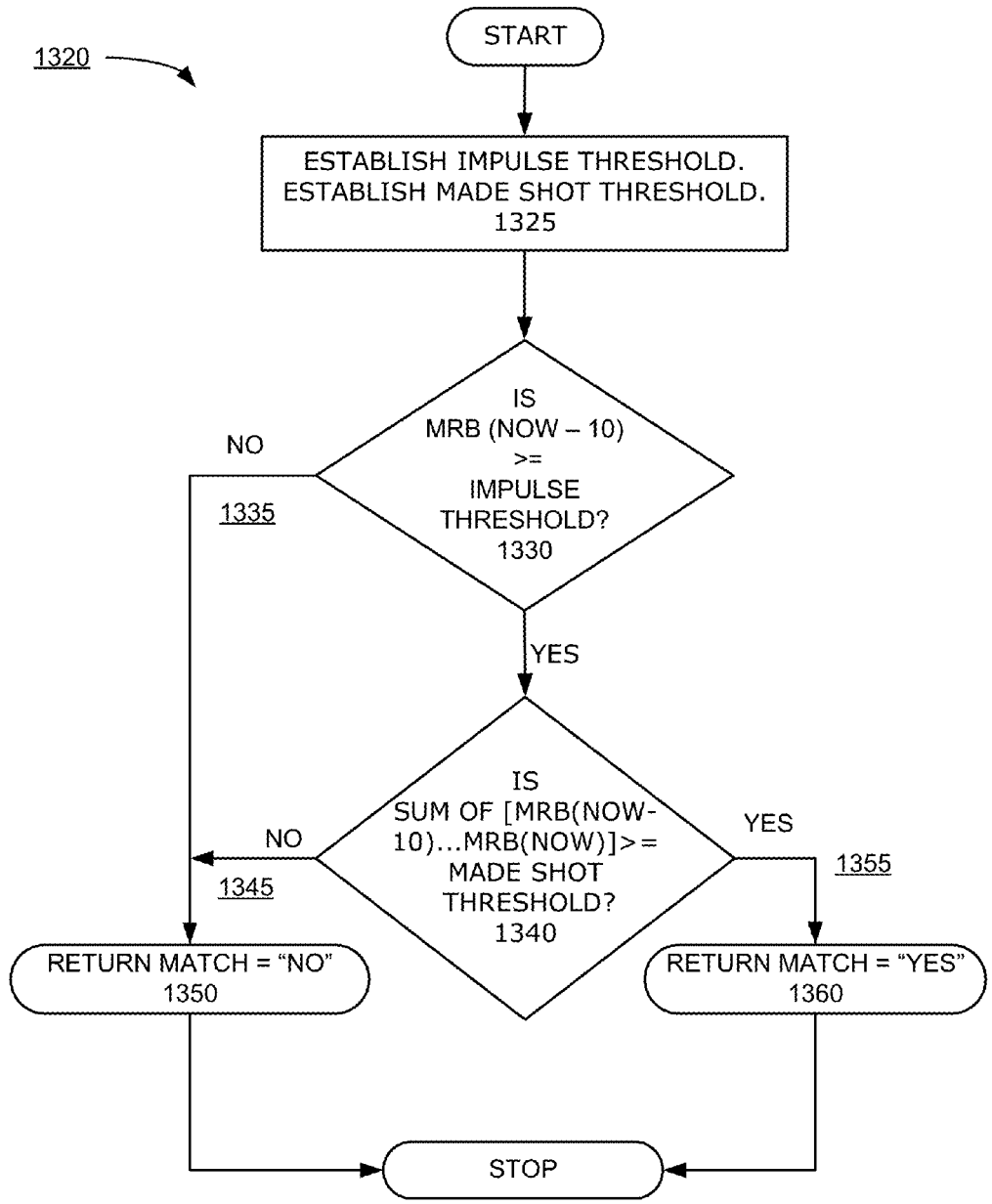
FIG. 13 PATTERN MATCHING ALGORITHM FOR NET TRACKER

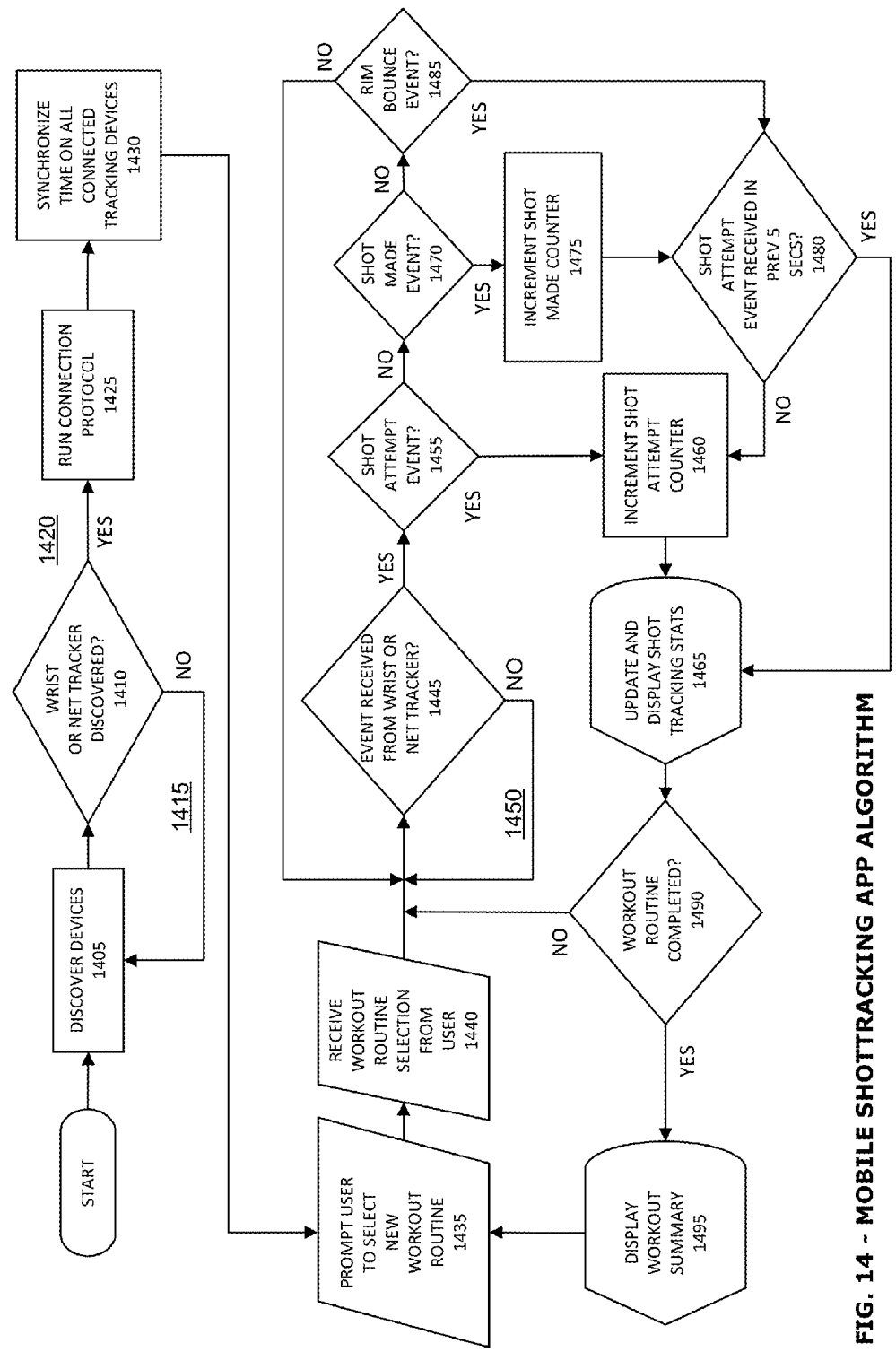
FIG. 14 -- MOBILE SHOTTRACKING APP ALGORITHM

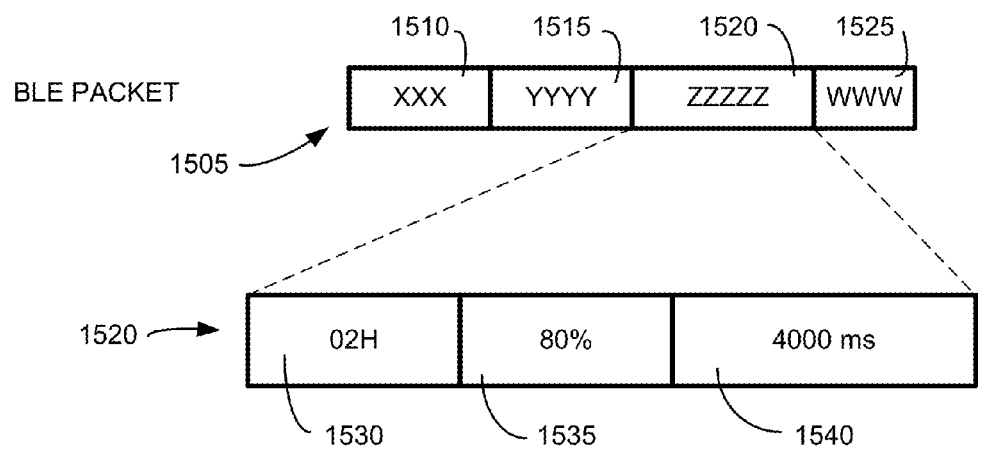
FIG. 15 - BLE PACKET STRUCTURE AND CONTENT

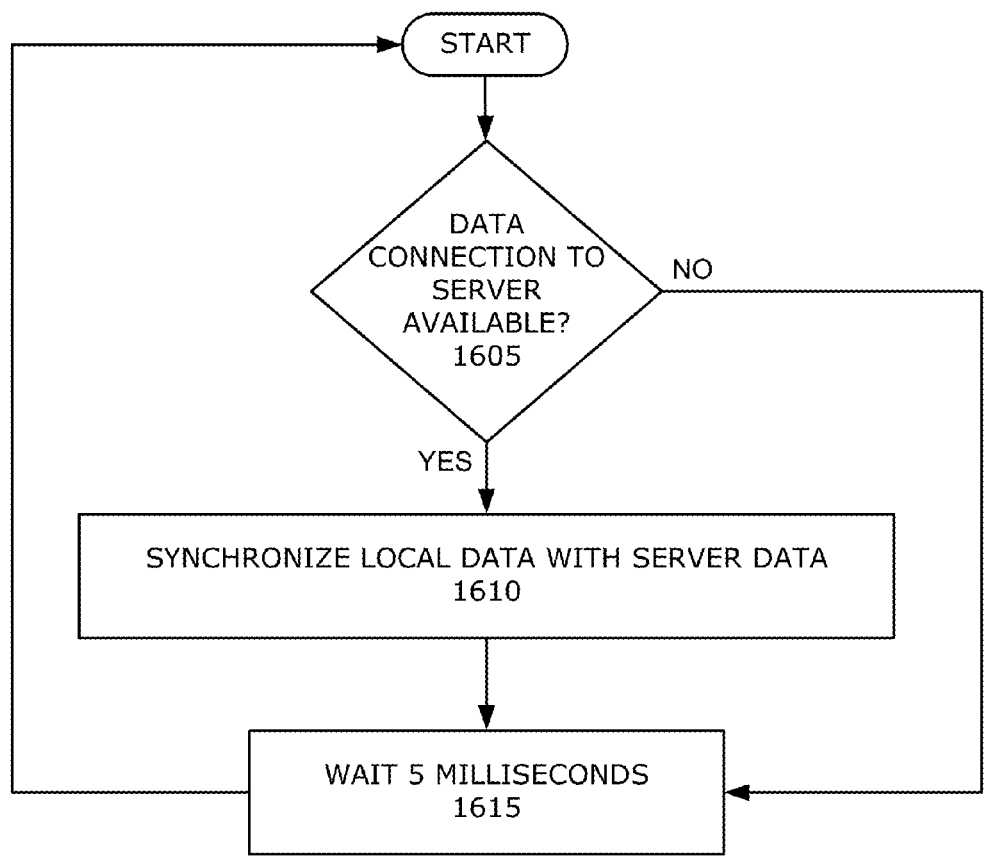
FIG. 16 - SERVER SYNCHRONIZATION ALGORITHM

FIG. 22 - SHOT ATTEMPT LOCATION ALGORITHM

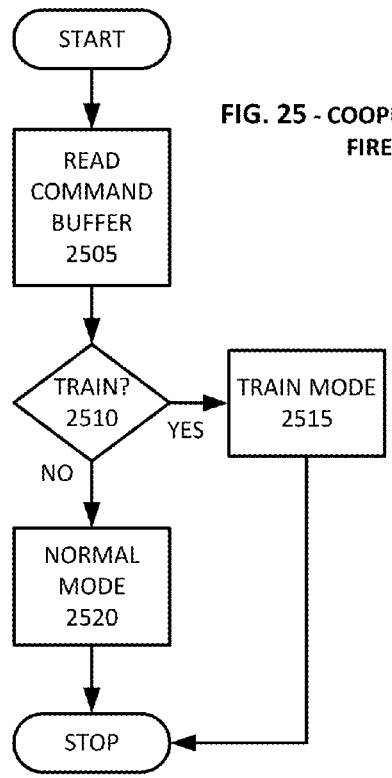
FIG. 25 - COOPERATIVE MULTITASKING TIMER FIRED FOR PROCESSING
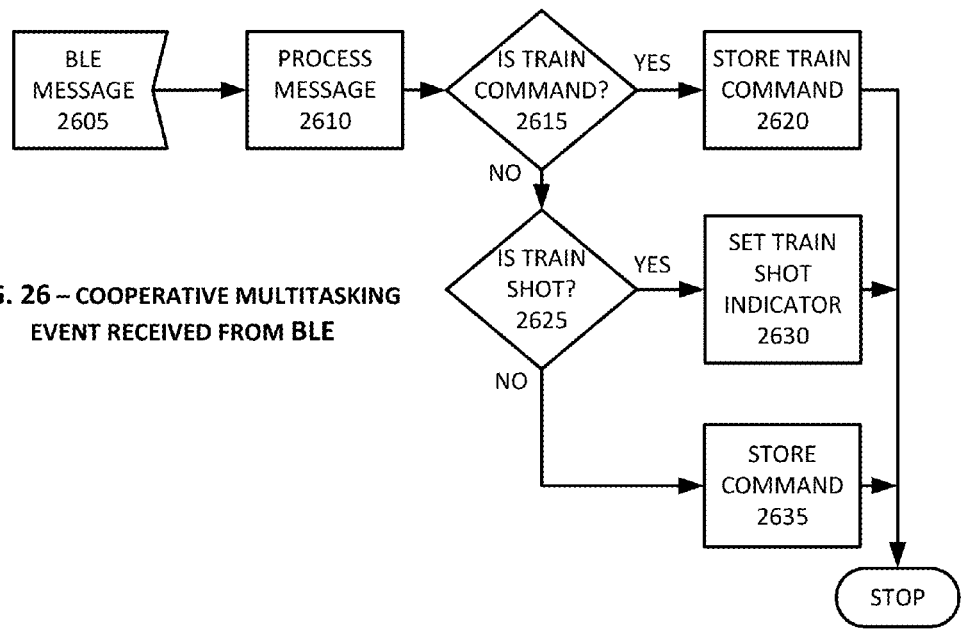
FIG. 26 – COOPERATIVE MULTITASKING EVENT RECEIVED FROM BLE

BASKETBALL SHOT-TRACKING SYSTEM

CROSS-REFERENCE TO RELATED APPLICATIONS

This application is a divisional of U.S. application Ser. No. 14/301,288, which is related to and claims priority under 35 U.S.C. §119 to provisional application No. 61/834,018, filed Jun. 12, 2013, provisional application No. 61/837,896, filed on Jun. 21, 2013, and provisional application No. 61/926,706, filed on Jan. 13, 2014, all of which are incorporated into this application in their entirety by this reference.

FIELD OF ART

The present invention relates generally to automated systems and methods for tracking and tabulating basketball shooting statistics, and more particularly to automated basketball shot-tracking systems utilizing motion sensors, wireless transmitters and wireless mobile computer systems to detect, record and display a player's shot statistics, including the player's history of shot-attempts, made or missed baskets and shot locations on a basketball court.

BACKGROUND

There are a number of problems associated with conventional products and methods for counting, recording and tracking a basketball player's shot statistics (e.g., shots attempted, shots made, shots missed, shooting percentage, shot locations, etc.). First, it is extremely cumbersome to manually track and tally such statistics during a basketball shooting drill or game. Usually, it either requires another person to tabulate the information as the shooter shoots the basketball, or it requires that the shooter almost constantly interact with a tracking device (e.g., a smart phone, smart watch, or equivalent) while taking shots. Both of these approaches are too obtrusive and typically interfere with and reduce the progress and benefits of shooting drills. Therefore, there is a need for a basketball shot-tracking product and system that collects and processes shooting data unobtrusively, without interfering with the shooter's workout routine, and that also provides a convenient and efficient way for the shooter to subsequently review the data, assess his or her progress over time, and share the shot statistics and progress information with other interested parties.

BRIEF SUMMARY OF EXEMPLARY EMBODIMENTS OF THE INVENTION

The present invention addresses this need by providing a basketball shot-tracking system comprising a wireless wrist tracker, a wireless net tracker, and a shot-tracking mobile app. The shot-tracking mobile app is configured to execute on a wireless mobile device, such as a smart phone, smart watch, handheld electronic personal information management system, tablet computer, or personal computer or laptop. The wireless wrist tracker, which is worn on the wrist or arm of a basketball player, includes a computer processing unit (CPU), a set of computer-executable program instructions, one or more sensors, including, for example, an accelerometer, a gyroscope and/or a barometric pressure sensor, one or more "player shot data profiles" (also referred to as "shot-attempt profiles") stored in the wrist tracker's memory, and a radio transmitter. The player shot data profiles represent the typical movements of a shooter's wrist or arm while the shooter takes shots at the basketball hoop during a typical shooting drill, workout, game or other competition. The wrist tracker program instructions are operable with the sensors, the player shot data profiles, and the CPU to automatically detect shot attempts at the basket by comparing and matching the actual movements of the shooter's wrist or arm (as detected by the sensors) with the movements of the wrist or arm of a typical basketball player during a shot attempt as reflected in the one or more player shot data profiles stored in the wrist tracker's memory.

The wireless net tracker also includes a CPU, another set of computer-executable program instructions, one or more additional sensors such as another accelerometer, one or more "made-shot profiles" stored in the net tracker's memory, and a radio transmitter. The made-shot profiles represent the typical perturbations of the basketball net attached to the rim of a basketball hoop when a shot is made during a typical shooting drill, workout, game, or other competition. The program instructions in the net tracker are operable with the CPU, the made-shot profiles, and the accelerometer to automatically detect a basketball passing through the rim and the net of the basketball hoop. More specifically, the wireless net tracker determines whether a shot has been made by comparing the actual perturbations of the net with the typical perturbations of the net when a shot is made as reflected in the one or more made-shot profiles stored in the net tracker's memory.

In some embodiments, the memory storage area of the net tracker also contains one or more "rim bounce profiles" representing the typical perturbations of the net when a shot hits the basketball hoop's rim and/or backboard and does not pass through the net (i.e., a missed shot that is not an "air ball"). In these embodiments, the program instructions in the net tracker are further operable with the CPU, the rim bounce profiles, and the accelerometer to detect missed shots that hit and bounce off of the basketball hoop's rim and/or backboard (i.e., close or very close missed shots) by comparing the actual perturbations of the net with typical perturbations of the net on typical close shots as reflected in the rim bounce profiles.

Although individual basketball players tend to consistently move their wrists and arms through substantially the same motions during shots, one basketball player's shooting form (i.e., sequence of shooting motions) may be substantially different from another basketball player's shooting form. For this reason, preferred embodiments of the basketball shot-tracking system of the present invention may include training and tuning modes, whereby a user can train and tune the system, thereby creating player shot data profiles that more accurately reflect the user's typical wrist and arm movements during a shot attempt. Similarly, because some basketball hoop nets and rims are tighter (or looser) than others, preferred embodiments of the present invention may also permit users to tune the made shot and rim bounce algorithms and/or to create and store made-shot profiles and rim bounce profiles that more accurately correspond to the typical perturbations of the net and/or rim on a particular basketball hoop when shots are made or bounced off of the rim or backboard.

To this end, an embodiment of a wrist tracker includes a motion sensor; a microprocessor which receives motion data generated by the motion sensor; computer memory; a transmitter; and a motion-processing application which executes on the microprocessor. The microprocessor analyzes the motion data and then stores a qualified portion of the motion data in the computer memory. In particular, the qualified portion of the motion data is data that has been generated by the motion processor over a continuous period of time that lasts for more than a predetermined minimum period of time (e.g., which has been empirically predetermined to be necessary for a basketball player to take a shot) and that has been generated while the player's arm is in a potential shooting position (e.g., as determined by angle of inclination of the player's arm relative to horizontal). The microprocessor then compares the qualified portion of the motion data to player shot data profiles that have been previously stored in the computer memory—e.g., by the player having previously trained or tuned the device—where each of the player shot data profiles has data that is representative of how the player's shooting arm moves when the player attempts to make a shot for one of various different types of basketball shots. Based on that comparison, the microprocessor determines whether the player has made a shot-attempt of any of the different types of basketball shots and, if so, the wrist tracker sends a shot-attempt event message to the wireless mobile device.

In preferred embodiments, the motion sensor measures and outputs acceleration values $Ax$, $Ay$, and $Az$ along three mutually orthogonal axes, and it also outputs information, in terms of quaternion values, as to the angular orientation of the motion sensor in space. The microprocessor uses the quaternion values to determine the gravitational components $Gx$, $Gy$, and $Gz$ of the acceleration values $Ax$, $Ay$, and $Az$, respectively, and it is the $Gx$, $Gy$, and $Gz$ values, in particular, that may be compared to corresponding values within the player shot data profiles to identify whether a shot-attempt has been made, since the gravitational components of acceleration are most strongly indicative of the player's arm position, and hence motion, as the player shoots the ball. Suitably, the microprocessor smoothes the incoming motion sensor data using a filter or a pseudo-filter, such as by processing the data with a multiple-point-in-time moving averages process—e.g., one that calculates the average value of a given parameter at a point in time, an immediately previous point in time, and an immediately subsequent point in time.

Furthermore, to create the player shot data profiles, a player makes a series of training shots of a given type while the wrist tracker is recording data. For each of the training shots, the microprocessor analyzes the motion data generated by the sensor and then stores a qualified portion of it in the computer memory. The microprocessor analyzes that stored data to identify within it motion data that is indicative of a basketball shot having been taken and the point in time at which the basketball shot was taken. For example, a point of maximum jerk—which is defined as the square root of the sum of the squares of the acceleration values $Ax$, $Ay$, and $Az$—can be used to identify the point in time at which the shot was taken. The microprocessor then stores in the computer memory a window's worth of shot-taken data, which shot-taken data is data that has been extracted from the qualified portion of data that has been stored, but that is taken from within a smaller time window of predetermined duration (e.g., 0.6 second) that is centered around the point in time at which the basketball shot was taken. The microprocessor then averages together the shot-taken data from all of the training shots within the series, on a time-increment-by-time-increment and parameter-by-parameter basis, and then stores the so-averaged data values to yield a player shot data profile for the player for basketball shots of the given shot-type. This process can be repeated for multiple types of shots, e.g., jump shots, hook shots, layups, etc., to build a "library" of personal shot data profiles for the player.

The wrist and net trackers determine events, such as shot-attempt events, made-shot events, and rim-bounce events, and uses their internal radio transmitters to asynchronously transmit these events to the shot-tracking mobile app running on the wireless mobile device. The shot-tracking mobile app includes program instructions that, when executed by the CPU of the wireless mobile device, causes the wireless mobile device to automatically receive and process the asynchronous event data as the data are received from the wrist and net trackers, and to automatically determine the shooter's shooting statistics (e.g., total shots taken, total shots made, total shots missed, shot percentage, total time shooting, shot locations, shooting history, shooting record, total points, shooting progress, skill level, etc.). These shot statistics may be saved by the shot-tracking mobile app to the memory of the wireless mobile device. The program instructions in the shot-tracking mobile app may also be configured to cause the CPU on the wireless mobile device to continuously update the shot statistics in memory and to continuously display the updated statistics on the screen of the mobile device in real time as shots are taken, made or missed. Preferably, the shot-tracking mobile app is also configured to receive shot attempt and signal strength data from one or more shot location trackers positioned on or near the basket or basketball court, and to automatically determine the locations of the shooter on the basketball court (or relative to the basket) during the shooter's shot attempts.

In some embodiments, the programming instructions in the shot-tracking mobile application are further configured to automatically detect whether a connection to a wide area network, such as the Internet, is currently available, and to automatically upload the tracked basketball shot statistics to one or more remote online shot-tracking servers connected to the wide area network. The programming instructions in the shot-tracking mobile app may also be configured to receive from the online shot-tracking server the shot statistics of other basketball players, and/or to manage and distribute the shot statistic information so as to permit multiple basketball shooters (who may or may not be on the same basketball court at the same time) to challenge and engage each other in shooting skill competitions, such as virtual games of "H-O-R-S-E," for example. With embodiments of the present invention, players can share their shot statistics data and shooting workouts with other players, as well as organizations such as a professional or school basketball team. In preferred embodiments, coaches can access the remote online server and submit requests to see a particular player's shooting data and or add players to his or her own basketball team roster.

The shot-tracking mobile app may also be configured to send shot statistics to a "smart scoreboard" for display to an audience of basketball game spectators, thereby eliminating the need for (and/or reducing reliance on) a very expensive conventional electronic scoreboard at basketball games and a human scorekeeper to operate the electronic scoreboard. In addition, the shot-tracking mobile app and/or the remote online shot-tracking server may be configured to transmit shot statistics to authorized remote mobile devices in real time so that fans, friends, parents and other relatives and supporters can view and monitor a player's progress and/or game time shot statistics from remote locations.

BRIEF DESCRIPTION OF THE FIGURES

FIG. 3 contains a block diagram depicting some of the major physical components of the wrist-tracking device that could be used in one exemplary embodiment of the present invention.

FIG. 5A shows a schematic diagram illustrating by way of example typical wrist positions and vertical (Z-axis) acceleration values during a typical shot attempt.

FIG. 5B contains a graph for a shot-attempt profile, the graph and profile illustrating the relationships between the barometric pressure, magnitude of acceleration (all axes) and magnitude of acceleration (Z-axis only) detected by the sensors in the wrist tracker during a typical shot attempt.

FIG. 6 shows a high-level flow diagram illustrating, in accordance with one embodiment of the present invention, the steps performed by the CPU in the wrist tracker in order to determine whether an actual acceleration pattern of a basketball player's wrist over time matches a predetermined shot-attempt profile, thereby indicating that a shot-attempt event message should be transmitted to the smart phone.

FIGS. 7A and 7B show, respectively, acceleration profiles for hard dribbles and caught passes, which profiles could be used in some embodiments of the present invention to filter out wrist movements associated with dribbling and catching passes in order to reduce the number of false positives recorded by the shot-attempt algorithm used in the wrist tracker to determine whether a shot-attempt event has occurred.

FIG. 8 contains a block diagram depicting some of the major physical components of the net-tracking device that could be used in one exemplary embodiment of the present invention.

FIGS. 10A and 10B show, respectively, a graph of the typical net perturbations caused by a basketball passing through the net without touching the rim (i.e., a "swish shot"), and a graph of the net perturbations caused by a basketball bouncing off of the rim of a basketball hoop without passing through the net (i.e., a missed shot).

FIG. 11A shows an example of a graph of an acceleration profile indicating the typical acceleration pattern (magnitude of acceleration verses time) of the net when a shot is made between times $T_1$ and $T_2$.

FIG. 11B shows an example of a graph for the actual acceleration pattern of the net as detected by the sensor in the net tracker of the present invention when a shot is made between times $T_3$ and $T_4$. FIG. 11B also shows an example of a graph of an actual acceleration pattern of the net as detected by the accelerometer sensor in the net tracker of the present invention when a basketball bounces off of the rim between times $T_1$ and $T_2$ without passing through the net.

FIG. 12 shows a flow diagram illustrating an exemplary computer-implemented algorithm executed by a central processing unit (CPU) of a net tracker configured in accordance with one embodiment of the present invention to determine whether a made-shot event or a rim-bounce event has occurred at the net.

FIG. 13 shows a flow diagram illustrating an exemplary computer-implemented subroutine of the algorithm illustrated in FIG. 12, the subroutine containing program instructions configured to determine whether the actual perturbations of the net match the typical perturbations of the net when a shot is made as reflected in a made shot profile stored in the net tracker's memory.

FIG. 14 shows a high-level flow diagram illustrating the steps performed by the CPU of a smart phone or other wireless mobile device, in accordance with an exemplary embodiment of the present invention, to process incoming shot-attempt events, made-shot events, and rim-bounce events.

FIG. 15 contains a schematic diagram illustrating the structure and contents of a Bluetooth Low Energy (BLE) packet used in some embodiments of the present invention.

FIG. 16 shows a high-level flow diagram illustrating the steps performed by the processor of a smart phone or other wireless mobile device, in accordance with an exemplary embodiment of the present invention, to synchronize shot-statistics data stored in local memory with the shot-statistics data stored on a remote online server.

FIG. 25 shows a high-level flow diagram illustrating, in accordance with a second embodiment of the present invention, steps performed by the CPU in the wrist tracker in order to determine whether the wrist tracker is in a training mode, in which player shot data profiles for different types of shots are developed and stored within the wrist tracker, or in a normal or shooting mode, in which shot-attempt events are recognized and identified by the wrist tracker.

FIG. 26 shows a high-level flow diagram illustrating, in accordance with the second embodiment of the present invention, steps performed by the CPU in the wrist tracker in response to an incoming BLE message.

DETAILED DESCRIPTION OF EXEMPLARY EMBODIMENTS

Figure 1:
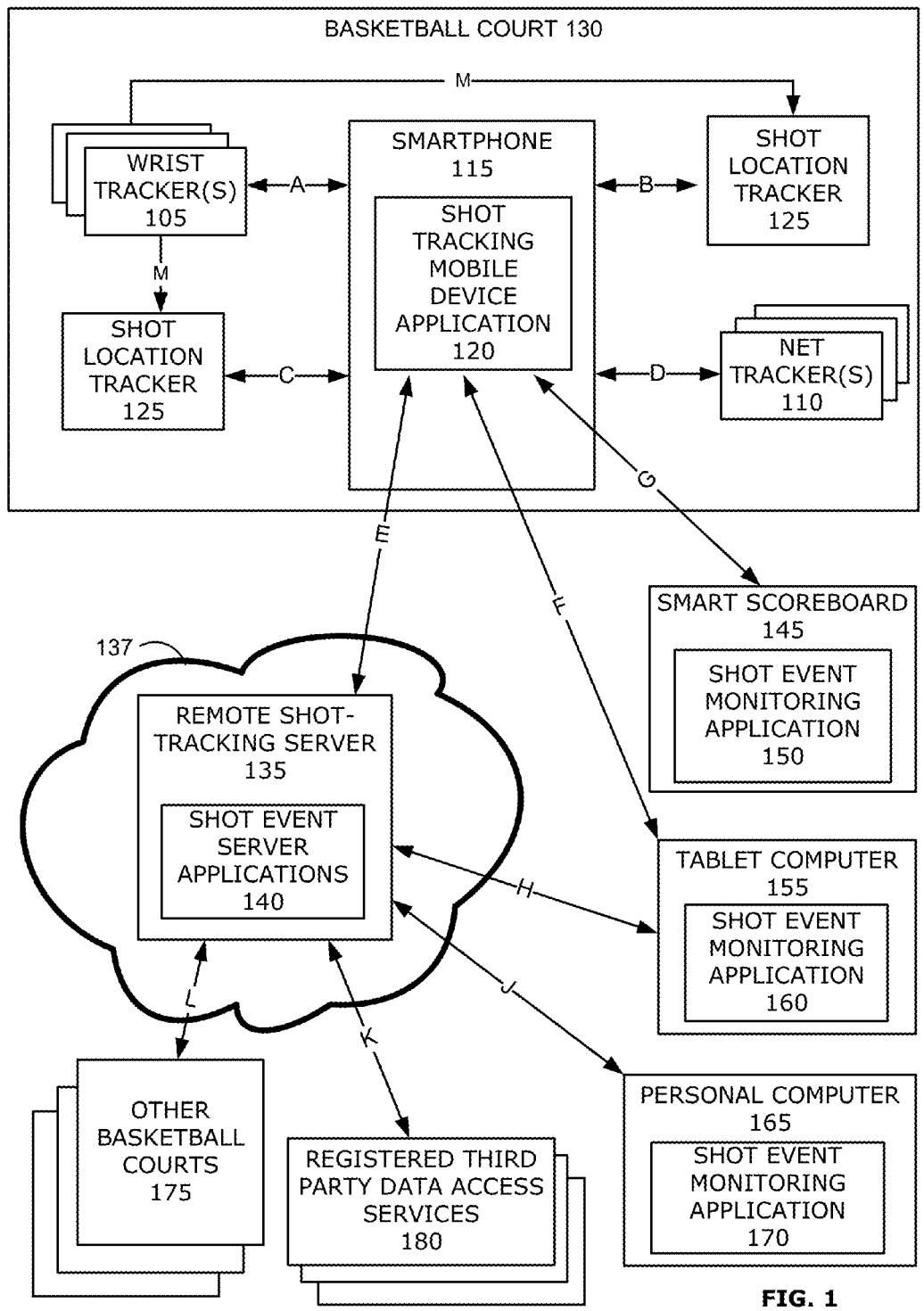
FIG. 1 shows a high-level block diagram illustrating the overall network architecture for a basketball shot-tracking system configured to operate in accordance with an exemplary embodiment of the present invention, wherein the network includes a smart phone, one or more wrist trackers, one or more net trackers, one or more shot location trackers, one or more tablet or personal computers, a smart scoreboard, and a remote shot-tracking server.
Figure 2:
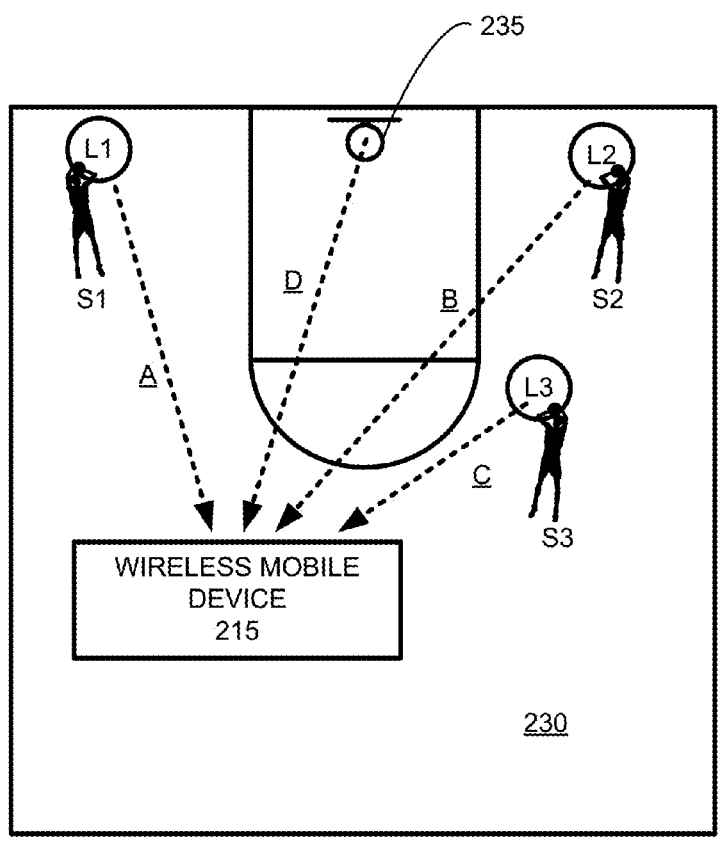
FIG. 2 contains a diagram illustrating by way of example the typical data communications channels established between the wireless mobile device (e.g., smart phone), the net-tracking component and the wrist tracker component in an exemplary embodiment of the present invention.

In this disclosure, the last two digits of each reference numeral identify a given component, element, or algorithm step, and the preceding one or two digits of each reference numeral correspond to the number of the figure in which the element or step is depicted. Thus, if a given element is shown in multiple figures, strictly speaking, the element will have different reference numerals in each of the several figures; however, the last two digits will be the same across all related figures being discussed at the same time in order to explain a particular concept or aspect of embodiments of the invention. For example, the same generalized computing device is depicted in FIGS. 1 and 2 as element number 115 and 215, respectively. If multiple figures are being addressed at the same time within this disclosure, just the reference numeral used in the lowest-numbered figure will be used in the text. Furthermore, different elements that are illustrated in different figures, which are discussed at different points within this disclosure, likely will have reference numerals in which the last two digits are the same; the fact that the elements are being discussed at different points in the disclosure should, however, prevent such commonality of the last two reference-numeral digits from causing confusion. Finally, some of the flow diagrams in this disclosure span multiple drawing sheets. See the flow diagrams depicted in FIGS. 28A-28F and FIGS. 29A-29C. In such cases, "flow chart connectors" are used to connect the diagrams and indicate how the system progresses from the flow diagram on one drawing sheet to the flow diagram of another drawing sheet. In particular, flow chart connector labels (e.g., "FC1") inside circular shapes indicate "incoming" flows, while flow chart connector labels inside pentagon-shaped object indicate "outgoing" flows.

System Overview

As illustrated in FIGS. 1 and 2, in a most-basic implementation, embodiments of a shot-tracking system according to the invention include a wrist-worn or arm-worn wrist tracker 105; a net tracker 110; and a computing device 115 that executes a shot-tracking program or application ("app") 120. In further embodiments, the shot-tracking system may also include one or more shot-location trackers 125, which may be used to identify the location on basketball court 130 from which a shot has been taken or, at the very least, the distance away from net 235 from which the shot was taken. As will be explained more fully below, the wrist-tracker 105 is configured to sense the motions of a player's arm/wrist and, once the wrist-tracker 105 has been "trained" or calibrated as described below, to differentiate between shots on the basketball net 235 actually attempted (e.g., jump-shots, layups, free-throws, hook-shots, etc.) and other motions commonly exhibited while playing basketball (e.g., dribbling, making a pass, catching a pass, blocking a shot, etc.). The net tracker 110, on the other hand, is attached to the basketball hoop's net and is configured to identify at the net 235 shot-attempts that have been successful (made shots), as well as to differentiate between successful shots on the basket—i.e., the basketball has passed completely through the hoop and attached netting—and unsuccessful shots on the basket.

The wrist tracker 105, which is battery-powered, is worn on or near the wrist of the shooter, and the net tracker 110 attaches to the back of the basketball net 110. The wrist tracker 105 may be inserted into a pocket on a wristband worn on the wrist of the shooter or the pocket of a larger garment that substantially covers the shooter's wrist, elbow, and upper arm, referred to as a shooting sleeve. Preferably, the wrist tracker, wristband, and/or shooting sleeve are configured so that the wrist tracker will be positioned on the outside forearm to avoid any interference with the hand during shooting, passing or dribbling. In one embodiment, the wrist tracker is disc shaped and can be aligned in any angular orientation. In other embodiments, the wrist tracker is tapered and blunted at one end so that it can only be inserted into the pocket of the wristband or shooting sleeve in a single orientation.

The shot-tracking app 120 tabulates actual shots that have been taken, including the location or distance from which each shot has been taken when shot-location tracking is included in a given embodiment, and correlates the shots taken with the corresponding success/failure information determined by the net tracker 110. In this manner, the shot-tracking system allows a player or his/her coach to keep track of how many shots the player takes from a given location or distance away from the net tracker(s) 110 and the player's accuracy from that location or distance. Such information, in turn, can be used to assess how much the player practices shooting from a given location or distance, or to identify the player's strengths and weaknesses, e.g., to use for strategizing player utilization during an actual game.

As further illustrated in FIGS. 1 and 2, in preferred embodiments of the invention, and as will be explained in greater detail below, the computing device 115 may be a portable device with wireless capabilities, e.g., a smart phone, a tablet computer, a laptop computer, etc., which is configured to send and receive data wirelessly using a Bluetooth and/or a WiFi protocol. Similarly, the wrist tracker 105, the net tracker 110, and, where included, the shot-location tracker(s) 125, are preferably configured to communicate wirelessly with the computing device 115 (designated 215 in FIG. 2) and, where required, with each other (as addressed below) via the same protocol or protocols.

When the wrist tracker 105 determines that the player has taken an actual shot at the basket, the wrist tracker 105 sends a message to the computing device 115 notifying the computing device of that fact and including in the message a time stamp associated with the shot. Similarly, when the net tracker 110 determines that a shot has been taken on the basket, it sends a message to the computing device 115 notifying the computing device of the shot event, along with a time stamp and information as to the success or failure of the shot. Such wireless communication between the tracker devices 105, 110 and the computing device 115 facilitates real-time tracking of the player's activities and success rates, and it maximizes the benefits and enjoyment associated with using a shot-tracking system according to the invention. In alternative embodiments, however, the wrist tracker 105 and the net tracker 110 could be configured to store and accumulate the shot-taken and success/failure data they each derive, and that stored data could be downloaded to the computing device 115 after some period of time via a direct connection (e.g., via Ethernet or USB cable).

As further indicated in FIG. 1, and as addressed further below in connection with subsequent figures, the shot-tracking system—in particular, the shot-tracking app 120—can be configured to accommodate multiple wrist trackers 105 being used by multiple players on the same basketball court 130 at a given time. That makes it possible, for example, for players to compete against each other in shooting competitions with the shot-tracking system doing all of the tabulation and calculations. In addition, it permits a coach to keep track of who among multiple players is performing well and who is not performing well during an actual game. To make such a multiple-wrist-tracker deployment work, each wrist tracker 105 optionally includes player-identifying data in each message it sends upon detecting an actual shot being taken, and the shot-tracking app 120 keeps track of the data it receives on a player-by-player basis.

Alternatively or additionally, the shot-tracking system can be configured to accommodate multiple net trackers 110 being used on various baskets around the same basketball court 130—or even at different courts—at a given time, e.g., as in a practice gymnasium. This makes it possible, for example, for a whole team of players to practice shooting at different locations within the gym. To make such a multiple-net-tracker deployment work, each net tracker 110 optionally includes net-identifying data in each message it sends to the app 120 upon detecting a shot having been taken on the given net, and the shot-tracking app 120 keeps track of the data it receives on a net-by-net basis.

Wrist Tracker

As illustrated in FIG. 3, the wrist tracker 305 contains an accelerometer 310; a main CPU 315 running custom code 320; a radio component 325 for emitting event messages and receiving configuration commands; one or more shot-attempt profiles stored in FLASH memory; and a battery (not illustrated) for power. In a preferred embodiment of the wrist tracker 305, the accelerometer 310 is a chip-based inertial measurement unit such as the MPU-6050 motion-tracking device available from InvenSense Inc., of San Jose, Calif., which also includes gyroscopic sensing elements 335. This device measures and outputs acceleration X, Y, and Z in G's (1 G having an output value of 1000 in order to eliminate the need to carry a decimal point) in three mutually orthogonal directions relative to the sensor itself, and it measures rotational orientation of the sensor relative to Earth and outputs that information in terms of quaternion values. (Quaternion data is expressed with four values—Q1, Q2, Q3, and Q4—and identifies the location of a point on a spherical surface and the rotational/angular orientation relative to Earth of, for example, a set of three mutually orthogonal axes having their origin at that point. Of the quaternion data, it is the angular-orientation information that is used in the shot-identifying algorithms explained below.) Optionally, the wrist tracker may also include a highly sensitive barometric pressure sensor 340 for sensing pressure fluctuations associated with changes in position (i.e., altitude) of the player's arm or wrist as he or she executes an arm movement, as well as one or more status light-emitting diodes (LEDs, not illustrated).

Once awoken, the CPU 315 executes program code from two separate portions of FLASH memory. In one portion 345 of FLASH memory, the program code contains the instructions that define the Bluetooth Low Energy protocol implementation (called "the stack") that moves messages between the wrist tracker's memory and the shot-tracking mobile app executing on the wireless mobile device (e.g., smart phone). The other portion 350 of the FLASH memory contains custom code that analyzes the data arriving from the sensors in real time and that, upon a qualified match being made with a previously created player shot data profile stored in FLASH memory causes a message to be transmitted to the wireless smart phone or other computing device that a "shot-attempt event" has occurred. This is referred to as the "shot-attempt algorithm," exemplary embodiments of which are shown and illustrated in FIG. 6 (addressed below) for one embodiment and in FIGS. 29A-29C (addressed even further below) for another embodiment.

When a shot-attempt event is detected by the wrist tracker 305, the wrist tracker 305 sends a BLE message (explained in greater detail below) to the shot-tracking mobile app indicating that "a shot attempt has been detected." This message also includes a timestamp that qualifies the shot-attempt event relative to a clock in the wireless smart phone and, optionally, a value indicating the "confidence level" that the wrist tracker algorithm has associated with the detected shot-attempt event.

After a period of inaction or upon command from the smart phone, the wrist tracker shuts itself off to save battery power. An additional circuit and manufacturer-supplied algorithm estimates the remaining battery capacity for the wrist tracker and provides that information in response to a standard protocol query over the radio frequency communication established with the shot-tracking mobile app running on the smart phone. This allows the smart phone app to take action when the wrist tracker reaches some arbitrary threshold, say 80% battery power remaining, and either alert the user through the display screen on the wireless mobile device or a web dashboard or automatically cause a replacement battery to be delivered to the user via postal mail.

The shot-attempt algorithm in the wrist tracker implements a series of steps arranged to compare sensor data received over a predetermined period of time with predetermined thresholds indicative of a shot attempt by a shooter. As is the case with respect to many devices that rely on mathematical functions to operate, data thresholds and time periods in the shot-attempt algorithm according to the present invention are adjustable, thereby permitting the outcome of the algorithm to be adjusted to account for differences in form between shooters as well as differences in form between different classes of shooters. For example, it has been observed that very young basketball players tend to hold the ball at a much lower starting position (such as in front of their faces or chests or even stomachs) just before shooting; they often use both hands to push the ball toward the basket during a shot; and they tend to jump into the air, if they jump at all, only after the wrist and arm shooting motions have already begun. Therefore, the wrist and arm motions exhibited by a younger player just before, during, and after a shot attempt is likely to be substantially different from the wrist and arm motions exhibited by an older, stronger basketball player, who will be much more likely to hold the ball over his or her head during a "jump shot;" much more likely to push the ball toward the basket with one hand (and use the other hand only to balance the ball); and much more likely to jump into the air before beginning the wrist and arm motions required to shoot the ball. Therefore, to accommodate such differences in shooting motions and form, embodiments of the present invention may be configured to permit the user to select thresholds and time periods that are most appropriate for the class of player.

Figure 4A:
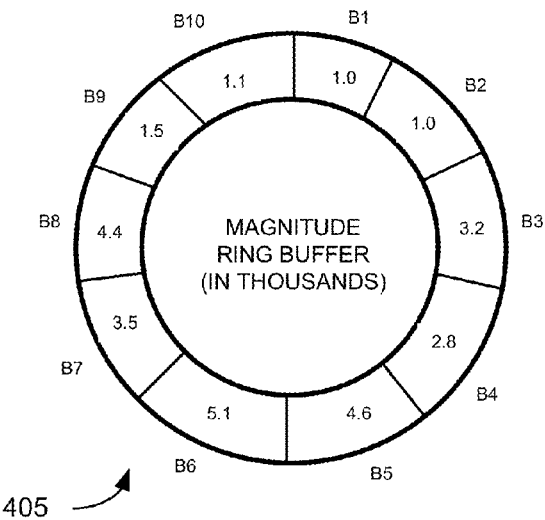
FIGS. 4A, 4B, and 4C show, respectively, a magnitude ring buffer used in an exemplary embodiment of the present invention to store values representing the magnitude of acceleration of the shooter's wrist over time, a Z-axis ring buffer used in an exemplary embodiment of the present invention to store values representing the magnitude of acceleration of the shooter's wrist along the vertical (Z) axis over time, and a pressure values ring buffer used in an exemplary embodiment of the present invention to store values representing the altitude of the shooter's wrist over time.
Figure 4B:
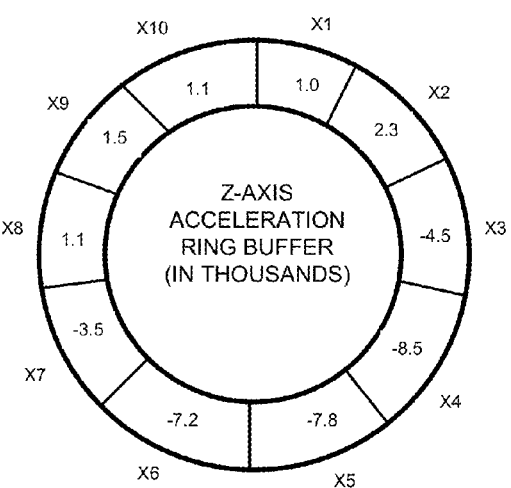
Figure 4C:
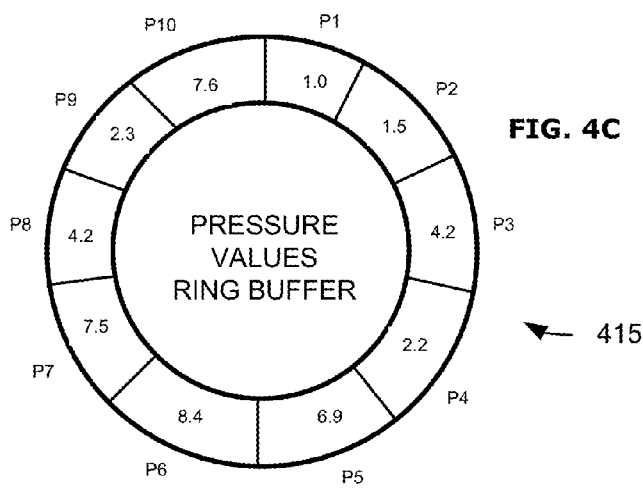

As alluded to above, the shot-attempt algorithm compares motion data accumulated over a brief window of time to various shot-attempt profiles (e.g., jump-shots, layups, free-throws, hook-shots, etc.) that have been generated and stored previously. Accordingly, the device and its algorithms utilize buffers to store and process the data. For example, FIGS. 4A, 4B and 4C show, respectively, a magnitude ring buffer 405 that may be used in one exemplary embodiment of the present invention to store values representing the magnitude of acceleration of the shooter's wrist over time; a Z-axis ring buffer 410 used in an exemplary embodiment of the present invention to store values representing the magnitude of acceleration of the shooter's wrist along the Z-axis over time; and a pressure values ring buffer 415 used to store values representing the altitude of the shooter's wrist over time. (In this particular embodiment, the Z-axis is oriented along the shooter's forearm and has a value of positive 1 g (i.e., +1000 units as output by the sensor) when the player's arm is pointed straight down and a value of −1 g (i.e., −1000 units) when the player's arm is pointing straight up.)

The operation of the sensing algorithms in the wrist tracker relies on predetermined thresholds and typical patterns of motion for shot attempts, as reflected in the shot-attempt profiles. The shot-attempt profiles may be created, for example, by attaching sensors to basketball shooters' wrists, and then observing and plotting the motions associated with a multiplicity of shot attempts. This exercise produces a wealth of data from which the typical accelerations associated with the wrists during shot attempts can be thoroughly understood and the profiles can be developed. In this connection, FIG. 5A shows a schematic diagram illustrating by way of example typical wrist positions and Z-axis acceleration values (i.e., along the forearm in this embodiment) observed during a typical shot attempt. FIG. 5B contains a graph for a shot-attempt profile, with the graph illustrating simultaneously the time-varying magnitude M of total acceleration (i.e., the square root of the sum of the squares of accelerations along each of the X-, Y-, and Z-axes); the magnitude Z of acceleration along the Z-axis only; and barometric pressure P detected by the sensors in the wrist tracker during a typical shot attempt.

FIG. 6 shows a high-level flow diagram 600 illustrating, in accordance with one embodiment of the present invention, the steps performed by the CPU in the wrist tracker in order to determine whether an actual acceleration pattern of a basketball player's wrist over time matches a predetermined shot-attempt profile, thereby indicating that a shot-attempt event message should be transmitted to the smart phone. During "live" operation of the wrist tracker—i.e., after shot-attempt profiles have been created for various types of shots at the basket (hook shot, jump shot, layup, etc.) and stored in memory in the device—the algorithm is executed at a rate of one hundred cycles per second.

As illustrated in FIG. 6, in each iteration of the algorithm, acceleration along the X-, Y-, and Z-axes is read from the wrist tracker sensor at step 605, as is barometric pressure. The total magnitude M of acceleration is then calculated at step 610 as the square root of the sum of the squares of each of the X-, Y-, and Z-axis accelerations:

$$M=\sqrt{(X^2+Y^2+Z^2)}.$$

In this embodiment, which utilizes ring buffers, the magnitude of the total acceleration M, the magnitude of acceleration along the Z-axis, and barometric pressure P are then stored in the next successive positions of respective ring buffers 405, 410, and 415 at step 615.

At decision step 620, the algorithm evaluates, as a predicate or "gate-keeping" test, whether acceleration Z along the Z-axis is less than a pre-determined threshold value that is indicative of the player's arm being raised to take an actual shot at the net, and it does so for a point in time that is, for example, one half second earlier (i.e., T-50, where T is incremented by hundredths of a second). For example, as shown in FIG. 5A, when the player's arm is raised and is located within the upper sector 505 defined by dashed lines 510 and 515, which are inclined at approximately 44.4° relative to horizontal, the wrist sensor 520 will experience 1 g of gravitational acceleration directed toward Earth, and it will measure and output a component of that gravitational acceleration directed along the Z-axis that ranges from −700 to a minimum value of −1000 when the player's arm is straight overhead. (In this regard, it should be recalled that the accelerometer output is scaled such that a value of 1 g sensed acceleration is output as 1000 units—positive being toward the player's fingertips and negative being toward the player's body—and it should be noted that −700 is equal to −1000 times the sine of the 44.4° angle of inclination relative to horizontal of the dashed lines 510 and 515.)

Thus, based on the predicate assumption that an actual shot will be taken with the player's shooting arm located somewhere within the upper sector 505, the algorithm first checks at step 620 to see whether the value Z of acceleration along the sensor's Z-axis is less than or equal to the pre-determined threshold value, e.g., −700, and it does so for a point in time that is a predetermined period of time (e.g., one half second) prior to the point in time at which the algorithm makes that check. If the initial threshold value of the Z-axis acceleration does not exceed the predetermined threshold (i.e., Z is greater than −700), then the algorithm returns along branch 625 to begin another processing iteration. On the other hand, if the initial threshold value of the Z-axis acceleration does exceed the predetermined threshold (i.e., Z is less than or equal to −700), then the algorithm proceeds along branch 630 to decision step 635.

At decision step 635, the algorithm evaluates whether the magnitude M of total acceleration exceeds a predetermined threshold value, which is, for example, 4 g's as identified in FIG. 5B as the "Impulse Threshold." (In this context, the term "impulse" refers to a sudden, relatively large value of acceleration; that is in contrast to strict usage of the term "impulse" as referring to the product of force times time.) Additionally, the algorithm tabulates (i.e., sums) the values of total acceleration magnitude M for each of the points in time over a preceding window of time (e.g., half a second) corresponding to an empirically determined "shooting window," and it (the algorithm) evaluates whether this tabulated value Σ exceeds another predetermined threshold value. (This check helps to "filter out" brief, unsustained motions such as pump-fakes that might look superficially like an actual shot at the net but that are not.) Further still, the algorithm checks whether barometric pressure P exceeds a predetermined pressure threshold for at least a predetermined period of time. If any of the parameters fails to exceed its corresponding threshold value, it is considered that an actual shot at the net has not been taken, and the algorithm returns along branch 640 to begin another processing iteration. On the other hand, if all three parameters exceed their associated threshold values, then a data packet is sent to the smart phone or other computing device at step 645 to indicate that a shot-attempt event has occurred. Additional details concerning the content of the data packet are provided with the discussion of FIG. 15 below.

In some embodiments of the present invention, it will also be necessary or desirable to identify patterns of motion associated with other frequent motions of the wrist while playing basketball and to filter those patterns out so as to avoid those patterns being identified as shot attempts. To this end, FIGS. 7A and 7B show, respectively, acceleration profiles for hard dribbles and caught passes, which profiles could be used in some embodiments of the present invention to filter out wrist movements associated with dribbling and catching passes in order to reduce the number of false positives identified by the shot-attempt-identifying algorithm used in the wrist tracker. Thus, "dribble rejection" code can be added to the wrist-tracking algorithms, the code having program instructions that look for a significant local minimum, below 1 g, for example (see the A event in FIG. 7A), that precedes a high magnitude*time of a dribble (B events in FIG. 7A). (Such a profile would correspond to the player's hand/wrist rising (low-g) and then pushing downward quickly as he or she dribbles the ball.) This approach is convenient because dribbling is always up and down by definition. It should be understood, however, that such filtering code is an optional function, which may or may not be necessary or useful depending on the circumstances.

Similarly, programming instructions to reject pass-catching patterns as shot attempts may also be added to the code executed by the CPU in the wrist tracker. These instructions may be configured to rely, for example, on the fact that the slope of the acceleration magnitude value is relatively steep (see event A in FIG. 7B) when the basketball impacts the player's hand, and it is much more pronounced than the damped acceleration that the player could make merely using his or her own muscle-tendon system.

Further still, the shot-tracking mobile app on the wireless mobile device may even be configured to query the user and, based on the replies to the queries, adjust the thresholds and time periods used by the shot-attempt algorithm to better conform to the wrist and arm motions that are typical for that particular player or that particular class of player. In some embodiments, the thresholds, predetermined time periods, and shot-attempt profiles used by the shot-attempt algorithm in the wrist tracker may also be selected or tuned by operating one or more switches located on the wrist tracker itself.

Net Tracker

As noted above, the shot-tracking app tabulates actual shots that have been taken and correlates the shots taken with the corresponding success/failure information determined by the net tracker. Thus, the net tracker operates "side-by-side" with the wrist tracker to provide optimal benefit of the shot-tracking system of the invention. In other words, the wrist tracker might be used by itself simply to keep track of the number of shots taken (including of different types) and, if location-tracking is provided with the system, the shot-distance or shot-location; however, it is the net tracker that determines whether a given shot actually was successful—not just attempted—and knowing that will help a player or his/her coach assess where more practice is in order.

The net tracker device is designed to be attached to one or more basketball nets and to uniquely detect the motion of the net when a basketball passes through the net and to reject other motions of the net or rim due to the ball striking them or due to other interactions between the net and its surroundings. The algorithm in the net tracker device processes the motion data detected by the accelerometer in real time to detect whether the pattern of motion over a predetermined time period matches a predetermined motion pattern for a made shot (i.e., the "made-shot profile").

The algorithms that are applied to the data produced by the motion sensor in the net tracker (which in this case is a three-axis accelerometer) are dynamically tunable so that adjustments can be made for different frequency responses and physical variations of the nets and rims and still determine with a high degree of fidelity when shots are made without generating an unacceptably high number of false positives (erroneous made-shot events when the basketball has not actually passed through the net). Furthermore, operation of the sensing algorithms for the net tracker depends on predetermined thresholds and typical patterns of motion for the net on rim-bounces and made shots, as reflected in the rim-bounce and made-shot profiles stored in the net tracker. The rim-bounce and made-shot profiles may be created, for example, by attaching sensors to nets and then observing and plotting the motions associated with a multiplicity of rim-bounces and made shots. This exercise produces a wealth of data from which the typical accelerations of the nets can be thoroughly understood and the profiles can be created.

In general, the net tracker hardware may be substantially the same as the wrist tracker hardware, except that net tracker hardware typically does not include a barometric pressure sensor for sensing changes in altitude. On the other hand, the net tracker employs a different algorithm for detecting made shots and rim-bounces In preferred embodiments, the net tracker may be activated (awakened) by a perturbation of the net detected by the accelerometer. However, the net tracker may also be activated by a manually-operated "ON-OFF" switch. Like the shot-attempt algorithm, the made-shot algorithm in the net tracker uses tunable, predetermined time periods, thresholds, and profiles (referred to as "made-shot" and "rim-bounce" profiles) to determine when made-shot events and rim-bounce events have occurred. (Made-shot events and rim-bounce events may be referred to collectively as "net events.")

As shown in FIG. 8, the net tracker 805 includes an embedded CPU 810 with a real-time operating system, both of which are configured to acquire and process data produced by the accelerometer sensor in real time. Similar to the wrist tracker, the net tracker 805 contains the main CPU 810, which runs custom code 815; an accelerometer 820; a radio component 825 for emitting event messages and receiving configuration commands; one or more made-shot and rim-bounce profiles stored in FLASH memory; and a battery (not illustrated) for power. In a preferred embodiment of the net tracker 805, the accelerometer 820 may be the same chip-based inertial measurement unit as that used in the wrist tracker, i.e, the LIS331HH motion-tracking device available from STMicroelectronics of, for example, Coppell, Tex. As noted above, that device measures and outputs acceleration X, Y, and Z in g's (1 g having an output value of 1000) in three mutually orthogonal directions relative to the sensor itself (In contrast to the wrist tracker, rotational orientation information from the device is not used in connection with the net tracker.)

Once awoken, the CPU 810 executes program code from two separate portions of FLASH memory. In one portion 835 of FLASH memory, the program code contains the instructions that define the Bluetooth Low Energy protocol implementation that moves messages between the net tracker's memory and the shot-tracking mobile app executing on the wireless mobile device. The other portion 840 of the FLASH memory contains custom code that analyzes the data arriving from the net tracker sensors in real time and that, upon a qualified match being made with a previously created made-shot event profile or rim-bounce event profile stored in FLASH memory, causes a message to be transmitted to the computing device indicating that a net event has been recognized and indicating whether the net event was a made-shot event or a rim-bounce event. This is referred to as the "made-shot algorithm," an exemplary embodiment of which is illustrated in FIGS. 10 and 11, addressed below.

When a net event is detected by the net tracker 805, the net tracker sends a BLE message to the shot-tracking mobile app indicating that "a made-shot event has been recognized" or that "a rim-bounce event has been recognized," as appropriate. This message also includes a timestamp that qualifies the net event relative to a clock in the wireless smart phone and, optionally, the message may include a value indicating the "confidence level" that the net tracker algorithm has associated with the detected net event.

After a period of inaction or upon command from the smart phone, the net tracker may shut itself off to save battery power. As is the case for the wrist tracker, an additional circuit and manufacturer-supplied algorithm can estimate the remaining battery capacity for the net tracker and provide that information in response to a standard protocol query over the radio frequency communication established with the shot-tracking mobile app running on the smart phone. This allows the smart phone app to take action when the net tracker reaches some arbitrary threshold, say 80% battery power remaining, and either alert the user through the display screen on the wireless mobile device or a web dashboard or automatically cause a replacement battery to be delivered to the user via postal mail.

Figure 9:
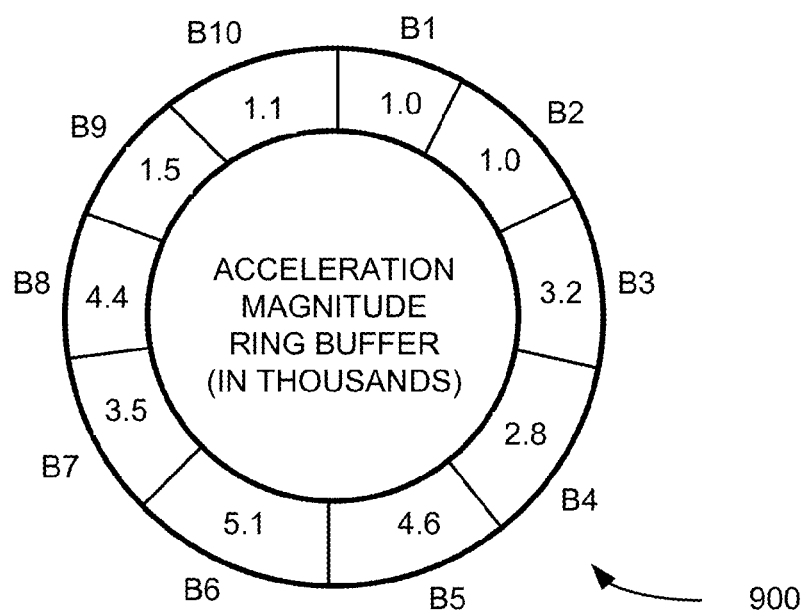
FIG. 9 contains a schematic diagram illustrating the structure and contents of a magnitude ring buffer used in an exemplary embodiment of the present invention to store values representing the magnitude of acceleration of the net over time as detected by the accelerometer sensor in the net tracker.

Like the shot-attempt algorithm, the made-shot algorithm compares motion data accumulated over a brief window of time to various net event profiles (e.g., made field goal, made layup, rim-bounce) that have been generated and stored previously. Accordingly, the net tracker and its algorithms utilize buffers to store and process the data. For example, FIG. 9 contains a schematic diagram illustrating the structure and contents of a magnitude ring buffer used in an exemplary embodiment of the present invention to store values representing the magnitude of acceleration of the net over time as detected by the accelerometer sensor in the net tracker.

The made-shot algorithm in the net tracker implements a series of steps arranged to compare sensor data received over a predetermined period of time with predetermined thresholds indicative of a net event. As is the case with respect to many devices that rely on mathematical functions to operate, data thresholds and time periods in the made-shot algorithm according to the present invention are adjustable, thereby permitting the outcome of the algorithm to be adjusted to account for differences in, for example, specific nets, rims, backboards, etc., as noted above.

FIG. 10A shows an example of a graph of the typical perturbation-associated acceleration caused by a basketball passing through the net without touching the rim (i.e., a "swish shot"). FIG. 10B, on the other hand, shows an example of a graph of the net perturbations caused by a basketball bouncing off of the rim of a basketball hoop without passing through the net (i.e., a missed shot). The difference between the two profiles is readily apparent, with the swish shot producing a more distinct or discrete event as the ball perturbs the net quickly as it passes through the net, and then internal friction within the strands of the net, friction between the strands of the net and the hoop mounting loops, and/or air resistance acting against the relatively light mass of the net act to bring the net back to rest fairly quickly. On the other hand, vibration caused by the ball bouncing off of the hoop and/or the backboard causes considerably longer-lasting motion of the net as the net is driven by the damped vibrations/oscillations or the significantly more rigid hoop/backboard, as is clearly visible in FIG. 10B.

Similarly, FIG. 11A shows an example of a graph of an acceleration profile indicating the typical acceleration pattern (magnitude of acceleration versus time) of the net when a shot is made between times $T_1$ and $T_2$. The made-shot profile of FIG. 11A may be stored in the memory of the net-tracking device for use by the net-tracking algorithm. In preferred embodiments, the default setting for the impulse threshold is 4G's; the default time period ($T_1$–$T_2$) is 100 ms; and the default sum for the made-shot threshold (essentially the area under the acceleration profile curve between times $T_1$ and $T_2$) is 2,000 G-ms. (As is the case with respect to the wrist tracker, the term "impulse" in connection with the net tracker refers to a sudden, relatively large value of acceleration; that is in contrast to strict usage of the term "impulse" as referring to the product of force times time.) However, all of these settings are adjustable.

FIG. 11B, on the other hand, shows an example of a graph for the actual acceleration pattern of the net as detected by the sensor in the net tracker of the present invention when a shot is made between times $T_3$ and $T_4$. In this case, motion of the net between times $T_1$ and $T_2$ corresponding to a preceding event such as players knocking the net as they challenge for the ball, a rim roll, etc., will be excluded from consideration by the 4G impulse threshold.

Suitably, the algorithm in the net tracker is implemented at a rate of one hundred cycles per second. Generally speaking, during each iteration, the algorithm looks for an acceleration magnitude threshold at some prior point in time, e.g., within the preceding 0.1 second of time. If the magnitude threshold is met, the algorithm then integrates the magnitude information forward through a predetermined window of time—essentially calculating the area under the acceleration profile curve as alluded to above—and, if this sum exceeds a second, made-shot threshold value, the algorithm concludes that a made-shot event has occurred.

Thus, as illustrated in FIGS. 12 and 13, during each iteration of the algorithm, acceleration of the net tracker accelerometer along the X-, Y-, and Z-axes is read from the net tracker sensor at step 1205, and the total magnitude M of acceleration is then calculated at step 1210 as the square root of the sum of the squares of each of the X-, Y-, and Z-axis accelerations:

$$M=\sqrt{(X^2+Y^2+Z^2)}.$$

In this embodiment, which utilizes ring buffers, the magnitude of the total acceleration M is then stored in the next successive position of magnitude ring buffer (MRB) 900 (FIG. 9), as indicated at step 1215.

Next, at step 1220, the algorithm implements the net tracker pattern-matching algorithm, which is shown in greater detail in FIG. 13. As shown in FIG. 13, the impulse threshold (e.g., 4g's as noted above) and the made-shot integral threshold (e.g., 2,000 g-ms as noted above) are established (step 1325) by, for example, executing a program instruction to retrieve a pre-determined value from memory or, alternatively, by executing a program instruction that assigns a numeric value to the appropriate variable, e.g., "set impulse_threshold=4.0". Then, at decision step 1330, the algorithm evaluates whether the magnitude M stored in the ring buffer position corresponding to a predetermined number of time intervals beforehand (e.g., 10 time intervals, i.e, "Now—10" as indicated in the flowchart) meets or exceeds the pre-established impulse threshold. If it does not, the algorithm proceeds along branch 1335 to return a value of No Match Made (Match="No") at step 1350, indicating that the current net acceleration pattern does not match the pattern for a made shot, and then to exit the pattern-matching algorithm and return to the main flow of the algorithm illustrated in FIG. 12.

On the other hand, if the magnitude M meets or exceeds the impulse threshold, the algorithm sums the acceleration magnitude value M for each of the preceding predetermined number of points in time (e.g., 10, as noted above) as well as the acceleration magnitude M for the current point in time, at step 1340. If that summed value does not meet the made-shot threshold (e.g., 2000 g-ms, as noted above), then the subroutine proceeds along branch 1345 to return a value of No Shot Made (Match="No"), again indicating that the current net acceleration pattern does not match the pattern for a made shot at step 1350, to the main part of the subroutine. On the other hand, if the summed value meets or exceed the made-shot threshold, then the subroutine proceeds along branch 1355 to return a value of Shot Made (Match="Yes"), at step 1360, to the main part of the subroutine.

At step 1270, the Match value is checked. If no shot was made, the algorithm waits for one time period (e.g., 10 microseconds, or one one-hundredth of a second when running at 100 cycles per second); increments the time value; and then returns to the beginning of the algorithm, as shown at step 1275. On the other hand, if a shot was, in fact, made, the algorithm will cause a shot-made event code to be transmitted to the computing device (e.g., smart phone) at step 1280 before waiting for one time period; incrementing the time value; and returning to the beginning of the algorithm, as shown at step 1275.

To minimize processing time during execution of this algorithm (which may be done for the wrist tracker, too, if desired), the three components read from the accelerometer are converted for scale into one floating point signed integer and then squared in that data format to make use of the hardware multiplier in the core. A final floating point square root is taken to obtain the magnitude though that has the potential to be hand-coded as an iterative integer square root in the future.

```
//Sets G-level (24 fullscale range)/(2^16bits)
//(about 1/2731) then *1000 to save multiplies
#define SCALE ((12.0f*2.0f*1000.0f)/65536.0f)
xaccel=(int16_t)(SCALE*vals [0]);
yaccel=(int16_t)(SCALE*vals[1]);
zaccel=(int16_t)(SCALE*vals[2]);
Mag[dest_idx]=(uint16_t)
    sqrt(xaccel*xaccel+yaccel*yaccel+zaccel*zaccel);
```

Because a timestamp is embedded in the BLE message, it is not necessary to process the data in real-time. By analyzing buffered data in prior time there is no need to keep a running state (or fraction thereof). Although it may seem like this causes lag in the messaging system the embedded timestamp is adjusted backward for the processing window width. This dramatically simplifies code complexity.

Shot-Tracking Mobile App

As noted above, the shot-tracking app tabulates actual shots that have been taken—including the location or distance from which each shot has been taken when shot-location tracking is included in a given embodiment, as addressed more fully below—and correlates the shots taken with the corresponding success/failure information determined by the net tracker. The shot-tracking application is configured to run on a computer system, which may be a wireless computer device such as a smart phone, smart watch, tablet, or laptop computer system, or any other computer device suitable for use on or near a basketball court. Although a handheld wireless device is preferred for convenience, the computer system may also comprise a wired or wireless desktop computer system configured to receive transmissions from the wrist trackers and net trackers (and potential shot location sensors) being used on a basketball court. The basketball court could be located in an arena, a gym, a driveway, a backyard, or any other place where wired or wireless computers could be used in conjunction with radio frequency (RF) transmitters embedded in the net tracker, wrist tracker, and shot potential location tracker devices. While the BLE transmission protocol is the current preferred wireless communication protocol, it will be understood and appreciated by those skilled in the art that, depending on the particular environment, any one of many other suitable wireless communication protocols, such as WI-FI or Bluetooth 4.0, could be used without departing from the scope of the invention. Wired communication channels such as Ethernet, USB, and mini-USB cables could also be used to transmit shot data between the devices for offline, non-real-time processing.

In general, when the mobile app receives a signal from the wrist tracker indicating a shot-attempt event, the mobile app will store that event in memory and wait a configurable amount of time for a transmission from a net tracker indicating that a net event (made shot or rim-bounce) has occurred. Thus, the mobile app will use the shot-attempt event data received from the wrist tracker to record the fact that a shot attempt occurred at time $T_1$ and it will also use the net event data received from the net tracker to record that a shot was either made or missed at time $T_2$, where time $T_2$ may be up to 3 or 4 seconds after time $T^1$. The app could compute the actual time of the basketball's flight, infer a distance for the shot attempt and, if necessary, verify the inferred distance based on RSS information received from shot-tracking location devices placed on the basketball court (explained below). Periodically, the app will send the shot-statistic data to a remote shot-tracking server via a connection over a data communications network, such as the Internet. If no data communications channel to the network is currently available, the app is configured to store the data until such time as such a connection becomes available.

Operational flow of the shot-tracking mobile app to process incoming shot-attempt events, made-shot events and rim-bounce events is illustrated in FIG. 14. When the shot-tracking mobile app starts up, it will begin iteratively listening for a broadcast event from a wrist tracker, a net tracker, or a shot location tracker, as illustrated by step 1405, decision step 1410, and return branch 1415. When the broadcast message is received (YES branch 1420 from decision step 1410), the mobile app will register the device that has been found by running a suitable connection protocol at step 1425, and then it will synchronize the clocks on all the devices found at step 1430. After registration is completed and a connection is established, the mobile app can receive data from the device. Then the app will begin listening for shot event data (i.e., shot-attempt events and net events) from those devices. The mobile app can also send commands and data to the wrist tracker and net tracker devices. Such commands and data may include, for example, a command to synch the device's clock to a start time of zero.

With more specific reference to FIG. 14, the app will prompt the player to initiate a tracking session at step 1435, and it will ask the player to identify what he or she wants to do, i.e., practice shooting one or more different types of shots, compete against another player in a shooting contest, or play an actual game. Once the player enters that information, it is stored in memory at step 1440.

The app algorithm then enters a "listening" mode, indicated by decision step 1445, where it waits to receive incoming messages from the wrist tracker and the net tracker. In particular, at decision step 1445, the algorithm queries as to whether a shot event or a net event BLE message has been received. If no such event message has been received, the algorithm loops back along branch 1450 to "listen" again for an incoming event message.

On the other hand, if an event message has been received by the computing device, the algorithm proceeds to identify the nature of the event message. First, the algorithm queries as to whether the incoming event message is a shot-attempt event message, at decision step 1455. If the incoming event message is a shot-attempt event message, the algorithm will increase its tally of shots attempted at step 1460, and it will update and display updated tracking statistics on the mobile computing device at step 1465. Additionally, in preferred embodiments, the shot-attempt event message includes an identifier as to the specific type of shot that has been taken, and the statistics are updated to reflect the particular type of shot that actually has been attempted.

On the other hand, if the incoming event message is not a shot-attempt message, the algorithm proceeds to query as to whether it is a shot-made event message, at decision step 1470. If the incoming event message is determined to be a shot-made event at decision step 1470, the algorithm increases its count of shots made at step 1475. Additionally, at step 1480, the algorithm checks to see whether any shot-attempt BLE messages have been received by the app within a preceding, predetermined period of time (e.g., 5 seconds). If not, the shots-attempted counter (step 1460) will be incremented on the assumption that a shot necessarily would have been attempted in order for the made-shot event to have been recognized in step 1470, but that the shot-attempt event BLE message was not generated/sent by the wrist tracker or that it was not received or recognized by the mobile computing device. Once again, in that case, the algorithm will update and display updated tracking statistics on the mobile computing device at step 1465. On the other hand, if a shot-attempt BLE message has been received within the preceding, predetermined period of time, there will be no need to increment the shots-attempted counter at step 1460, since that will already have been done after the shot-attempt event was recognized at step 1455, and the statistics will be updated and displayed at step 1465 accordingly.

If the incoming event message is determined at step 1470 not to indicate a shot-made event, the algorithm then queries at step 1485 whether the incoming event message is a rim-bounce event message. If the incoming message is, in fact, a rim-bounce message, the algorithm checks at step 1480 to see whether any shot-attempt BLE messages have been received by the app within the preceding, predetermined period of time. If not, the shots-attempted counter (step 1460) will be incremented on the assumption that a shot necessarily would have been attempted in order for the rim-bounce event to have been recognized in step 1485, but that the shot-attempt event BLE message was not generated/sent by the wrist tracker or that it was not received or recognized by the mobile computing device. Once again, in that case, the algorithm will update and display updated tracking statistics on the mobile computing device at step 1465. On the other hand, if a shot-attempt BLE message has been received within the preceding, predetermined period of time, there will be no need to increment the shots-attempted counter at step 1460, since that will already have been done after the shot-attempt event was recognized at step 1455, and the statistics will be updated and displayed at step 1465 accordingly. If, however, the incoming event message is determined at step 1485 not to have been a rim-bounce event message, either, the algorithm cycles back to its listening mode (1445).

Finally, after statistics are updated and redisplayed (step 1465), the algorithm queries as to whether the workout routine has been completed, at step 1490. That could be based on total time elapsed; number of shots taken (including specified numbers of different types of shots being taken); number of shots made (including specified numbers or different types of shots being made); or some other criterion. If the workout is not complete, processing returns to the listening mode, i.e., decision step 1445. Otherwise, the app displays a final workout summary at step 1495 and returns to step 1435, i.e., where the app waits for initiating player input.

BLE Message Structure and Content

As is clear from the immediately preceding discussion of the overall flow of the mobile app, a system according to the invention takes full advantage of wireless messaging protocols such as Bluetooth wireless protocols. In particular, as noted above, Bluetooth Low Energy (BLE) messaging protocols are preferred. Typically, the BLE message contents will include the type of event, a confidence level for the event, and a timestamp. That said, however, the BLE messages emitted by the wrist tracker will have source and event codes (described below) that are distinct from the source and event codes in BLE messages transmitted by the net-tracking device, so that the smart phone can determine the source of the message as well as the type of event that has occurred. Furthermore, inherent to the transmission medium and the message is a signal strength or power level for the received transmission, which the receiving device can use to produce a received-signal-strength (RSS) indication More specifically, embodiments of the present invention use a packetized data transmission scheme. FIG. 15 shows an exemplary packet used in some embodiments of the present invention. As shown in FIG. 15, the packets 1505 transmitted and received by the transmitting and receiving devices in embodiments of the present invention include four fields, comprising a preamble 1510, a source identifier 1515, a payload 1520, and a cyclic redundancy check (CRC) value 1525. The preamble field 1510 contains a bit stream XXX sent by the transmitting device to help the receiving device synchronize its own clock with the transmitting device's clock. The source address field 1515 contains data YYYY that uniquely identifies the source of the data. In this case, the source address field contains a MAC identifier, similar to the MAC identifiers used for Ethernet communications. The payload field 1520 usually includes a byte length for the payload data, as well as the actual payload data itself. In this case, the payload 1520 includes an event identifier indicating, for example, whether the event is a shot attempt, a made-shot event, or a rim-bounce event, as well as a timestamp. The payload data 1520 for embodiments of the present invention will be discussed in more detail below. The CRC field 1525 contains a polynomial value WWW created and used by transmission control algorithms in the transmitter and the receiver to verify the integrity of the values in the source and payload fields 1515 and 1520, respectively. If the transmission control algorithm in the receiver determines that the polynomial value WWW in the CRC field 1525 is incorrect, it throws away the BLE packet 1505 and sends a request to the transmitter to resend the information in another packet.

Regarding the payload 1520, in embodiments of the present invention, the payload field is four bytes long and includes three components: an ID code 1530; a confidence level 1535; and a timestamp 1540. The first byte of the payload field contains the ID code 1530, which indicates an event ID type such as a shot attempt, a rim-bounce, or a made shot. In FIG. 15, the exemplary ID code is the value "2" (the notation "02H" in FIG. 15 indicates a value of "2" stored in the computer system using the hexadecimal format), which is the event ID type code for a shot attempt. Thus, depending on the particular features desired for a particular scenario and embodiment of the present invention, the list of potential event ID type codes in the payload field could include, for example:

01H for ring buffer data
02H for a shot-attempt event (from the wrist tracker)
03H for a made-shot event (from the net tracker)
04H for rim-bounce event (from the net tracker)
05H for RSS information for a shot-attempt event (from a shot location tracker)
0xFF for sensor malfunction at net tracker or wrist tracker.

With up to 256 available values for the first byte of the payload field, it will be recognized and appreciated by those skilled in the art that there is plenty of room for expansion, and other types of events besides shot attempts, rim bounces, and made shots may also be added to the system and represented with different ID codes without departing from the scope of the present invention. For example, an event ID code having a value of 83H (or some other value) might indicate to the smart phone app that the net tracker has experienced an unusual event or problem that needs to be corrected, such as two basketballs becoming stuck in the net or the net becoming wrapped around or tangled up with the rim as a result of a made shot or contact with a player's hand due to an attempt to block a shot.

The second byte of the payload field contains a confidence value 1535 (e.g., the number "80") for the detected event. Transmitting a confidence value with each packet permits the receiving device to detect, for example, when there might be something wrong with the physical setup of the system in relation to the particular environment or the particular shooters. For example, if the shot-tracking mobile app starts receiving a large number of packets containing a low confidence value (e.g., below 50%), this would be a strong indication that the accuracy of the system might be dramatically improved 1) by adjusting, tuning, and/or re-calibrating a sensor, a threshold, a profile, or some combination thereof; or 2) by moving a sensor to a new location on the basketball court to better accommodate a particular environment, the motions of a particular shooter while shooting the basketball, or the rigidity of a particular net or rim on the basketball hoop. For example, although most basketball nets are made of cotton or nylon, some basketball nets—particularly basketball nets on public playgrounds—are made of chained metal. When a shot is made on a net made of chained metal instead of nylon or cotton, the motions of the links in the net can be dramatically different than the motion of cotton or nylon, and such differences can be accounted for by adjusting and/or re-calibrating thresholds and/or selecting different profiles to be used by the algorithm in the net tracker device.

The final two bytes in the payload field contains a timestamp 1540 (e.g., 4000 milliseconds), which indicates the time when the event was detected, relative to an initial synchronized point in time. The timestamp is an unsigned value of the number of 10-millisecond ticks since the epoch that qualifies the detected event. The shot-tracking mobile app running on the smart phone is configured to synchronize all net tracker and wrist tracker device clocks to zero once they are connected. This timestamp can then be used by the shot-tracking mobile app to infer, among other things, that the shooter shot an air ball, the distance between the net and the location where a shot was taken, and the time of flight of the ball after a shot, which helps the system verify and refine the shooting data used to track and record the shooting statistics.

In general, BLE messages will arrive in wrist-tracker-then-net-tracker order. However, this may not always be the case. Thus, the distance between the shooter (wearing the wrist tracker) and the basket (with the attached net tracker) can be inferred from the difference between the wrist tracker timestamp and the net tracker timestamp. After the shooter calibrates the system using features of the shot-tracking mobile app, the app can be configured, for example, to categorize made shots as close-range, medium-range, and long-range.

It will be apparent to those skilled in the art that, without departing from the scope of the present invention, a variety of alternative communications protocols besides BLE may be used to transmit the shot-attempt event data, made-shot event data, and rim-bounce event data from the wrist and net trackers to the wireless mobile device, including, for example, NFC, Wi-Fi, or full scale Bluetooth 2.1 to name but a few examples. However, in certain situations, BLE offers the following advantages:

1) It is optimized for low power and long operation on a single 3V battery.
2) A 12 byte transmission packet is considered large.
3) The modulation is slightly different, yielding longer distance than old versions of Bluetooth.
4) It does not require certification by the manufacturer of certain smart phone and handheld devices.
5) It does not require active pairing by the user, which permits a number of devices to be paired with each other.

In addition, BLE is designed to send changes of state in short messages originating from either predefined services (identified by 16-bit UUIDs) or vendor-specific (VS) services (128-bit UUIDs). Embodiments of the present invention use 3779FFF0-xxxx-7908-F351-44BF632D5D36 as the VS UUID, where xxxx=A1A6 for the sensor on the shooter's wrist, and A1A7 for the sensor on the basketball net. The messages themselves may also contain event-specific codes for redundancy.

In accordance with the BLE protocol, the wrist tracker advertises itself as a "SLEV" and the net tracker advertises itself as a "NET." Since the event model is SLEV→NET, the system can unambiguously support multiple wrist trackers. The firmware version is encoded in the manufacturer name string (0x2A29) of the Device Information Service (0x180A). The Battery Service (0x180F), which returns the estimated remaining capacity of the battery as a percentage, is supported in preferred embodiment. The percentage of remaining battery capacity is derived by running the measured voltage through a discharge model of the CR-2032 cell, supplied in the SDK by Nordic Semiconductor.

The sole Characteristic of the VS service supports Indicate messages (asynchronous with guaranteed delivery to the smart phone) and write commands. The former are emitted when shots/makes are detected or when the accelerometer buffer is downloaded for analysis. Write commands may be issued by the smart phone to the wrist and net trackers in order to assign the event synchronization time, blink the LEDs for ambiguity resolution, or configure the behavior, profiles, and thresholds used by sensing algorithms.

Cloud-Based Operation

In preferred embodiments, the mobile app is also configured to synchronize data with a remote server. FIG. 16 shows a high-level flow diagram illustrating the steps performed by the CPU of the smart phone or other wireless mobile device, in accordance with an exemplary embodiment of the present invention, to synchronize shot statistics data stored in local memory with the shot statistics data stored on a remote, online server 135 (FIG. 1). Thus, at step 1605, the CPU determines whether a data transmission channel such as WiFi or a cellular network is available and, if so, whether there is Internet connectivity. If so, the CPU will perform a real-time synchronization with data stored on the remote server, in step 1610, and then wait 5 milliseconds (step 1615) before the synchronization algorithm repeats; otherwise, the CPU simply waits 5 milliseconds before again checking for data transmission capability and Internet access.

By synchronizing the user profile information, user workouts, and all the data that has occurred on the wrist and net trackers as well as the mobile device with the remote server, it becomes possible to share that data with another device. That enables a player to practice individually at his or her convenience, and the player's coach to download and review the player's performance at his or her own (i.e., the coach's) convenience. Alternatively, players who are remote from each other can challenge each other to basketball shooting competitions via the data-sharing capability of the remote shot-tracking server applications. This is an additional purpose of the shot-event server applications 140.

Typically, as illustrated in FIG. 1, the remote shot-tracking server 135, which is located in the cloud 137, is connected to the smart phone 115 via a data communications pathway E such as a cellular network or WiFi/Internet. The mobile app 120 may also be configured to share shot event data with a separate tablet computer 155 over communications pathway F so that the user of the tablet computer 155 can monitor the shot statistics of a particular player, for example. The user of the tablet computer 155 could be a coach or parent, for example, sitting in the stands, while the smart phone 115 could be held in the hands of an assistant coach or trainer standing on or near one end of the basketball court.

When a shooting challenge is in progress, the participants in the challenge are permitted to see certain portions of each other's data (the portions associated with the challenge progress) for so long as the challenge is ongoing. Notably, the shooters participating in the challenges do not have to be logged onto the server at the same time. While the system is useful in keeping track of a shooting challenge in typical situations where the players are on the same court, it is envisioned, for example, that the participants may even be located in different cities and time zones. The server will receive and store the information associated with each shooter so as to enable a competition, even though the shooters are not shooting at the same time.

Further still, cloud-based operation and the shot event server applications also enable the algorithms, profiles, and thresholds used by the wrist tracker to be tuned remotely, so that they can be adapted to a player's specific shooting form and thereby avoid producing an unacceptably-high number of false positives (erroneous shot-attempt events when the shooter has not attempted a shot).

User Interface for Smart Phone Device

Figure 17A:
FIGS. 17A-17C illustrate, by way of example, some of the screens and data displayed on a smart phone running a shot-tracking mobile app configured to operate in accordance with some embodiments of the invention during an individual workout or practice session.
Figure 17B:
Figure 17C:
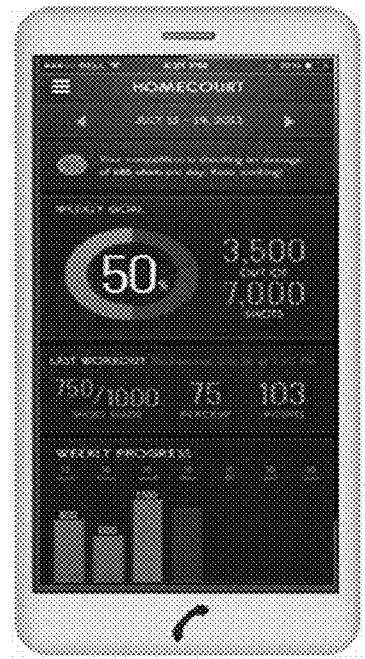

The shot-tracking app running on the smart phone is configured to present a diverse array of information to the player, and FIGS. 17A-17C, 18A and 18B illustrate, by way of example, some of the screens and data displayed on a smart phone running a shot-tracking mobile app configured to operate in accordance with some embodiments of the invention. FIG. 17A illustrates an exemplary user interface display screen for displaying charted shot locations, running totals and statistics for a player. FIG. 17B illustrates an exemplary user interface display screen for tracking shots taken (e.g., free throws) during a workout. FIG. 17C illustrates an exemplary user interface display screen for tracking weekly shooting totals statistics, as well as weekly progress, for a player.

Figure 18A:
FIGS. 18A and 18B illustrate, by way of example, some of the screens and data displayed on a smart phone running a shot-tracking mobile app configured to operate in accordance with some embodiments of the invention in connection with head-to-head skills challenges between players.
Figure 18B:

FIGS. 18A and 18B illustrate, respectively, exemplary user interface display screens for controlling and managing competitive shooting challenges between players.

Shot-Location Tracking

As shown in FIG. 1, preferred embodiments of the system also include at least one shot location tracker. The purpose of the shot location tracker is to record the signal strength of a wrist event at a geographically distant position and send that signal strength information to the smart phone. Then, based on a geometric arrangement of the shot location tracker, the smart phone, and, optionally, one or more additional shot location trackers, the smart phone can calculate the most likely location of the wrist tracker on the basketball court at the time that the wrist tracker emits the BLE message indicating that a shot-attempt event has occurred. Typically, the shot location tracker devices are Bluetooth-enabled devices that operate in "promiscuous mode" in one end, which means they look for and only receive the specific types of event messages that are emitted by the wrist-tracking devices (i.e., shot-attempt event messages). Upon receiving a shot-attempt event message from the wrist device, the shot location tracker devices encapsulate the shot-attempt event information into a new BLE message and adds its own RSS information, thereby creating a shot attempt location message that contains both the shot-attempt event information from the wrist tracker and the RSS information from the shot location tracker. The shot location tracker then sends the shot attempt location message to the smart phone, which uses the shot attempt location information and a triangulation routine to calculate the location on the basketball court where the shot attempt occurred.

Figure 19:
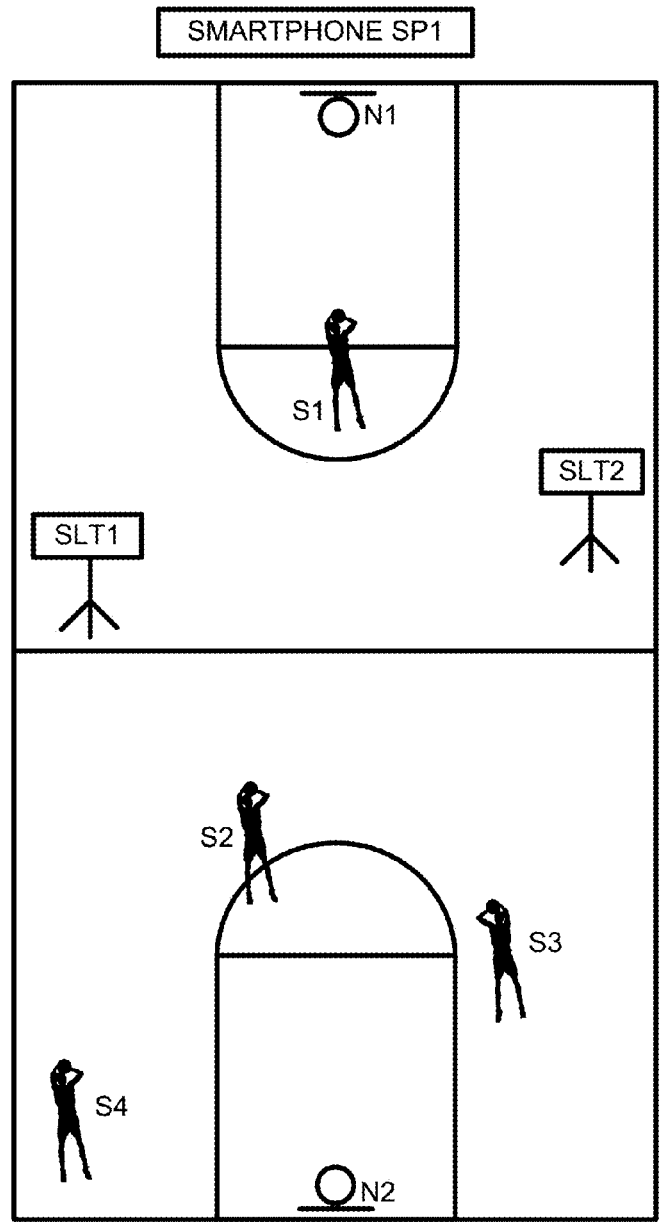
FIGS. 19-21 contain diagrams that illustrate, by way of example, the physical arrangement of the smart phone and multiple shot location devices on a basketball court, and the propagation of signals containing BLE messages between said devices, in accordance with certain embodiments of the present invention, so as to permit the system to determine where shot attempts occur on the basketball court.

FIG. 19 shows a bird's eye view of a basketball court upon which there are two nets, N1 and N2, and four basketball shooters, S1-S4. Shooter S1 is taking shots at net N1, while shooters S2, S3 and S4 are taking shots at net N2. All of the shooters S1-S4 are wearing wrist trackers (not shown in FIG. 19). Two net-tracking devices (net trackers) are attached, respectively, to each one of the two nets N1 and N2. There are also two shot location trackers SLT1 and SLT2 on the court. A smart phone SP1 equipped with a shot-tracking mobile app is located at one end of the basketball court below the backboard attached to net N1. The smart phone SP1 is configured to receive (a) BLE shot-attempt event messages transmitted by all of the wrist sensors worn by shooters S1-S4, (b) BLE made-shot event messages transmitted by nets N1 and N2, and (c) BLE shot location messages created and transmitted by shot location trackers SLT1 and SLT2. Shot location trackers SLT1 and SLT2 are ideally placed on opposite sides of the court near the half court line for the highest fidelity. Additional shot location trackers (not shown in FIG. 19) may also be added to the system and placed at other locations on or around the basketball court in order to increase the overall precision and fidelity of the shot location calculations in the system.

Figure 20:
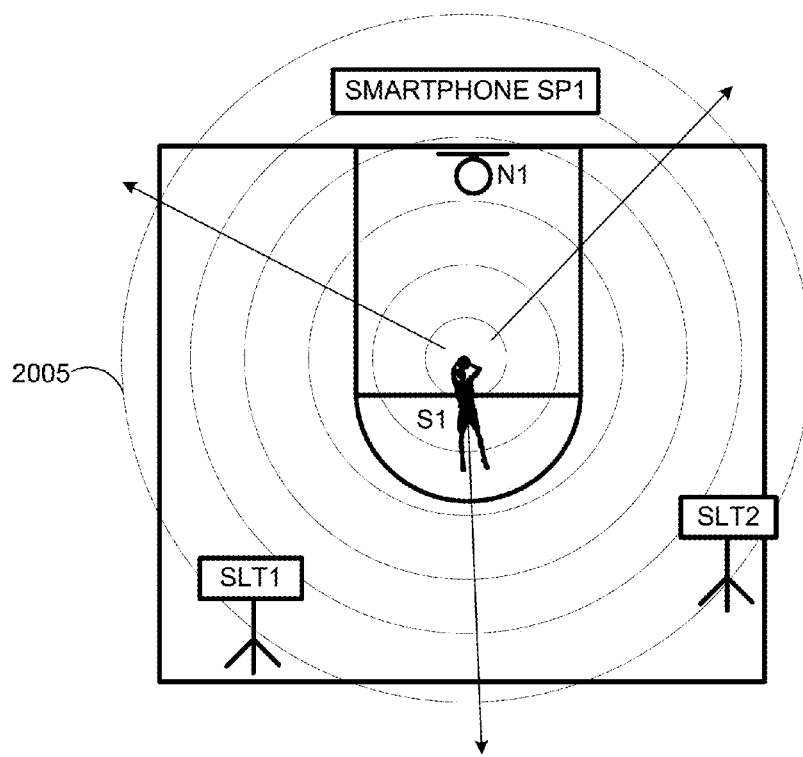

As illustrated best in FIG. 20, when shooter S1 attempts to shoot a basketball through net N1, the shot attempt is detected by shooter S1's wrist tracker (not shown), which emits a signal 2005 containing a BLE message coded to indicate a shot attempt has occurred. The shot attempt message is received and processed by the smart phone SP1, shot location tracker SLT1 and shot location tracker SLT2. When the shot-attempt event is received by the shot-tracking mobile app on the smart phone SP1, smart phone SP1 increments a shot attempt counter. If the smart phone SP1 does not also receive a made-shot event message from the net N1 within a predetermined time period (four seconds, for instance) after receiving the shot-attempt event message, then the shot-tracking mobile app will also record that shooter S1's shot attempt resulted in a missed shot and update the shooter S1's shooting statistics accordingly.

Figure 21:
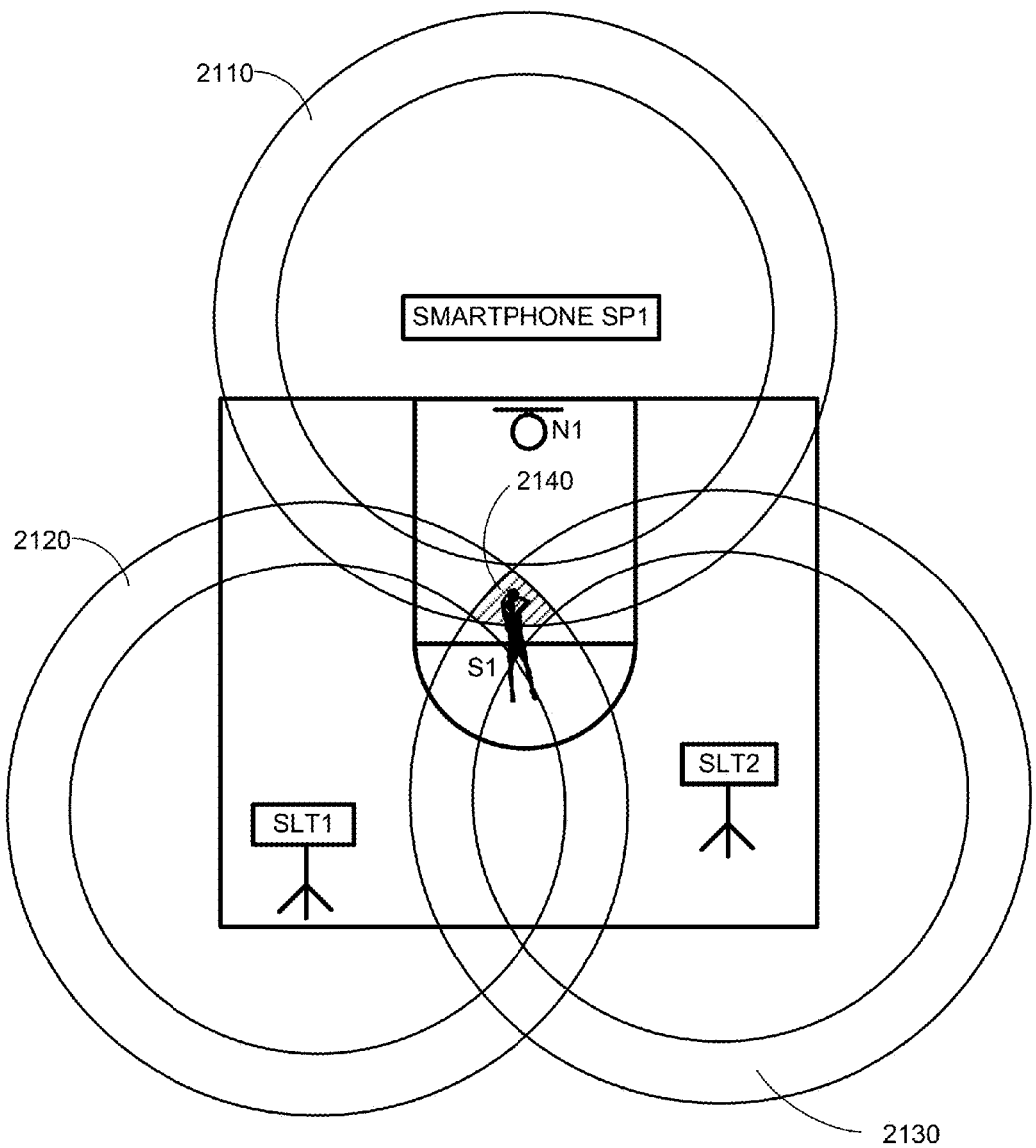

When the shot-attempt event message is received by the shot location trackers SLT1 and SLT2, they will each re-encapsulate the shot-attempt event information into a new BLE message, add RSS information to the new messages, and each send the new messages to the smart phone SP1, where they will be used by the smart phone SP1 to determine the shooter S1's location at the time the shot attempt occurred. See FIG. 21. The physical geometric placement of the smart phone SP1 and shot location trackers SLT1 and SLT2 on the basketball court permits the shot-tracking mobile app on the smart phone SP1 to use the data provided by the wrist tracker and the shot location trackers SLT1 and SLT2 to calculate distance probability bands 2110, 2120 and 2130 for the shot attempt relative to locations of the smart phone SP1, the shot location tracker SLT1 and shot location tracker SLT2, respectively. The shot-tracking mobile app then determines the location of the wrist tracker during the shot attempt based on the intersection of these three distance probability bands 2110, 2120 and 2130 for the smart phone SP1, shot location tracker SLT1 and shot location tracker SLT2, respectively. In this case, all three of the distance probability bands 2110, 2120 and 2130 intersect at area 2140 on the basketball court, which means the shooter S1 and the wrist tracker (not shown) must have been located within area 2140 when the shot was attempted.

Figure 22:
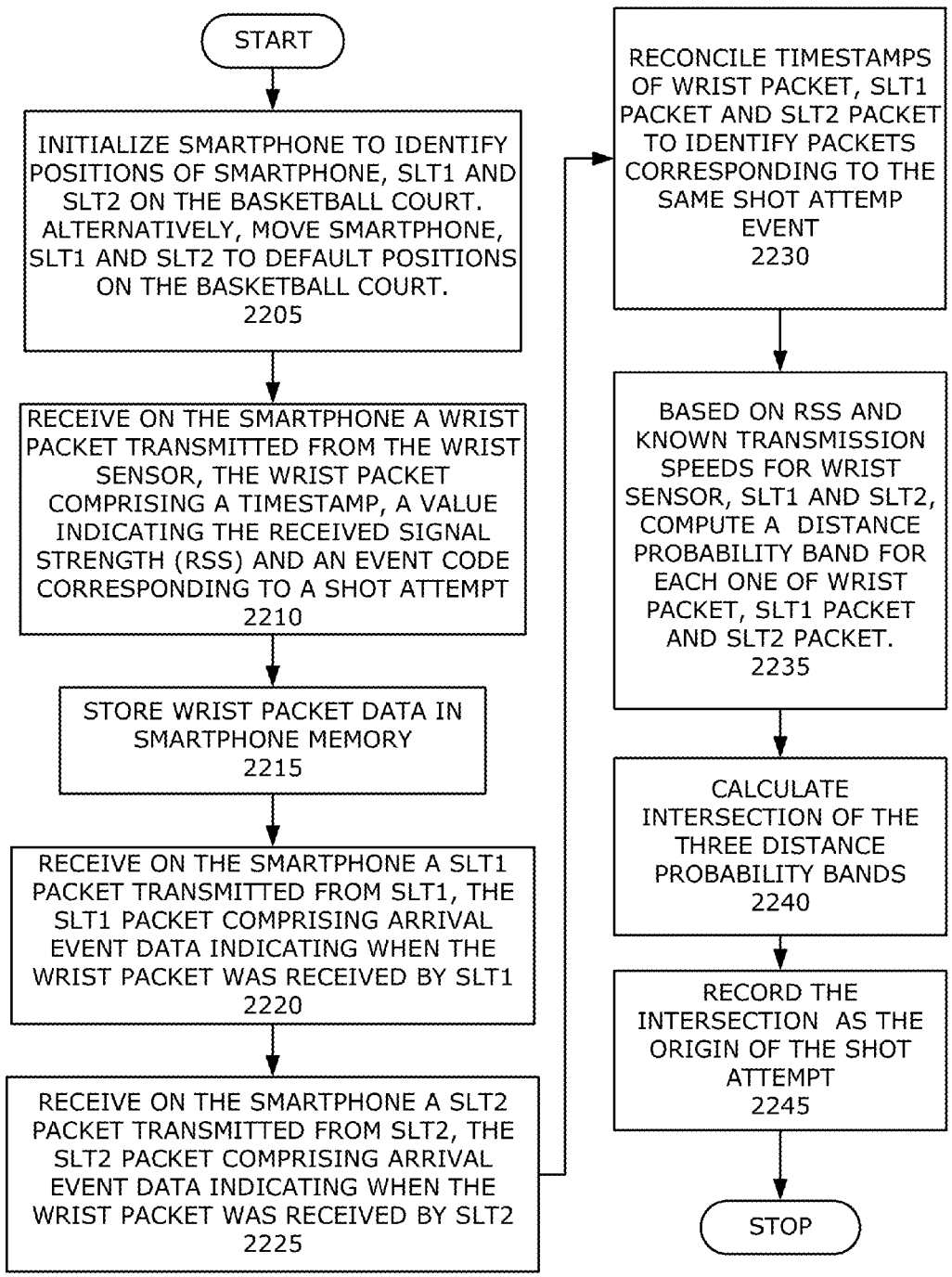
FIG. 22 shows a high-level flow diagram illustrating the steps performed by the processor of a smart phone or other wireless mobile device, in accordance with an exemplary embodiment of the present invention, to determine the location of the wrist tracker when a shot-attempt event occurs.

An exemplary algorithm used to determine the shooter S1's location during the shot attempt is shown and described in the flow diagram depicted in FIG. 22. As shown in FIG. 22, the first step, step 2205, is to initialize the smartphone to identify the positions of the smart phone and location trackers on the basketball court. Alternatively, the smart phone and location trackers may be moved to default locations on the basketball court. In the next step, the app running on the smart phone receives a wrist packet transmitted from the wrist sensor, the wrist packet including a timestamp, a value indicating a received signal strength and event code corresponding to a shot attempt. See step 2210. The wrist packet is stored in memory on the smart phone. Step 2215. Next, the smartphone receives a SLT1 packet transmitted by SLT1, the SLT1 packet comprising arrival event data indicating when the wrist packet was received by SLT1. See step 2220. The smart phone also receives, in step 2225, an SLT2 packet transmitted from SLT2, the SLT2 packet comprising arrival event data indicating when the wrist packet was received by SLT2. The app running on the smartphone next reconciles the timestamps on the wrist packet, the SLT1 packet and the SLT2 packet to identify packets corresponding to the same shot attempt event. See step 2225. Based on the receive signal strength and known transmission speeds for the wrist sensor, SLT1 and SLT2, the app computes a distance probability band each one of the wrist packet, SLT1 packet and SLT2 packet (step 2235), and calculates the intersections of the three distance probability bands. Finally, in step 2245, the app records the intersection of the three bands as the origin of the shot attempt.

Figure 23:
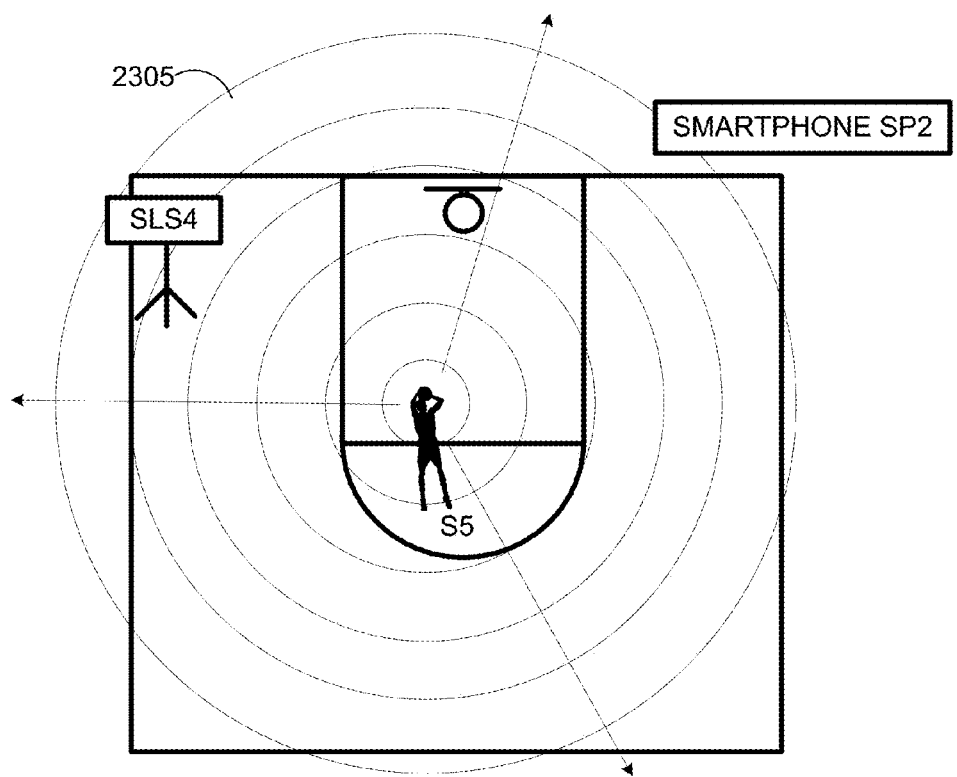
FIGS. 23 and 24 contain diagrams that illustrate, by way of example, the arrangement of the smart phone and a single shot location device on a basketball court and the propagation of signals containing BLE messages between said devices, in accordance with an alternative exemplary embodiment of the present invention, so as to permit the system to determine where shot attempts occur on the basketball court.
Figure 24:
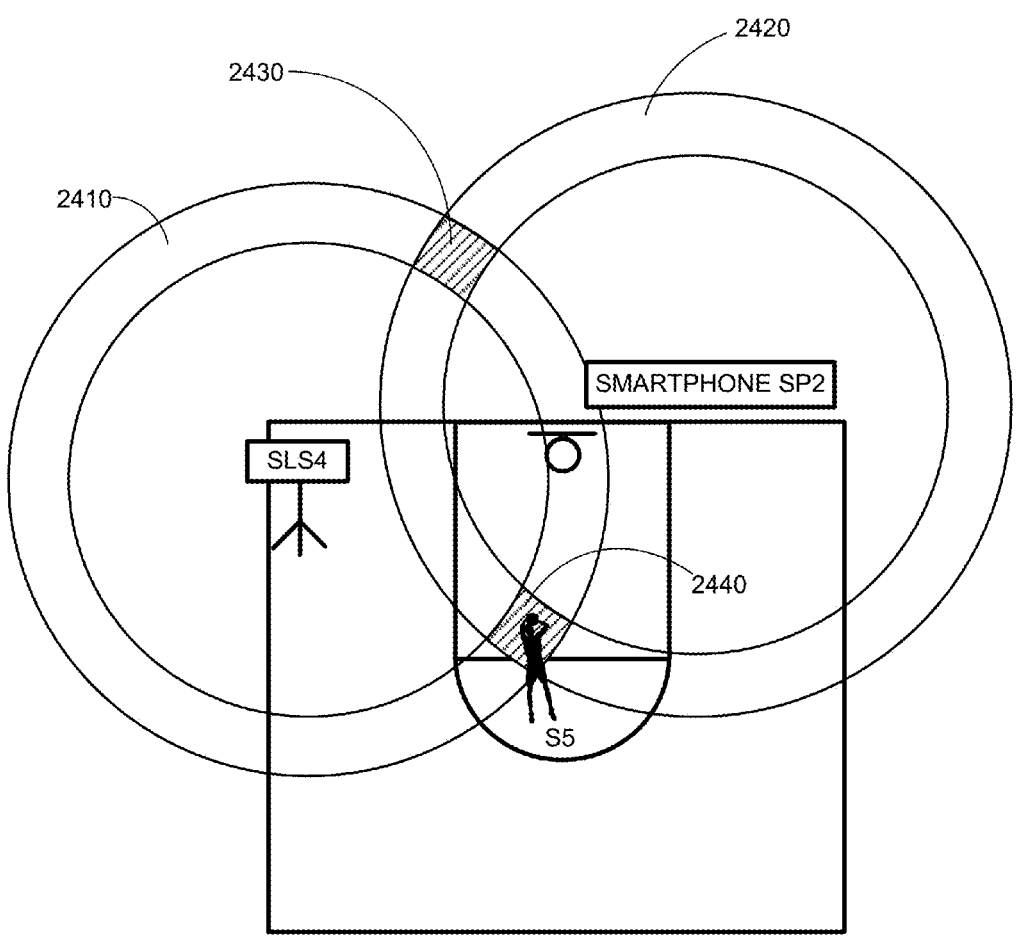

FIGS. 23 and 24 show a different physical arrangement of devices to determine the location of the wrist-tracking device on the basketball court during a shot attempt. Instead of using a smart phone and two shot location trackers, the arrangement shown in FIGS. 23 and 24 uses a smart phone SP2 and a single shot location tracker SLT4 to collect the information needed to calculate the wrist tracker's location during a shot attempt. Although not as precise as the arrangement shown and described in FIGS. 19-21, the arrangement of the shot location tracker SLT4 and smart phone SP2 in FIGS. 23 and 24 can also provide sufficient shot event location data to identify the location of the wrist tracker by taking advantage of the fact that one of the two areas of intersection for the two distance probability bands will likely be located outside of the boundaries of the basketball court. See FIG. 24. In this example, embodiments of the present invention assume that the shooter S5 must have been located in the area 2440 during the shot attempt because the other area defined by the intersections of the two probability bands 2410 and 2420 (i.e., area 2430) is wholly outside of the boundaries of the basketball court. Thus, the area 2430 can be disregarded as a possible location for a legal shot attempt. Because this arrangement does not require a second shot location tracker, it is less expensive to set up and therefore probably more feasible for home, backyard or driveway basketball courts, as well as middle- and high-school basketball teams. However, the arrangement shown and described in FIGS. 19-21, which requires two or more shot location trackers, will probably be more feasible for use by larger, better-funded organizations, like college and professional basketball teams.

Further Embodiments

Operating algorithms for another embodiment of a shot-tracking system according to the invention are illustrated in FIGS. 25, 26, 27, 28A-28F, and 29A-29C. In this embodiment, identifying shot-attempt events (by the wrist tracker) is based more extensively on matching a given sequence of arm and wrist motions over time to pre-established player profiles than on meeting or exceeding predefined, single-value numerical thresholds, although certain threshold values are still used as pre-qualifying or "gateway" values before further analysis is performed on the data, as explained more fully below. Furthermore, given the increased amount of data that is processed with a tracking system according to this embodiment of the invention as compared to the previously described embodiment of the invention, dynamically sized standard array buffers are used instead of simple ring buffers. Additionally, this embodiment of the invention does not utilize a barometric pressure sensor to identify position of the wrist tracker.

In general, a very high-level, operational flow diagram for the wrist tracker is shown in FIG. 25, and the algorithm illustrated in FIG. 25 is executed at a rate of 100 cycles per second. At step 2505, the wrist-tracker CPU first reads a command value stored in the wrist tracker's buffer to determine whether the player is training the device—i.e., establishing profiles for his or her various types of shots—or whether the player is using the system in "live," operational mode to actually identify and keep track of various shot-attempt events. The command value may be set by the player pressing a button or moving a switch on the wrist tracker, or it may be set via an input being made at the smart phone/computing device and a corresponding BLE message being sent from the smart phone to the wrist tracker. At step 2510, the CPU checks the value of the command. If the value indicates that the player is training the device, the wrist tracker enters a profile-training mode (step 2515) and executes the shot-training algorithms described below; if the value indicates that the player is using the system in the "normal," operational mode, the wrist tracker enters the operational mode (2520) to execute the shot-attempt-identifying algorithm described even further below.

As shown in FIG. 26, when the wrist tracker receives a BLE message 2605, it processes the message (step 2610) to identify the contents thereof. The CPU then checks (step 2615) to see whether the BLE message is a command to enter the profile-training mode and, if it is, the CPU stores the training command indicator (2620) and proceeds accordingly to execute the profile-training algorithms.

Otherwise, if the incoming BLE message is not a command to enter the profile-training mode, the CPU checks (step 2625) to see whether the BLE message is an indicator that a profile-training shot has actually been taken. (As indicated further below, a BLE message that a profile-training shot has been taken can be caused to be sent by someone pressing a "shot-taken" button on the app or by a shot-made or rim-bounce event being identified by the net tracker. (It is also possible for the player to press a button on the wrist tracker itself to indicate that a shot has been taken, and no BLE message needs to be sent or received/processed by the wrist tracker in that event.)) If the BLE message is a training-shot-taken indicator, the CPU stores the training-shot-taken value (step 2630) and proceeds accordingly to process data that has been accumulated in the wrist tracker.

If the incoming BLE is not a command to enter the profile-training mode or an indicator that a profile-training shot has actually been taken, the command is simply stored by the CPU (step2635). In this regard, it should be noted that commands are stored in all three cases (steps 2620, 2630, and 2635) because multiple different types of messages may be "picked up" by the wrist tracker, and the information associated with any given message needs to stored so that it is available for whatever purpose it later may be used.

Figure 27:
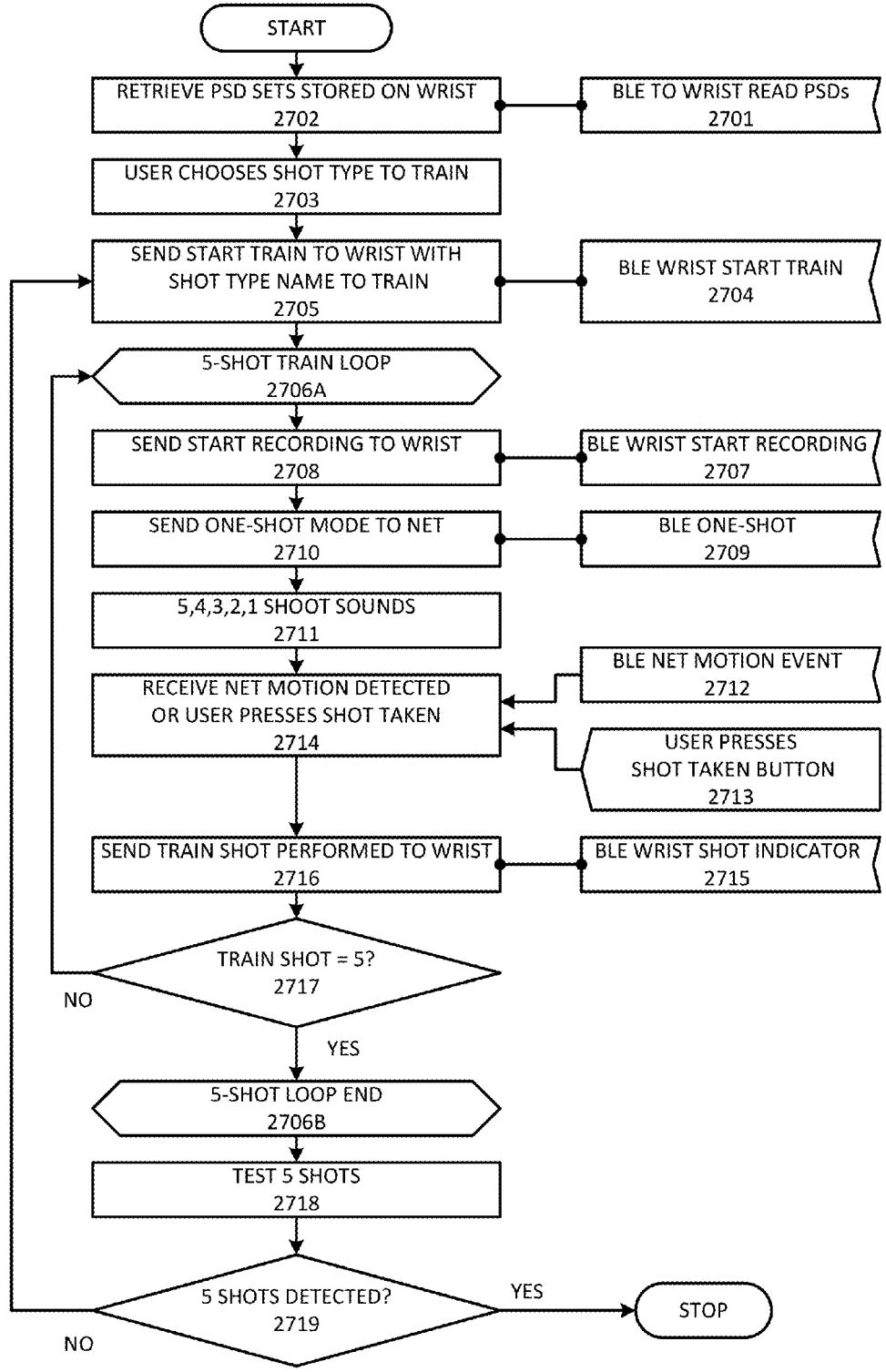
FIG. 27 shows a flow diagram illustrating, in accordance with the second embodiment of the present invention, steps performed by an application executing on a generalized computing device in connection with operation of the wrist tracker in the training mode.
Figure 28A:
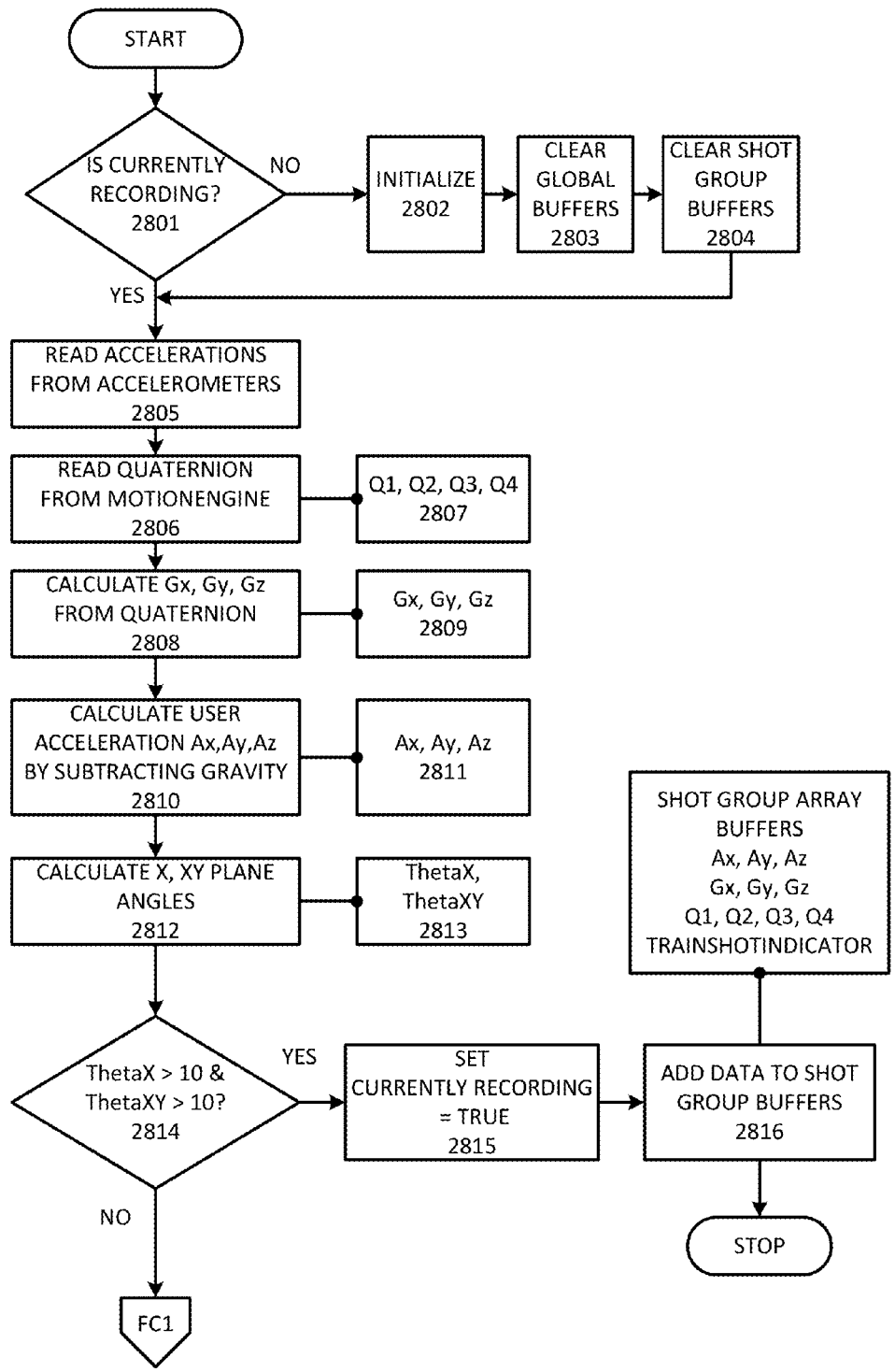
FIGS. 28A-28F are flow diagrams illustrating, in accordance with the second embodiment of the present invention, process steps executed by the wrist tracker CPU during the training mode to construct player shot data ("PSD") profiles, which are "templates" against which incoming data are compared during operation of the wrist tracker in the normal or shooting modes.
Figure 28B:
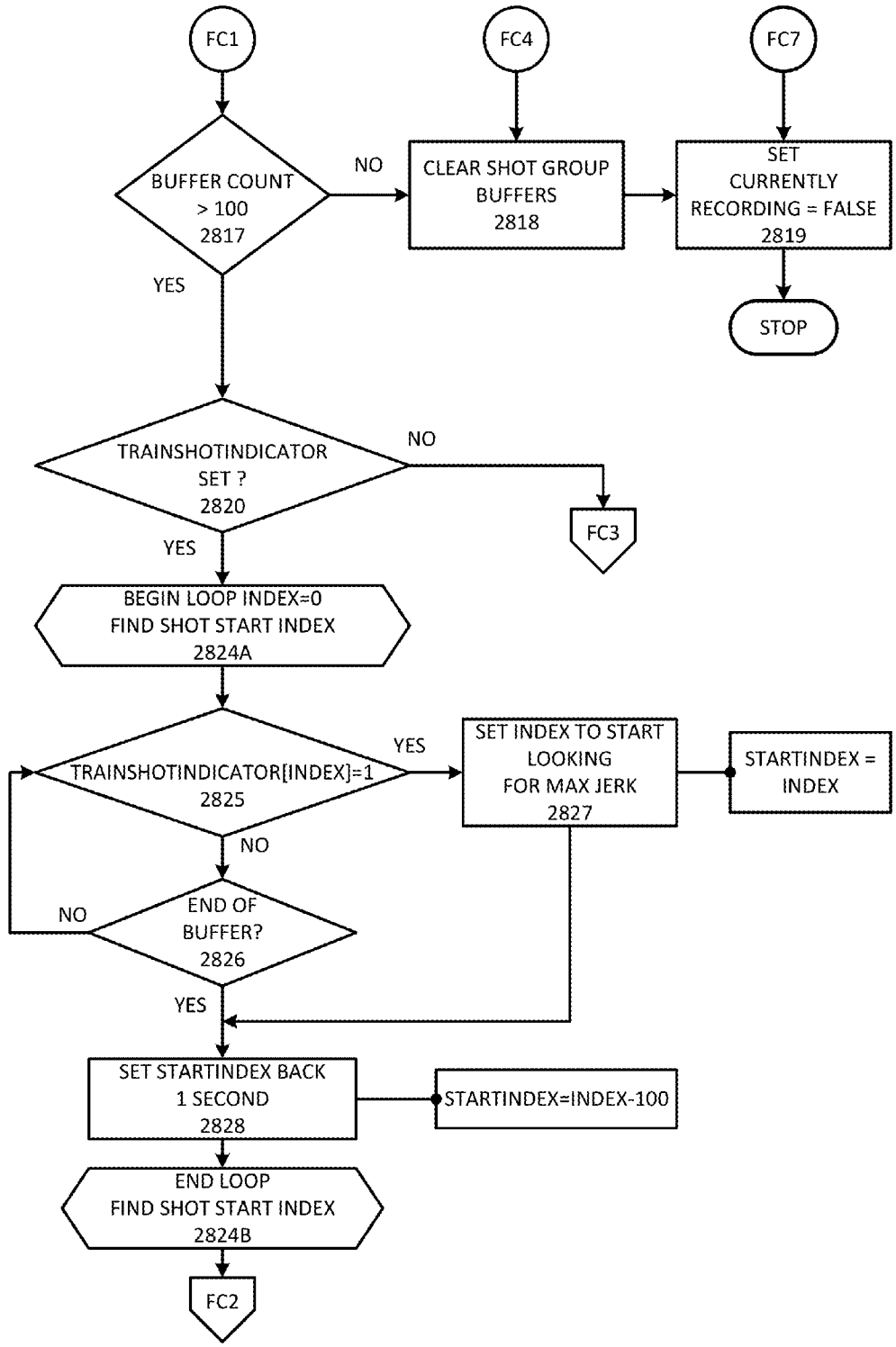
Figure 28C:
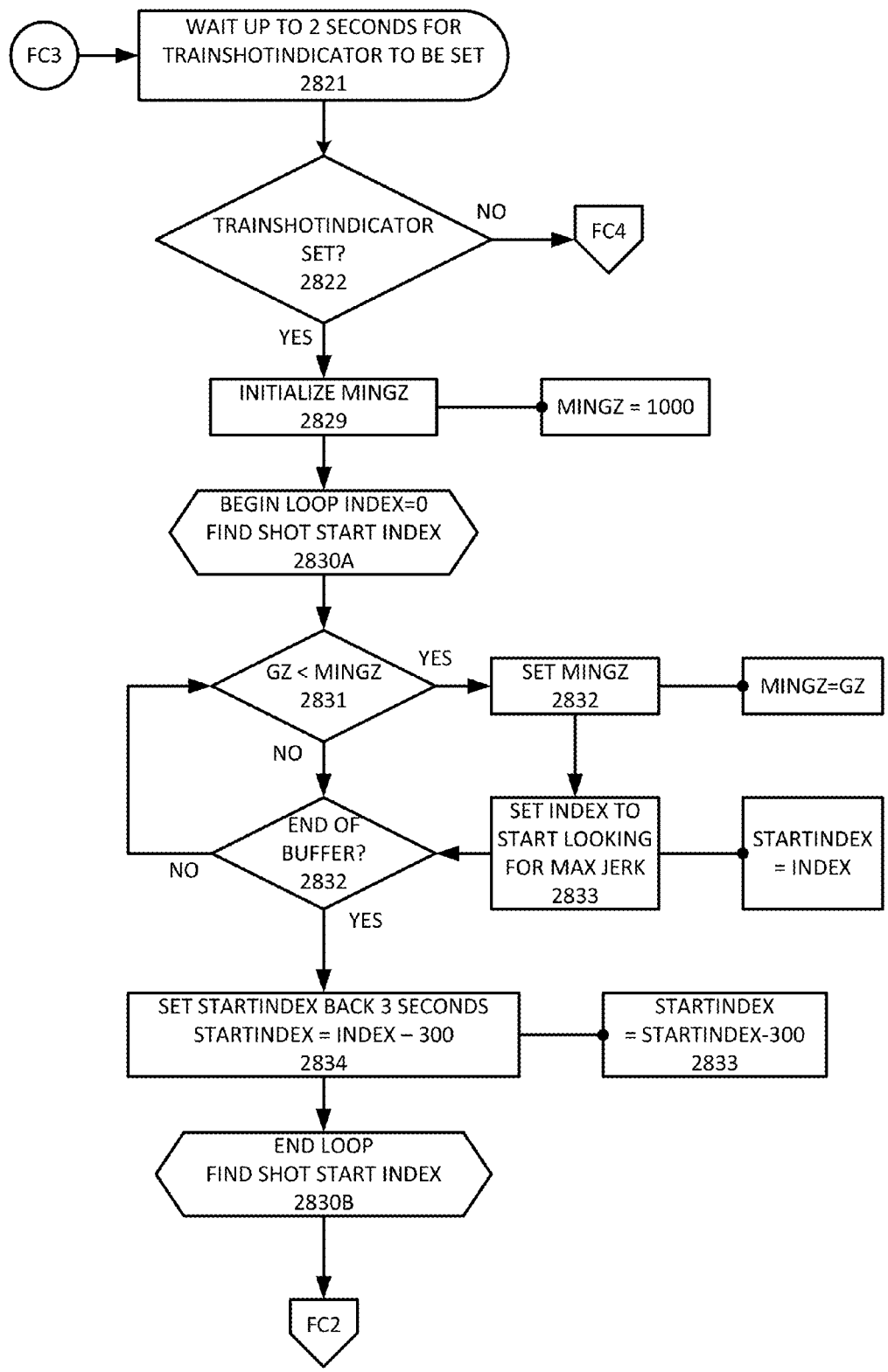
Figure 28D:
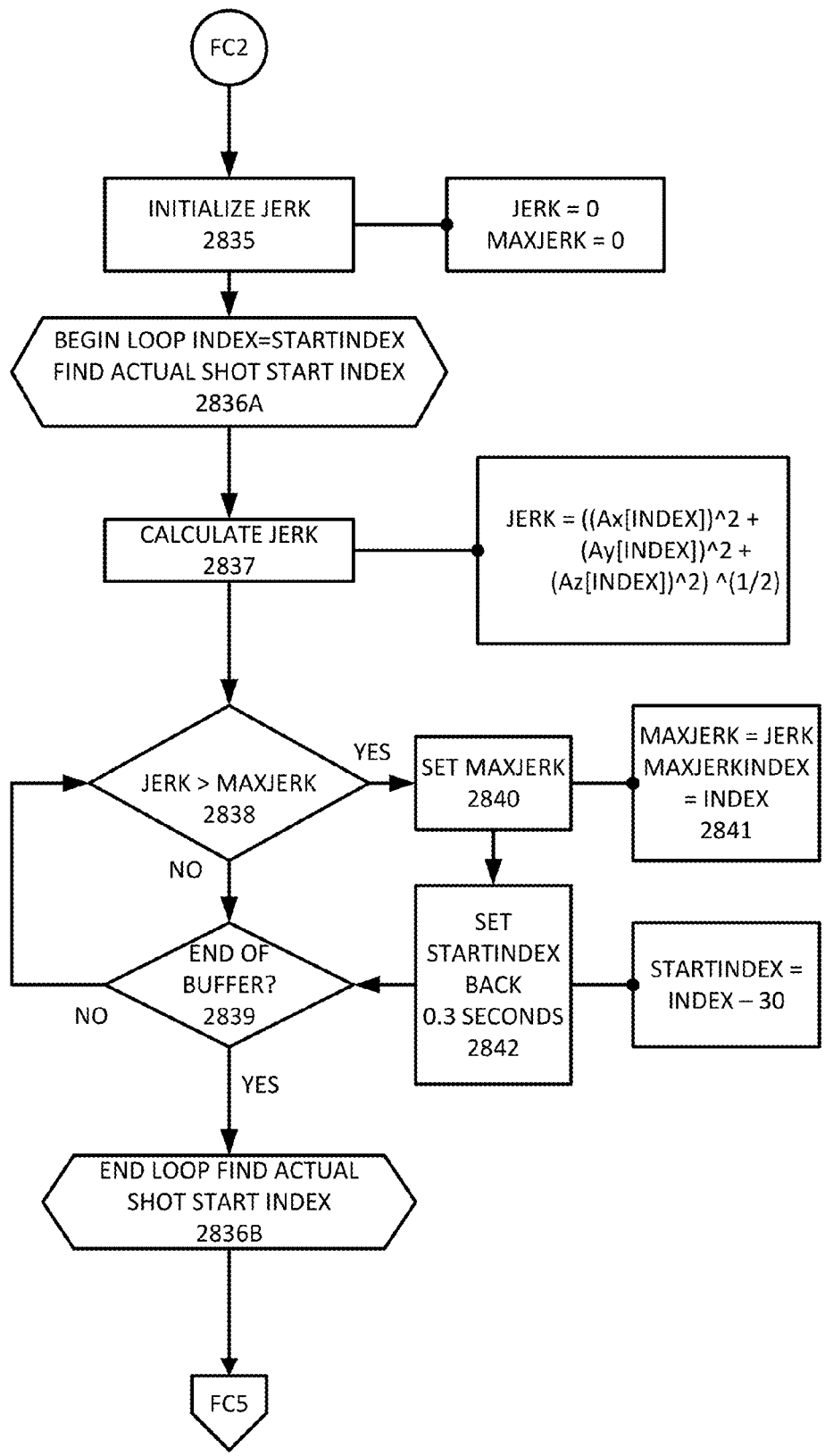
Figure 28E:
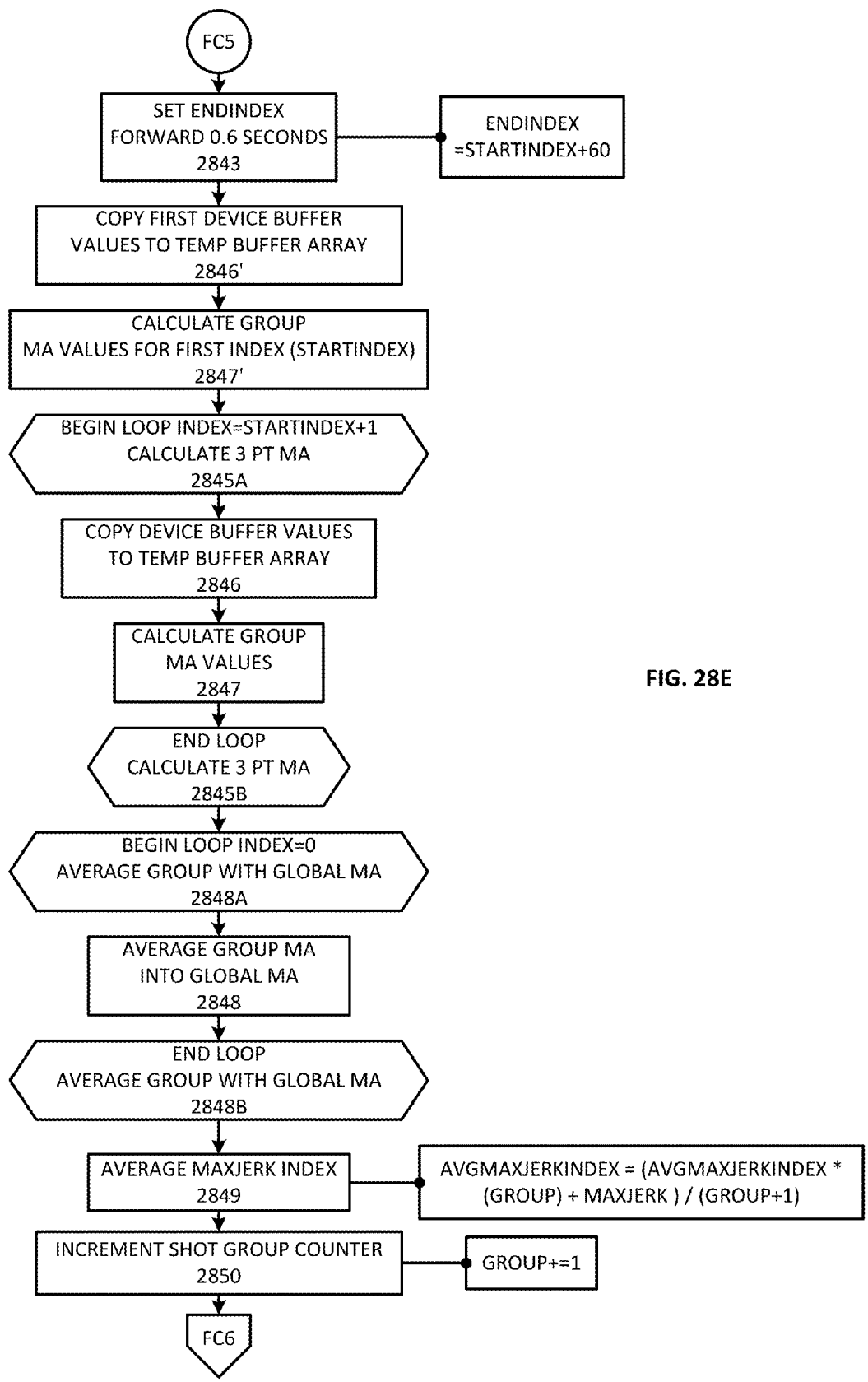
Figure 28F:
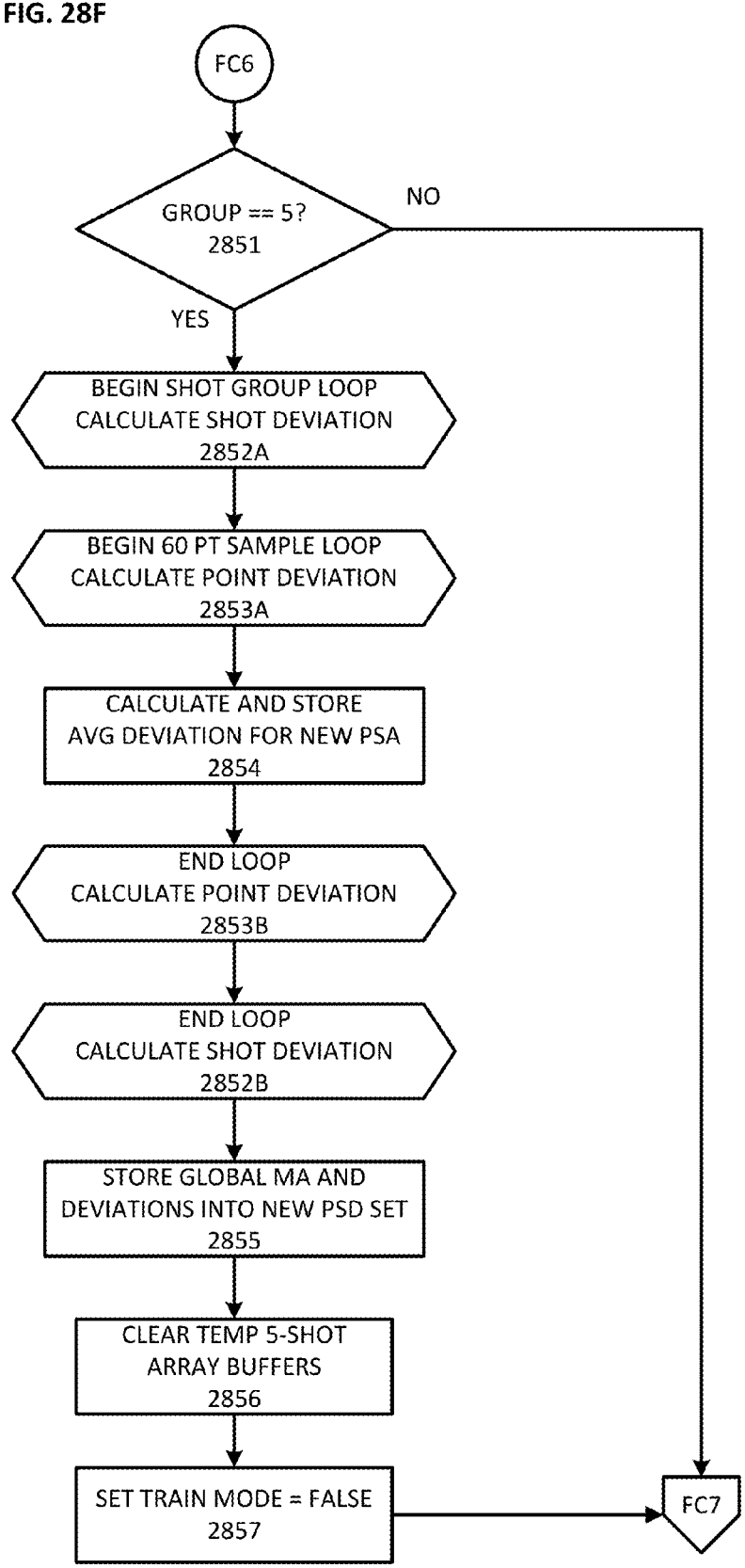

When the wrist tracker is in the profile-training mode, its CPU processes messages and data according to the flowcharts shown in FIGS. 27 and 28A-28F, where the flowchart shown in FIG. 27 is higher-level than the flowchart shown in FIGS. 28-28F and where steps shown in FIG. 27 represent actions taken by both the wrist tracker and, to a greater extent, the shot-tracking app being executed on the smart phone/mobile computing device. On the other hand, the algorithm shown in FIGS. 28A-28F will be co-executing on the wrist tracker with the algorithm shown in FIG. 27.

As shown in FIG. 27, in response to a BLE message 2701 sent by the app, the wrist-tracker CPU first retrieves Player Shot Data ("PSD") sets that have been stored previously on the wrist tracker, at step 2702. The PSD sets include information such as the name of the player, names of different types of shots in the player's overall profile, etc.

Next, at step 2703, the player uses the app to identify the particular type of shot he or she wants to train the wrist tracker to identify, and the app sends a corresponding BLE message 2704 to the wrist tracker device. The BLE message 2704 is received by the wrist-tracker (step 2705), and the wrist tracker is readied to begin a five-shot training sequence or loop for the particular type of shot the wrist tracker is to be trained to recognize (begin and end points of the training loop being indicated by points 2706a and 2706b, respectively). (The specific number of shots used to train the wrist tracker to identify shots of a given type could be more or less than five, although profiles developed using more shots may tend to be more accurate and truly representative than profiles developed using less shots.)

Next, the app sends a BLE message 2707 to the wrist tracker telling the wrist tracker to start recording acceleration and angular orientation data to its buffer (step 2708) for the training shot that is about to be taken. Additionally, the app sends a BLE message 2709 to the net tracker telling the net tracker to start "watching" (step 2710) for a net event (i.e., shot-made event or rim-bounce event), which can be used as a shot-taken indicator. The app then causes the smart phone or other mobile computing device to give the player a countdown and then a shoot command (2711), at which point the player takes a shot. Subsequently, if the net tracker identifies a net event, it sends a BLE message 2712 to the app telling the app that a shot has been taken; alternatively, the player or someone else can press a button on the smart phone (step 2713) indicating that a shot has been taken. Either event will suffice to indicate that a shot has been taken (2714), and the app sends a corresponding BLE message 2715 to the wrist tracker telling the wrist tracker that the shot has been taken so that the wrist tracker can stop recording data (step 2716).

The app then checks at step 2717 whether, as determined based on its own execution of the training shot loop 2706a/2706b, five training shots of the particular type have been taken. If not, processing returns to the beginning of the training shot loop 2706a/2706b for the player to take another shot and for the wrist tracker to record more data. If, on the other hand, five shots are assessed by the app to have been taken, the training shot loop terminates.

At that point, the algorithm implements a check, at step 2718, to make sure that five shots have actually been detected, and that the wrist tracker buffer has been populated for five separate shots. If it is determined at step 2719 that five shots have not been actually sensed/detected fully by the wrist tracker and the data buffers populated accordingly, any data that has been accumulated is discarded on the basis that the training session was not successful, and the algorithm return to step 2705 to conduct another five-shot training cycle. On the other hand, if five training shots for a particular type of shot have been detected and data for those five shots has been fully recorded, the training phase is considered complete and processing stops.

FIGS. 28A-28F, on the other hand, illustrate in detail how, specifically, the profile data is built for each of the various types of shots a player might take, evaluating each of the five shots in the group of training shots that have been taken for the particular type of shot. It is based largely on constructing a "smoothed" profile using three-point-in-time moving averages of accelerations of the player's arm/wrist, and identifying average values of deviation, at each point in time, of actual values from average values so that how closely an actual sequence of player motions matches the profile can be ascertained later on (to be used in connection with identifying an actual shot).

Furthermore, it should be noted that in the algorithms shown in FIGS. 28A-28F and 29A-29C, and in contrast to the embodiment described above, the X-axis of the wrist tracker accelerometer is oriented along the player's forearm and is positive in the direction pointing toward the player's fingertips. The accelerometer's Y-axis is perpendicular to the X-axis and extends laterally relative to the accelerometer, such that the XY-plane defined by the X- and Y-axes is coincident with the plane of the accelerometer. Finally, the Z-axis extends perpendicularly to the XY-plane/accelerometer plane, i.e., into and out of the surface of the player's arm.

As an initial step 2801, the algorithm checks to make sure that the wrist tracker CPU is recording data into the various buffer locations. If it is not, the data-recording function of the CPU is initialized (step 2802) to "wake it up;" the "global" buffers are cleared (step 2803); and the shot group buffers are cleared (step 2804). (The term "global" is used herein to indicate that data so designated applies to or has been calculated from all five test shots, as opposed to just individual shots.) In other words, with respect to the global buffers, sensed moving-average acceleration values GAx, GAy, and GAz along the X-, Y-, and Z-axes, respectively, are set to zero, as are moving-average gravitational components GGx, GGy, and GGz of those sensed acceleration values along the X-, Y-, and Z-axes. Furthermore, the moving-averaged quaternion values GQ1, GQ2, GQ3, and GQ4 are all set to zero, as are average deviation values of sensed X-, Y-, and Z-axis accelerations; average deviation values of X-, Y-, and Z-axis gravitational components of the sensed acceleration values; and average deviation values of the quaternion data. With respect to the shot group buffers (the term "group" being used here to refer to a group of training shots of a particular type), actual (i.e., non-moving-averaged) sensed acceleration values Ax, Ay, and Az along the X-, Y-, and Z-axes, respectively, are set to zero, as are actual gravitational components Gx, Gy, and Gz of those sensed acceleration values along the X-, Y-, and Z-axes. Actual quaternion values Q1, Q2, Q3, and Q4 are also all set to zero. Furthermore, a Training Shot Indicator (TSI) flag, which is set to True (value=1) when a net event BLE message (2712, FIG. 27) is sent or when someone presses a button on the smart phone (step 21713, FIG. 27) indicating that a training shot has been taken, will be initialized to False (value=0).

Next, the CPU reads the sensed X-, Y-, and Z-axis acceleration values Ax', Ay', and Az' that are output by the wrist tracker accelerometer at step 2805, and it reads (step 2806) and stores in corresponding buffer locations (step 2807) the quaternion values Q1, Q2, Q3, and Q4 for the particular instant of time. As explained above, the quaternion data identifies the rotational/angular orientation of the X-, Y-, and Z-axes of the wrist tracker accelerometer relative to Earth. Using that information, the algorithm is able to calculate the gravitational components Gx, Gy, and Gz of the measured or sensed accelerations along each of the three axes (step 2808), and those values are stored in corresponding buffer locations at step 2809. Then, the algorithm calculates (step 2810) and stores in corresponding buffer locations (2811) actual acceleration of the player's wrist along each of the three axes, i.e., Ax, Ay, and Az, by subtracting the gravitational component of acceleration along each of the three axes from the sensed or measured acceleration along each of the three axes. In other words, the algorithm calculates actual acceleration values as:

$$A_x = A_x' - G_x$$

$$A_y = A_y' - G_y$$

$$A_z = A_z' - G_z$$

Additionally, at step 2812, the algorithm calculates the angle of inclination, $Theta_x$ of the player's forearm (i.e., the angle of inclination of the sensor's X-axis) relative to horizontal, and the algorithm calculates the angle of inclination, $Theta_{xy}$, that the X-Y plane of the accelerometer makes with respect to horizontal, and these values are also stored in corresponding buffer locations (step 2813). More particularly, these values are calculated as:

$$Theta_x = a\sin(G_x/1000)$$

$$Theta_{xy} = 90 - a\cos(\sqrt{G_x^2+G_y^2}/\sqrt{G_x^2+G_y^2+G_z^2})$$

(Gx is divided by 1000 in the first equation immediately above because, as noted above, the particular accelerometer that is used in the disclosed embodiments outputs acceleration values using a scale where 1 g=1000.)

Subsequently, at step 2814, the algorithm checks to see whether $Theta_x$ and $Theta_{xy}$), are each greater than 10° for the particular instant of time, which is consistent with the player's arm being raised above the horizon into position to shoot the ball. If they are greater than 10°, the algorithm sets as true (step 2815) a recording flag, which indicates that data is being recorded, and data—namely, actual acceleration values along each of the three accelerometer axes, gravitational components along the three axes, quaternion values, and the current value of TSI—is recorded to the appropriate buffer locations at step 2816. The algorithm then cycles back to the beginning and executes again one one-hundredth of a second later, and as long as the player's arm is raised into a potential shooting position, data will be accumulated in the buffers. On the other hand, if the player's arm comes back down and either of $Theta_x$ and $Theta_{xy}$ drops to less than 10°, the algorithm will proceed to step 2817 of FIG. 28B by way of flow chart connector FC1.

Step 2817 of FIG. 28B may be reached either before the player has ever raised his or her arm into potential shooting position or after the player has made a shot and brought his or her arm back down. Therefore, in step 2817, the algorithm checks to see whether the buffer count (i.e., the number of times data has been written to the buffers, with each successive buffer count corresponding to a point in time that is one one-hundredth of a second later than the preceding buffer count) is greater than 100, which corresponds to one second worth of data having been written to the buffers. If the buffer count is less than 100, then step 2817 would have been reached before the player ever had his or her arm high enough (i.e., greater than 10°) to be in shooting position, or the player only had his or her arm at a potential shooting angle for a brief period of time that was not long enough for a shot actually to have been taken, e.g., as in a "pump-fake." (It has been empirically determined that at least one second—corresponding to 100 buffer counts when the algorithm is executing at 100 cycles per second—is required for a player to take a shot.) In that case, the shot group buffers are cleared (step 2818), the recording flag is set to false (step 2819), and the algorithm cycles back to the beginning and executes again one one-hundredth of a second later. Thus, because not all accelerometer data that is written to the buffers is actually saved for subsequent processing, that data which is, in fact, written and saved may be referred to as "a qualified portion" of the data the accelerometer generates.

On the other hand, if the buffer count exceeds 100 (i.e., more than one second of data has been recorded) at step 2817, the algorithm assesses where, within the time-span of data it has collected, it needs to start analyzing the data to find the point that the test shot actually has been taken (indicated by maximum value of "jerk" or magnitude of total acceleration). Therefore, the algorithm first looks for either a point in time where the shot indicator TSI is already present (value of 1) or, if no shot indicator was initially present, a point in time where the player's arm was raised in a "cocking" motion to start a shot. This is to ensure that the subsequent data analysis considers the appropriate portion of data. Accordingly, the algorithm picks its starting point (i.e., the buffer count or sequential time-increment number or index) for its search slightly differently depending on when/how the TSI flag was set to 1.

More particularly, once the buffer count value has exceeded 100 (and after the player's arm or the accelerometer plane angle has come back down to less than 10°), the algorithm determines at step 2820 whether there was a contemporaneous indication of a shot being taken (TSI value of 1), as would be the case if the player or someone else pressed a button on the smart phone/computing device or on the wrist tracker so indicating (i.e., step 2713, FIG. 27). If it is determined in step 2820 that the TSI has not been set (TSI is not equal to 1), then the algorithm next proceeds to step 2821 of FIG. 28C by way of flow chart connector FC3, where it waits a predetermined period of time, e.g., two seconds, and then checks again at step 2822 to determine if there is an indication of a training shot being taken (TSI value of 1), as might be the case where a net event has been detected and a net-event BLE message has been sent (i.e., step 2712, FIG. 27). If it is determined at step 2822 that the training shot indicator has been set (TSI value is 1), the algorithm proceeds to step 2829 of FIG. 28C (discussed in more detail below). Otherwise, the algorithm returns to step 2818 of FIG. 28B by way of flow chart connector FC4, where the shot group buffers are cleared (step 2818), the recording flag is set to false (step 2819), and the processing ends because the algorithm is complete. The algorithm will be executed again (beginning at step 2801 of FIG. 28A) one one-hundredth of a second later.

Continuing on FIG. 28B, if it is determined at step 2820 that the train shot indicator is set (TSI value of 1), the assumption is that it will be fairly easy to find the actual buffer or index value (i.e., the specific sequential time-increment number) where the shot was taken within a one-second window of time. Therefore, the algorithm executes an index-identifying loop (first shot-localizing branch) defined by the start and end points of 2824A and 2824B, respectively, in FIG. 28B. When this loop is started (at 2824A), the index (time increment) at which to examine the data for the maximum jerk is initially set to 0, i.e., the very beginning of the window's worth of data that has been stored in the wrist tracker buffer. The algorithm then checks whether the training shot indicator was present at that point in time (step 2825), i.e., whether TSI for the particular point in time is equal to 1. If the training shot indicator is not equal to 1, the algorithm determines whether it is at the end of the buffer i.e., whether it has reached the last possible index number for which data is present in the buffer (step 2826). If it is determined at step 2826 that the answer is "no" (i.e., there are more index numbers/points in time for which data exists in the buffer), then the algorithm increments the index value by one and checks again (step 2825) whether the training shot index value for that next incremental point in time is 1.

Once the algorithm finds its first incremental point in time (i.e., index number) where the TSI value is 1 (i.e., the answer at step 2825 is "yes"), the algorithm sets the index value at which to start looking for maximum jerk to be that index value (i.e., where TSI first became 1) at step 2827 ("startindex=index") and exits the index-incrementing portion of the loop. The algorithm then "resets" the point in time at which to start looking for maximum jerk to be one second earlier ("startindex=index−100") at step 2828, exits the shot-localizing branch (1) (step 2824B), and then proceeds to step 2835 of FIG. 28D by way of flow chart connector FC2. The details of FIG. 28D will be discussed below.

Returning again to FIG. 28C, when the system determines in steps 2821 and 2822 that there has been a slight delay in TSI becoming 1, the algorithm next looks for the point in time where the gravitational component of measured acceleration in the Z-direction (Gz) is minimized and sets the maximum-jerk-search starting point three seconds earlier. More particularly, the algorithm locates the point in time at which the ball is "cocked" overhead and ready to be shot, and then sets the search-starting point three seconds earlier in time. (In this regard, it should be recalled that Gz will have a maximum value of 1000 when the player's arm is held perfectly horizontal with the accelerometer parallel to the ground; it (Gz) will decrease to 0 when the player's forearm is pointing straight up; and it will become negative, with a lowest possible value of −1000, as the player's arm moves past vertical and toward the player's head, with a palm-up orientation.)

Thus, at step 2829, the minimum value of Gz is initialized to its maximum possible value (minGz=1000), and the index-identifying loop with start and end points 2830B and 2830B, respectively, is executed. When this loop is started, the index (time increment number) at which to examine the data for the maximum jerk is initially set to 0 at step 2830A, i.e., the very beginning of the window's worth of data that has been stored in the wrist tracker buffer. The algorithm then checks, at step 2831, whether Gz, the gravitational component of acceleration along the Z-axis, for the particular point in time is less than the previously set value of minimum Gz. If it is not, the algorithm checks at step 2832 to see whether it has reached the last possible index number for which data is present in the buffer. If the answer is "no" (i.e., there are more index numbers/points in time for which data exists in the buffer), the algorithm increments the index value by one and checks again (step 2831) to see whether the next value of Gz is less than the previously set value of minimum Gz. On the other hand, if the value of Gz for the given point in time is determined at step 2831 to be less than the previously set value of minimum Gz, then the minimum value of Gz is reset to be equal to Gz for that increment of time at step 2832 (minGz=Gz) and the search-start index is set to be the index value for that particular increment of time (startindex=index) at step 2833. The steps between steps 2830A through 2830B are referred to hereinafter as the second shot-localizing branch).

The algorithm then checks once again, at step 2832, to see whether it has reached the last possible index number for which data is present in the buffer. If the answer is "no" (i.e., there are still more index numbers/points in time for which data exists in the buffer), the algorithm increments the index value by one and checks again (step 2831) to see whether the next value of Gz is less than the previously set value of minimum Gz. In this manner, the algorithm is able to locate the point in time at which the actual lowest value of Gz occurs, assumed to correspond to the player "cocking" the ball before taking the shot. If the answer in step 2831 is "yes," however, the algorithm exits the index-incrementing portion of the loop; "resets" the point in time at which to start looking for maximum jerk to be three seconds earlier ("startindex=index−300") at step 2834; exits the shot-localizing loop (step 2830B), and processing continues at step 2835 of FIG. 28D by way of flow chart connector FC2. The details of FIG. 28D will be discussed immediately below.

Beginning at step 2835 of FIG. 28D, the algorithm proceeds to find the point in time (and the corresponding index value) at which maximum jerk occurs for the particular shot being processed within the five-shot group of shots, and it then sets a 0.6-second window, centered around that point in time of maximum jerk, over which to process the data. The algorithm looks for this particular window, centered around the point of maximum jerk, because the point of maximum jerk will be the point in time at which the player's arm fires the ball or when the ball has just left the player's hand.

Thus, at step 2835 of FIG. 28D, jerk-related values are initialized by setting a jerk value equal to 0 (jerk=0) and by setting a maximum jerk value equal to zero (maxJerk=0). The algorithm then begins a maximum-jerk-finding loop—beginning with the search-starting index value identified by the steps in FIG. 28B (first shot-localizing branch) or the steps in FIG. 28C (second shot-localizing branch), as explained above. The maximum jerk finding loop, which is bounded by start and end points 2836A and 2836B of FIG. 28D finds the point of maximum jerk. In particular, at step 2837, the algorithm calculates jerk for a given point in time as:

$$jerk = \sqrt{A_{x[i]}^2 + A_{y[i]}^2 + A_{z[i]}^2},$$

where $A_x$, $A_y$, and $A_z$ are the acceleration values along the X-, Y-, and Z-axes for a given index value i (i.e., particular point in time), starting with i being equal to the startindex value determined immediately previously.

At step 2838, the algorithm checks to see whether the jerk value for the given moment in time is greater than the previously set maximum jerk value. If it is not, the algorithm checks at step 2839 to see whether it has reached the last possible index number for which data is present in the buffer. If the answer is "no" (i.e., there are more index numbers/ points in time for which data exists in the buffer), the algorithm increments the index value by one and checks again (step 2838) to see whether the next value of jerk is greater than the previously set value of maximum jerk.

On the other hand, if the value of jerk for the given point in time is determined at step 2838 to be greater than the previously set value of maximum jerk, then the maximum jerk value is reset to be equal to the jerk value for that increment of time at step 2840 (maxjerk=jerk), and the index at which the maximum jerk value occurs is reset to be equal to the then-current index value (maxjerkindex=index) at step 2841. Additionally, at step 2842, the algorithm resets the starting index value (to be used for subsequent data processing)—the starting index value previously was determined in order to identify where the algorithm should begin searching for the maximum jerk value, as explained above—to a point in time 0.3 second earlier. (The basis for doing so is the fact that a 0.6-second window of time centered at the moment when maximum jerk occurs provides a sufficient "window" of data against which to compare incoming "live" data later on to identify shot-attempt events.)

The algorithm then checks once again, at step 2839, to see whether it has reached the last possible index number for which data is present in the buffer. If the answer is "no" (i.e., there are still more index numbers/points in time for which data exists in the buffer), the algorithm increments the index value by one and checks again (step 2838) to see whether the next value of jerk is greater than the previously set value of maximum jerk. (In this manner, the algorithm is able to locate the point in time at which the actual maximum jerk value occurs.) If the answer is "yes," however, the algorithm exits the index-incrementing portion of the loop, and it exits the maximum-jerk-finding loop (end point 2836B). The beginning of the 0.6-second window over which to process data to build the shot profile will now have been set.

Next, the algorithm progresses, by way of flow chart connector FC5, to step 2843 of FIG. 28E, where the algorithm sets the end of the 0.6-second window over which to process data by adding 60 index counts—i.e., 0.6 second—to the starting index value that has been set (reset, actually) in this manner. In other words, at step 2843, the algorithm sets endindex=startindex+60. As noted above, the shot profiles are built based on three-point-in-time moving averages of accelerations of the player's arm/wrist. For each parameter that is tracked (acceleration along each of the X-, Y-, and Z-axes; gravitational components thereof; and quaternion data), the three-point-in-time moving average is calculated by averaging the parameter value for a given increment of time with the parameter values at the immediately preceding and immediately following increments of time. Additionally, because the subsequent analysis sequentially "folds" data from each of the five shots in a given group of training shots into previously calculated (or, for the first shot, previously zeroed) moving averages, it becomes important in connection with the values in the data buffers to keep track of a group number—representing the shot number (e.g., 1-5) within the sequence of training shots taken—as well as a sequence number (running from 0-59) that identifies which of the particular points in time in the 0.6-second window is being considered.

Thus, at this point in the overall process flow and using another loop, the algorithm calculates the three-point moving averages for each of the three acceleration values; for each of the three gravitational component values; and for each of the four quaternion values at each point in time along the span of the 0.6-second window, starting at the point in time having the startindex value determined as above. Before the moving averages are calculated, however, the original values are copied into a temporary or holding buffer for the shot, since the raw data will be written over as the averaging process—which relies on data from a previous time increment to calculate the average at a given time increment—is conducted and otherwise would be lost.

The temporary buffer is a two-dimensional array—meaning it tracks both the group number (i.e., the shot number in the five-shot training sequence) as well as the index value— because the temporary values will be used subsequently to calculate deviations as explained below, and it is necessary to keep track of or to "group" the parameter values according to their corresponding shot-number when doing so. On the other hand, because the moving-average values are "folded into" the global moving average values as soon as the moving-averages buffer has been populated as explained below, and because they are not "carried along" further in the process, it is only necessary for the actual parameter values to be stored in a one-dimensional array instead of a two-dimensional array.

Furthermore, to avoid calling undefined or nonexistent values, initial values for each of the temporary buffer and the moving-averages buffer are populated before the loop is executed, in what may be referred to as predicate, "primed" steps. Thus, at step 2846' of FIG. 28E, the initial values for the temporary shot buffer are populated as follows (with T indicating "temporary"):

$TA_x[\text{group}][0] = A_x[\text{startindex}]$ $TA_y[\text{group}][0] = A_y[\text{startindex}]$ $TA_z[\text{group}][0] = A_z[\text{startindex}]$ $TG_x[\text{group}][0] = G_x[\text{startindex}]$ $TG_y[\text{group}][0] = G_y[\text{startindex}]$ $TG_z[\text{group}][0] = G_z[\text{startindex}]$ $TQ1[\text{group}][0] = Q1[\text{startindex}]$ $TQ2[\text{group}][0] = Q2[\text{startindex}]$ $TQ3[\text{group}][0] = Q3[\text{startindex}]$ $TQ4[\text{group}][0] = Q4[\text{startindex}]$.

Additionally, at step 2847', the initial values for the three-point moving averages buffer are populated as follows:

$A_x[\text{startindex}] = (TA_x[\text{group}][\text{startindex}-1] + A_x[\text{startindex}] + A_x[\text{startindex}+1])/3$ $A_y[\text{startindex}] = (TA_y[\text{group}][\text{startindex}-1] + A_y[\text{startindex}] + A_y[\text{startindex}+1])/3$ $A_z[\text{startindex}] = (TA_z[\text{group}][\text{startindex}-1] + A_z[\text{startindex}] + A_z[\text{startindex}+1])/3$ $G_x[\text{startindex}] = (TG_x[\text{group}][\text{startindex}-1] + G_x[\text{startindex}] + G_x[\text{startindex}+1])/3$ $G_y[\text{startindex}] = (TG_y[\text{group}][\text{startindex}-1] + G_y[\text{startindex}] + G_y[\text{startindex}+1])/3$ $G_z[\text{startindex}]=(TG_z[\text{group}][\text{startindex}-1]+G_z[\text{startindex}]+G_z[\text{startindex}+1])/3$ $Q1[\text{startindex}]=(TQ1[\text{group}][\text{startindex}-1]+Q1[\text{startindex}]+Q1[\text{startindex}+1])/3$ $Q2[\text{startindex}]=(TQ2[\text{group}][\text{startindex}-1]+Q2[\text{startindex}]+Q2[\text{startindex}+1])/3$ $Q3[\text{startindex}]=(TQ3[\text{group}][\text{startindex}-1]+Q3[\text{startindex}]+Q3[\text{startindex}+1])/3$ $Q4[\text{startindex}]=(TQ4[\text{group}][\text{startindex}-1]+Q4[\text{startindex}]+Q4[\text{startindex}+1])/3.$ Once the initial values of the temporary buffer and the three-point moving averages buffer have been so populated in the "primed" steps, the algorithm executes the loop (starting point 2845a, starting value of index being equal to (startindex+1)) to populate and calculate/populate the rest of the values in the temporary-values buffer and the moving-averages buffer, respectively, as follows:

$TA_x[\text{group}][\text{index}-\text{startindex}]=A_x[\text{index}]$ $TA_y[\text{group}][\text{index}-\text{startindex}]=A_y[\text{index}]$ $TA_z[\text{group}][\text{index}-\text{startindex}]=A_z[\text{index}]$ $TG_x[\text{group}][\text{index}-\text{startindex}]=G_x[\text{index}]$ $TG_y[\text{group}][\text{index}-\text{startindex}]=G_y[\text{index}]$ $TG_z[\text{group}][\text{index}-\text{startindex}]=G_z[\text{index}]$ $TQ1[\text{group}][\text{index}-\text{startindex}]=Q1[\text{index}]$ $TQ2[\text{group}][\text{index}-\text{startindex}]=Q2[\text{index}]$ $TQ3[\text{group}][\text{index}-\text{startindex}]=Q3[\text{index}]$ $TQ4[\text{group}][\text{index}-\text{startindex}]=Q4[\text{index}],$ (step 2846), and $A_x[\text{index}] = (TA_x[\text{group}][\text{index}-\text{startindex}-1] + A_x[\text{index}] + A_x[\text{index}+1]/3$ $A_y[\text{index}] = (TA_y[\text{group}][\text{index}-\text{startindex}-1] + A_y[\text{index}] + A_y[\text{index}+1]/3 A_z[\text{index}] = (TA_z[\text{group}][\text{index}-\text{startindex}-1] + A_z[\text{index}] + A_z[\text{index}+1])/3$ $G_x[\text{index}] = (TG_x[\text{group}][\text{index}-\text{startindex}-1] + G_x[\text{index}] + G_x[\text{index}+1]/3 G_y[\text{index}] = (TG_y[\text{group}][\text{index}-\text{startindex}-1] + G_y[\text{index}] + G_y[\text{index}+1])/3 G_z[\text{index}] = (TG_z[\text{group}][\text{index}-\text{startindex}-1] + G_z[\text{index}] + G_z[\text{index}+1])/3 Q1[\text{index}] = (TQ1[\text{group}][\text{index}-\text{startindex}-1] + Q1[\text{index}] + Q1[\text{index}+1]/3 Q2[\text{index}] = (TQ2[\text{group}][\text{index}-\text{startindex}-1] + Q2[\text{index}] + Q2[\text{index}+1]/3 Q3[\text{index}] =$ $(TQ3[\text{group}][\text{index}-\text{startindex}-1] + Q3[\text{index}] + Q3[\text{index}+1]/3 Q4[\text{index}] = (TQ4[\text{group}][\text{index}-\text{startindex}-1] + Q4[\text{index}] + Q4[\text{index}+1])/3$ (step 2847), where "index" is the actual sequential number of the time increment being considered, starting from the point in time when the CPU started recording data; and the difference value of "index−startindex" (running from 0 to 59) indicates where, as within the 0.6-second window being considered, the value would be located. This effectively functions as a low-pass filter and smoothes the data within the 0.6-second profile window.

After the moving-average buffer values have been calculated and used to replace the "raw" parameter data in the buffers, the algorithm calculates global moving average values for the parameters, for each point in time in the 0.6-second window, which global values represent an averaging over all five training shots for each of the parameters at each particular point in time in the window. Additionally, instead of adding the particular parameter values at a given point in time within the window for all five training shots and then dividing by five, the algorithm starts with the three-point-moving-averaged data for the first training shot, calculates a global moving average (which will be equal to the moving-average value from the first training shot the first time a global moving average value is calculated), and then "folds in" moving-average data from the next training shot into the global moving average as the algorithm proceeds to process the data from all five of the training shots. In other words, the algorithm takes the previously calculated global value; "deaverages" it by multiplying by the previous group number (which yields what the sum of actual values would have been at that point in the previous calculation); adds in the next (i.e., currently-being-processed) value; and then divides by the current group number to yield the "updated" global average value, with the current parameter value "folded into" the global average.

Thus, the algorithm enters a loop, with beginning and ending points 2848a and 2848b, respectively, where the global moving average values are calculated/updated as the algorithm successively processes data from each of the five training shots within the group. Furthermore, because the global moving average array will be used subsequently like a 0.6-second-wide template against which incoming "live" data will be compared, and that template will be "moved" from time-to-time-to-time along the stream of incoming "live" data, it is useful to provide the global moving average values with indices running from 0 to 59 to indicate where, sequentially within the 0.6-second window, each value is located (in contrast to "tagging" each value with an index representing where, within the entirety of the data the accelerometer has recorded, the value is located). Therefore, the global moving average values are calculated as follows:

$GA_x[\text{index}]=(GA_x[\text{index}]*(\text{group}-1)+A_x[\text{index}+\text{startindex}])/\text{group}$ $GA_y[\text{index}]=(GA_y[\text{index}]*(\text{group}-1)+A_y[\text{index}+\text{startindex}])/\text{group}$ $GA_z[\text{index}]=(GA_z[\text{index}]*(\text{group}-1)+A_z[\text{index}+\text{startindex}])/\text{group}$ $GG_x[\text{index}]=(GG_x[\text{index}]*(\text{group}-1)+G_x[\text{index}+\text{startindex}])/\text{group}$ $GG_y[\text{index}]=(GG_y[\text{index}]*(\text{group}-1)+G_y[\text{index}+\text{startindex}])/\text{group}$ $GG_z[\text{index}]=(GG_z[\text{index}]*(\text{group}-1)+G_z[\text{index}+\text{startindex}])/\text{group}$ $GQ1[\text{index}]=(GQ1[\text{index}]*(\text{group}-1)+Q1[\text{index}+\text{startindex}])/\text{group}$ $GQ2\text{index}]=(GQ2[\text{index}]*(\text{group}-1)+Q2[\text{index}+\text{startindex}])/\text{group}$ $GQ3[\text{index}]=(GQ3[\text{index}]*(\text{group}-1)+Q3[\text{index}+\text{startindex}])/\text{group}$ $GQ4[\text{index}]=(GQ4[\text{index}]*(\text{group}-1)+Q4[\text{index}+\text{startindex}])/\text{group}$ Similarly, the average position within the 0.6-second window of where the maximum-jerk value occurs, across all five training shots, is calculated, at step 2849, by "folding in" the index location value (ranging from 0-59) for each training shot into a previously calculated average maximum-jerk-index value, i.e., avgMaxJerkIndex=(avgMaxJerkIndex*(group)+maxJerk)/(group+1).

The group number (i.e., number of the training shot being processed) is then incremented at step 2850, and the algorithm advances to step 2851 of FIG. 28F by way of flow chart connector FC6, where it determines whether all five training shots have been processed, i.e., whether the value for group has reached 5 upon being incremented at step 2850 of FIG. 28E. If the algorithm has not processed all five training shots, the data-processing steps described above are repeated for the next training shot.

On the other hand, if it is determined in step 2851 of FIG. 28F that the algorithm has finished processing the data for all five training shots, it proceeds to create an array of average deviation values, which reflects how consistent the motion within each training shot was from shot-to-shot, thereby providing a "window" of confidence (e.g., error bars) for each data point that will be used to assess how closely a sample of data from a "live" movement event matches the training-shot-based profile when actual shots are being searched for. Furthermore, because the array only applies to the 60 data points within the 0.6-second window, index values for the array run from 0-59. To generate this array, the algorithm executes a nested pair of loops, with 1) the outer loop having start and end points 2852a and 2852b, respectively, and running from a shot group number of 1 to a shot group number of 5, and 2) the inner loop having start and end points 2853a and 2853b, respectively, and running from an index value of 0 to an index value of 59. Thus, "folding in" sequential data as explained above, the algorithm calculates deviation values for each of the accelerometer-based parameters and populates the deviation buffer array, using the absolute value of the difference between global average values and specific measured values (i.e., information retained in the temporary buffer array as addressed above), as follows (step 2854):

$DevA_x[\text{index}]=(DevA_x[\text{index}]*(\text{group}-1)+|GA_x[\text{index}]-TA_x[\text{group}-1][\text{index}]|)/\text{group}$ $DevA_y[\text{index}]=(DevA_y[\text{index}]*(\text{group}-1)+|GA_y[\text{index}]-TA_y[\text{group}-1][\text{index}]|)/\text{group}$ $DevA_z[\text{index}]=(DevA_z[\text{index}]*(\text{group}-1)+|GA_z[\text{index}]-TA_z[\text{group}-1][\text{index}]|)/\text{group}$ $DevG_x[\text{index}]=(DevG_x[\text{index}]*(\text{group}-1)+|GG_x[\text{index}]-TG_x[\text{group}-1][\text{index}]|)/\text{group}$ $DevG_y[\text{index}]=(DevG_y[\text{index}]*(\text{group}-1)+|GG_y[\text{index}]-TG_y[\text{group}-1][\text{index}]|)/\text{group}$ $DevG_z[\text{index}]=(DevG_z[\text{index}]*(\text{group}-1)+|GG_z[\text{index}]-TG_z[\text{group}-1][\text{index}]|)/\text{group}$ $DevQ1[\text{index}]=(DevQ1[\text{index}]*(\text{group}-1)+|GQ1[\text{index}]-TQ1[\text{group}-1][\text{index}]|)/\text{group}$ $DevQ2[\text{index}]=(DevQ2[\text{index}]*(\text{group}-1)+|GQ2[\text{index}]-TQ2[\text{group}-1][\text{index}]|)/\text{group}$ $DevQ3[\text{index}]=(DevQ3[\text{index}]*(\text{group}-1)+|GQ3[\text{index}]-TQ3[\text{group}-1][\text{index}]|)/\text{group}$ $DevQ4[\text{index}]=(DevQ4[\text{index}]*(\text{group}-1)+|GQ4[\text{index}]-TQ4[\text{group}-1][\text{index}]|)/\text{group}$ Finally, the algorithm constructs the Player Shot Data (PSD) array for the given type of shot using the global moving average values and the deviation values determined as described above, as well as the avgMaxJerkIndex. Thus, with the index value "new" being used to identify the particular type of shot to which the data relates, the algorithm populates the PSD array at step 2855 as follows:

$PSD\_A_x[new]=GA_x$ $PSD\_A_y[new]=GA_y$ $PSD\_A_z[new]=GA_z$ $PSD\_G_x[new]=GG_x$ $PSD\_G_y[new]=GG_y$ $PSD\_G_z[new]=GG_z$ $PSD\_Q1[new]=GQ1$ $PSD\_Q2[new]=GQ2$ $PSD\_Q3[new]=GQ3$ $PSD\_Q4[new]=GQ4$ $PSD\_DevA_x[new]=DevA_x$ $PSD\_DevA_y[new]=DevA_y$ $PSD\_DevA_z[new]=DevA_z$ $PSD\_DevG_x[new]=DevG_x$ $PSD\_DevG_y[new]=DevG_y$ $PSD\_DevG_z[new]=DevG_z$ PSD_MaxJerkIndew[new]=avgMaxJerkIndex.

The algorithm then clears the temporary five-shot array buffers (so that they are initialized to values of 0 for other types of shots to be trained) at step 2856 and sets a training flag to false (value=0) at step 2857 to indicate that the wrist tracker is not in the shot-training mode. At this point, the algorithm returns to step 2819 of FIG. 28B by way of flow chart connector FC7.

Figure 29A:
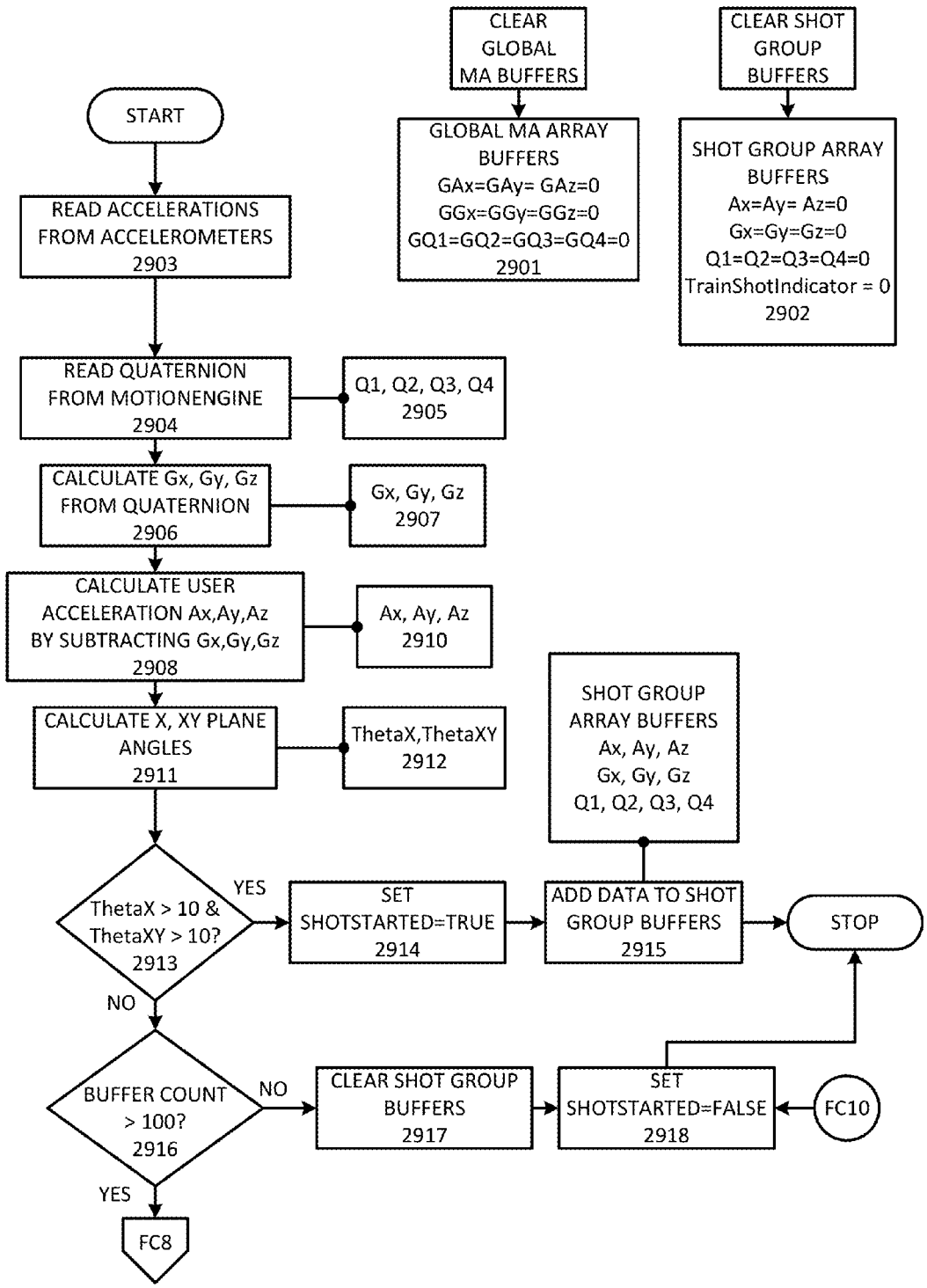
FIGS. 29A-29C are flow diagrams illustrating, in accordance with the second embodiment of the present invention, process steps executed by the wrist tracker CPU during the normal or shooting modes to identify shot-attempt events by comparing incoming sensor data to the data stored in the player shot data profiles.
Figure 29B:
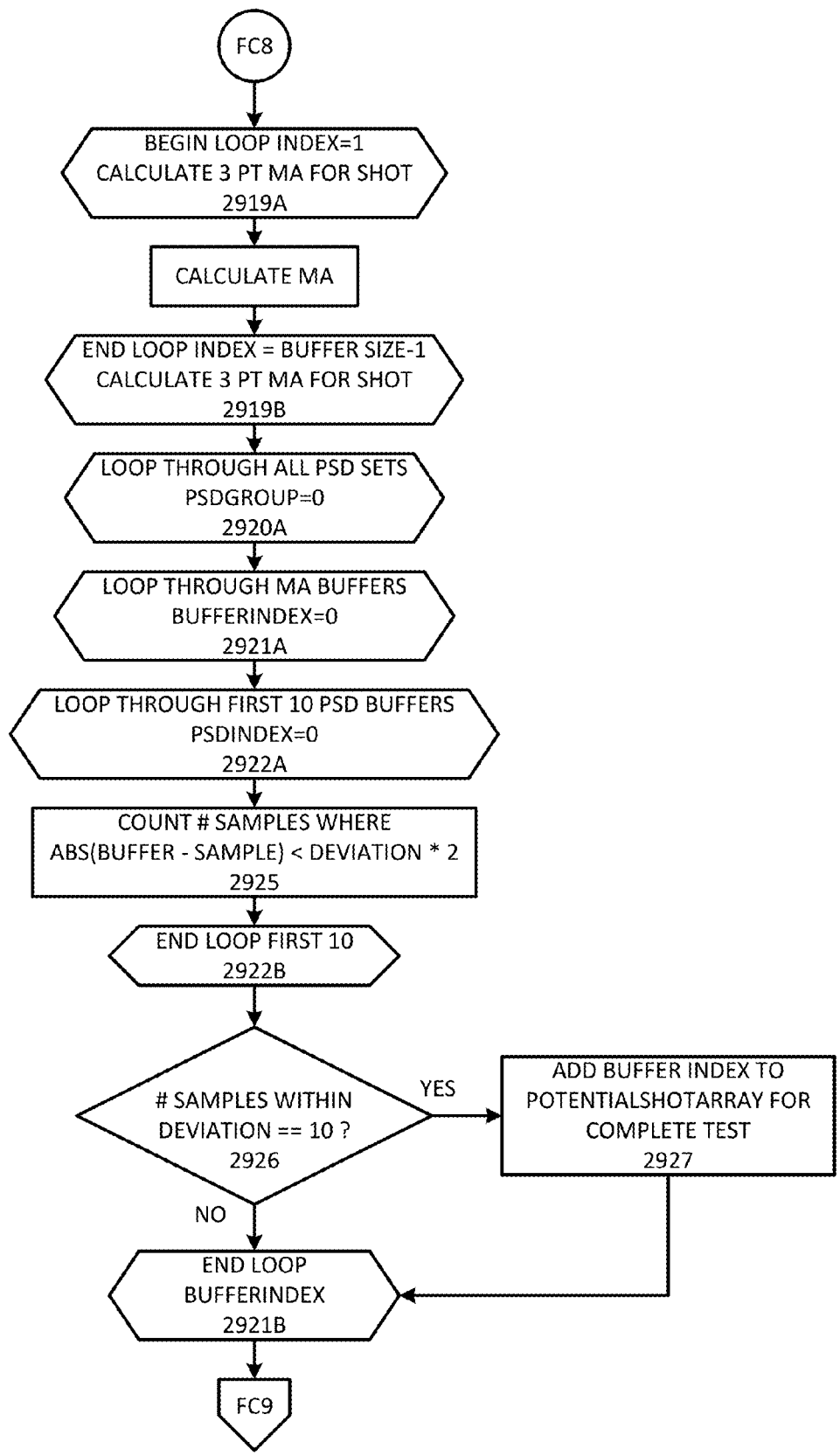
Figure 29C:
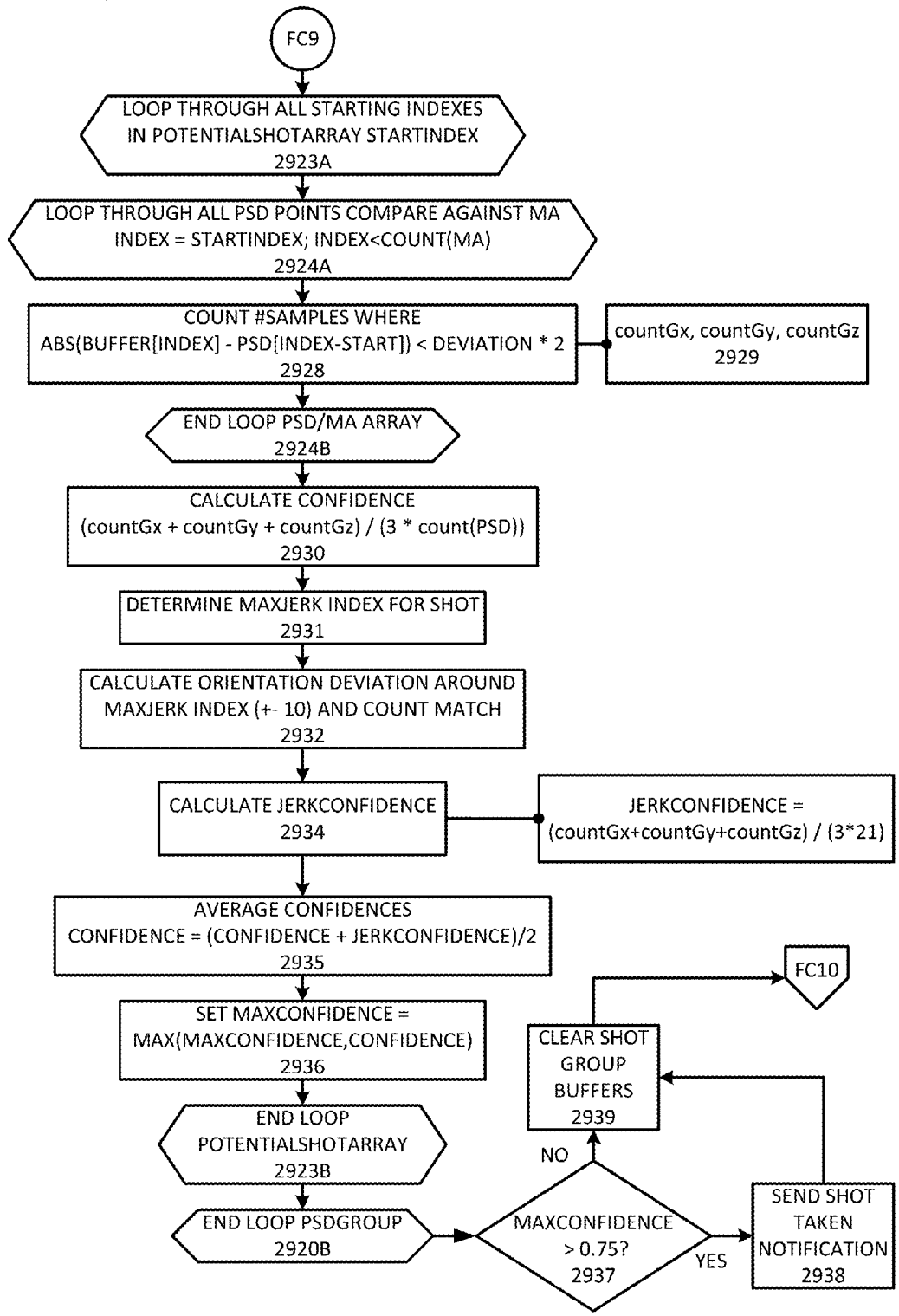

With training completed for all of the various types of shots the player may make, the wrist tracker is able to identify shot-attempt events according to the algorithm shown in FIGS. 29A-29C. In general, this algorithm—referred to as "the personal shooting algorithm"—will be cycling the entire time the wrist tracker is in "live" or "shooting" mode where an actual shot will or may be taken, e.g., during shooting practice or an actual game. Additionally, the algorithm "keys off of" the same indicia to indicate that a shot has been taken as are used when the wrist tracker is being trained, namely, that the player's arm has been raised more than 10° above horizontal for more than a second, as has the X-Y plane of the accelerometer.

Thus, as shown in FIG. 29A, an initial step in execution of the shooting algorithm, global moving array buffers with values as defined above, and shot-group array buffers containing X, Y, and Z acceleration values; X, Y, and Z gravitational components; and Q1, Q2, Q3, and Q4 quaternion values as output by the wrist tracker accelerometer, are cleared (i.e., values are set to 0) at steps 2901 and 2902. Additionally, a training shot indicator flag is also set to 0.

Subsequently, acceleration values along each of the X-, Y-, and Z-axes as output by the wrist tracker accelerometer are read at step 2903, as are quaternion values Q1, Q2, Q3, and Q4 at step 2904, with the quaternion values being written to an array (step 2905). Gravitational components $G_x$, $G_y$, and $G_z$ of the measured X-, Y-, and Z-acceleration values are calculated from the quaternion data at step 2906, and those values, too, are written to an array (step 2907). Values for the actual X-, Y-, and Z-acceleration of the player's arm are then calculated by subtracting corresponding gravitational components at step 2908, and the actual acceleration values Ax, Ay, and Az are written to an array (step 2910).

Next, the angle of inclination, Thetax, of the player's forearm relative to horizontal and the angle of inclination, Thetaxy, that the X-Y plane of the accelerometer makes with respect to horizontal are calculated in the same manner as described above, at step 2911, and these values are also stored in corresponding buffer locations (step 2912).

Subsequently, at step 2913, the shooting algorithm checks to see whether Thetax and Thetaxy are both greater than 10°. If both Thetax and Thetaxy are greater than 10°, the algorithm sets as true (value=1), at step 2914, a shot-started flag indicating that a shot is putatively being taken, and accelerometer-based data—namely, actual acceleration values along each of the three accelerometer axes, gravitational components along the three axes, and quaternion values—is recorded to the appropriate Shot Group Array buffer locations at step 2915. The algorithm then terminates and executes again one one-hundredth of a second later. As long as the player's arm is raised into a potential shooting position, data will be accumulated in the buffers. On the other hand, if the player's arm comes back down and either of Thetax and Thetaxy drops to less than 10°, the algorithm will proceed to subsequent analytical steps.

In particular, at step 2916 of FIG. 29A, which is reached either before the player has ever raised his or her arm into potential shooting position or after the player has brought his or her arm back down from a position where a shot might have been taken—it is not known at this point in the algorithm whether a shot actually was taken—the algorithm checks to see whether the buffer count (i.e., the number of times data has been written to the buffer) is greater than 100, which corresponds to one second worth of data having been written to the buffers. If the buffer count is less than 100, then step 2916 would have been reached before the player ever had his or her arm high enough (i.e., greater than 10°) to be in shooting position, or the player only had his or her arm at a potential shooting angle for a brief period of time that was not long enough for a shot actually to have been taken. In that case, the shot group buffers are cleared (step 2917), the shot-started flag is set to false (step 2918), and the algorithm cycles back to the beginning and executes again one one-hundredth of a second later. Thus, because not all accelerometer data that is written to the buffers is actually saved for subsequent processing, that data which is, in fact, written and saved may be referred to as "a qualified portion" of the data the accelerometer generates.

On the other hand, if it is determined at step 2916 of FIG. 29A that the buffer count exceeds 100 (i.e., more than one second of data has been recorded), the algorithm progresses to step 2919A of FIG. 29B by way of flow chart connector FC8, where the algorithm proceeds to analyze the data that has been accumulated to determine whether a shot actually has been taken. To this end, the algorithm first calculates three-point moving averages of the data for the various parameters to smooth it out, much like a low-pass filter, in generally the same manner as before. However, instead of "copying" the data to a temporary buffer as described above in connection with FIGS. 28A-28F to avoid "losing" the data values for preceding time increments which is needed for the moving-average calculation, and then overwriting the actual data values with the moving-average values, the shooting algorithm simply writes the moving-average values to a separate, moving-average buffer instead. Additionally, to avoid calling non-existent data values, the moving averages for each of the parameters are calculated starting at an index of 1 (to avoid calling a non-existent value for a time before the buffer starts recording) and ending at an index equal to 1 less than the size of the array, e.g., size($A_x$)−1 (to avoid calling a non-existent value for a time after the buffer has stopped recording).

Thus, the shooting algorithm calculates moving averages via a loop, with starting point at step 2919a and end point at step 2919b, as follows:

$$MA_x[\text{index}]=(A_x[\text{index}-1]+A_x[\text{index}]+A_x[\text{index}+1])/3$$

$$MA_y[\text{index}]=(A_y[\text{index}-1]+A_y[\text{index}]+A_y[\text{index}+1])/3$$

$$MA_z[\text{index}]=(A_z[\text{index}-1]+A_z[\text{index}]+A_z[\text{index}+1])/3$$

$$MG_x[\text{index}]=(G_x[\text{index}-1]+G_x[\text{index}]+G_x[\text{index}+1])/3$$

$$MG_y[\text{index}]=(G_y[\text{index}-1]+G_y[\text{index}]+G_y[\text{index}+1])/3$$

$$MG_z[\text{index}]=(G_z[\text{index}-1]+G_z[\text{index}]+G_z[\text{index}+1])/3$$

$$MQ1[\text{index}]=(Q1[\text{index}-1]+Q1[\text{index}]+Q1[\text{index}+1])/3$$

$$MQ2[\text{index}]=(Q2[\text{index}-1]+Q2[\text{index}]+Q2[\text{index}+1])/3$$

$$MQ3[\text{index}]=(Q3[\text{index}-1]+Q3[\text{index}]+Q3[\text{index}+1])/3$$

$$MQ4[\text{index}]=(Q4[\text{index}-1]+Q4[\text{index}]+Q4[\text{index}+1])/3$$

Once the moving average buffers have been populated for the acceleration, gravitational-component, and quaternion-component values, the algorithm is able to start looking for shot-attempt events by comparing $G_x$, $G_y$, and $G_z$ data within the moving average buffers against the corresponding PSD data for each of the possible types of shot that might have been taken and for which the wrist tracker has been trained. (Only the gravitational components of acceleration need to be compared, since they are the parameters that actually reveal arm/wrist position and allow a shot-attempt to be identified; it may be useful nonetheless to maintain the data for all ten moving-average parameters.) To expedite the process, the algorithm first does a preliminary or "qualifying" check to see whether, for a given window of time within the "live" moving-average data, the first ten values for each of the parameters $G_x$, $G_y$, and $G_z$ matches the first ten values within the corresponding PSD array. If they do, the starting position within the moving-average array of values (i.e., the first index of the window's worth of time) is recorded, so that subsequently that portion of the data can be examined more thoroughly for a shot-attempted match.

Thus, the algorithm executes a series of loops with an outermost loop 2920 "bounding" two pairs of nested loops defined by steps 2921/2922 and steps 2923/2924. The outermost loop 2920 corresponds to the various types of shots that can be taken and for which the wrist tracker has been trained, and therefore it loops through all of the PSD sets, starting with a PSDGroup index value of 0 at beginning point 2920a.

As soon as the algorithm begins to consider the possibility that data within the moving-averages buffers corresponds to a shot of a given type, the algorithm executes the ten-point pre-check by means of the first pair of nested loops 2921/2922. Thus, starting at 2921A with an initial moving-averages buffer index of 1, the algorithm executes the inner loop 2922. Starting at 2922A with the first ten sets of parameter values (i.e., sets of the three parameters Gx, Gy, and Gz,) in the PSD buffers, the inner loop 2922 compares the data in the PSD buffer to a ten-increment window of data in the moving-averages buffer (step 2925), and that comparison is done on a time-increment-by-corresponding-time-increment basis as the inner loop steps through the first ten time increments worth of data in the PSD buffer. In making that comparison at step 2925, the algorithm counts the number of times all three parameter values for a given increment of time within the PSD buffer (i.e., with a given PSD index) match all three parameter values for the corresponding increment of time in the moving-averages buffer to within twice the average deviation that has been calculated (as explained above) for the particular parameter at the corresponding time-incremental position within the PSD buffer. In other words, the algorithm checks to see whether the absolute value of the difference between the PSD value of each parameter and the corresponding value of the parameter in the "live," moving-average buffer is less than two times the corresponding average deviation value. (Matching just ten parameter sets to within twice the average deviation, which can be revised if desired, provides a fairly large degree of freedom in making this initial pre-screen for matches between the "live" data and the PSD shot profile data.)

If the parameter set (i.e., all three gravitational components of the acceleration values) at each of the first ten time-incremental positions within the PSD buffer matches the corresponding parameter sets within the moving-averages buffer (i.e., the number of data sets having all parameter values within the prescribed deviation is equal to 10, as indicated at decision step 2926), then the starting-index value for the ten-increments-wide moving-averages window that has been pre-screened is recorded at step 2927 as a possible starting index location to be examined more fully for a shot-attempt event, and the starting moving-averages-buffer index is incremented by one. Otherwise, if the number of pre-screening matches does not equal ten, the starting moving-averages-buffer index is not recorded before the starting moving-averages-buffer index is incremented. The algorithm then loops back to the beginning of loop 2921 and conducts this pre-screening comparison again, with the ten-increments-wide pre-screening window of moving-averages buffer data "shifted" to a point in time that is one time increment later, and the process will be repeated until the "leading" index value of the moving-averages window is ten less than the size of the moving-averages buffer.

Once the algorithm finishes identifying the starting-index locations for possible shot-attempt events in this manner, it proceeds to step 2923A of FIG. 29C by way of flow chart connector FC9, where it examines the data more carefully at each of the possible shot-attempt starting-index locations. To do so, the algorithm executes the second pair of nested loops 2923/2924. (If there are no ten-increment sub-windows that match the PSD data at all ten increments, then there would be no potential shots of the given type to examine; in that case, the algorithm simply bypasses this nested pair of loops and proceeds to the next shot-type value.)

Thus, for each of the possible starting-index values (which are cycled through at the level of outer loop 2923 of FIG. 29C, with starting point 2923a), the algorithm compares the Gx, Gy, and Gz values in the full, 0.6-second-wide "template" of the PSD buffer to time-wise corresponding (on an increment-by-increment basis) values within a 0.6-second-wide window of data within the moving-averages buffer. In making that comparison within the inner loop 2924 (starting point 2924A; ending point 2924B; and cycling through the moving-averages buffer from a starting index location equal to the particular identified potential-start-index value to a location that is 60 increments later), the algorithm counts the number of times the difference between each of the Gx, Gy, and Gz values and the corresponding PSD value is less than twice the corresponding average deviation value, as indicated at step 2928, and the algorithm records the number of such matches for each of Gx, Gy, and Gz at step 2929.

Once the number of matches for each of Gx, Gy, and Gz has been recorded, the algorithm calculates a confidence value, as a fractional number, which indicates how well the 0.6-second PSD template matches the moving-average buffer data at the given increment location within the moving-averages buffer. In particular, at step 2930, the algorithm calculates confidence value as (CountGx+CountGy+CountGz)/(3*size(PSD)), where size(PSD) is equal to the number of increments —60, in this embodiment—within the PSD "template" window.

Furthermore, at steps 2931-2934, the algorithm assesses how closely the PSD data matches the "live" data by considering deviation of the wrist tracker orientation in a window of time centered around the occurrence of maximum jerk within the 0.6-second window of "live" data. Thus, at step 2931, the index value for the time increment where maximum jerk occurs is identified. (Details of this maximum-value-index-identification are not shown in the figure, but the subroutine is essentially the same as that shown in FIG. 28 and described above.) Then, at step 2932, the difference between the value for each of $G_x$, Gy, and $G_z$ within a twenty-one-increment window centered at the point of maximum jerk (i.e., MaxJerk Index+/−10) within the "live-data" window and the corresponding values of $G_x$, Gy, and $G_z$ within a twenty-one-increment window centered at the point of maximum jerk within the PSD window is calculated, and the number of times the absolute value of the difference is less than a predetermined amount (e.g., 120, or 0.12 g) is tabulated for each of $G_x$, Gy, and $G_z$. Subsequently, at step 2934, a jerk-based confidence value jerkConfidence is calculated as (CountG$_x$+CountGy+CountG$_z$)/(3*size(jerkwindow)), where CountG$_x$, CountGy, and CountG$_z$ at this point are now the number of times the gravitational component values match as centered around the maximum jerk location, and jerkwindow is the size in increments (i.e., 21 in this case) of the window centered around the point of maximum jerk.

At step 2935, the algorithm averages the confidence value based on matching across the entire 0.6-second window and matching across the 21-increment window centered around the point of maximum jerk, and it sets that average confidence value to be the confidence value for the possibility of a match having been located with the 0.6-second PSD window being "laid over" the "live" moving-averages buffer data, starting at the given potential-starting-index value set at the beginning of the outer loop 2923 of the nested pair. Then, at step 2936, the algorithm checks to see whether the confidence value associated with the particular potential-starting-index value is higher than any confidence values that have been determined for previous potential-starting-index values that have been considered, or whether it is higher than any confidence value that has been determined to be a maximum confidence value when assessing whether a shot of a different type has been taken. If it is, the confidence value associated with the particular potential-starting-index value under consideration is set to be the new maximum value for the possibility of a match—to any type of shot—having been made, and the type of shot that was being considered for a potential match—i.e., the PSD identifier—is preferably recorded (not specifically illustrated).

This analysis is then repeated for each of the various types of shots that could be made, i.e., by comparing the associated PSD data to the "live" data that has been stored in the moving-averages buffer. Subsequently, at step 2937, the algorithm checks to see whether the maximum confidence level for a match having been found (determined at step 2936) exceeds a predetermined threshold. In this exemplary case, the threshold, which has been empirically determined to be suitable and which can be adjusted by the player if he or she wishes, is set at 0.75. If it does, a BLE message indicating that a shot has been taken (i.e., a shot-attempt BLE message), including the type of shot that has been taken, is sent at step 2938, and the app processes the message accordingly as described above. The various buffers are then all cleared at step 2939 and the algorithm then returns to step 2918 of FIG. 29A by way of flow chart connector FC10. Otherwise, if it is determined at step 2937 that the maximum confidence level does not exceed the predetermined threshold, the buffers are simply cleared, with no BLE message being sent, and the algorithm repeats.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and the appended claims

What is claimed is:

1. A wireless net tracker device comprising;
   a microprocessor;
   a computer memory storing one or more made shot profiles, each made shot profile representing typical perturbations of the net when a shot is made;
   one or more sensors that detect actual perturbations of the net when a basketball passes through the net; and
   a radio transmitter;
   wherein the computer memory further stores a made shot detection program, the made shot detection program having program instructions that, when executed by the microprocessor, cause the microprocessor to analyze data generated by the one or more sensors and to determine whether a qualified match exists between the actual perturbations of the net and the typical perturbations of the net when a shot is made as represented by at least one of said made shot profiles; and
   when the microprocessor determines that the qualified match exists, the program instructions are further configured to cause the microprocessor to transmit a message to a personal computer system via the radio transmitter, the message indicating that a made shot event has occurred.

2. The wireless net tracker of claim 1, wherein the computer memory further stores one or more rim bounce profiles which represent typical perturbations of the net when a shot hits the basketball hoop's rim or backboard and does not pass through the net.

3. The wireless net tracker of claim 2, wherein the computer memory further stores program instructions that, when executed by the microprocessor, cause the microprocessor to detect missed shots that hit and bounce off of the basketball hoop's rim or backboard by comparing the actual perturbations of the net with the typical perturbations of the net represented by the one or more rim bounce profiles.

* * * * *